(12) United States Patent
Kawakura et al.

(10) Patent No.: US 7,672,994 B2
(45) Date of Patent: Mar. 2, 2010

(54) DATA RELAY METHOD AND INFORMATION PROCESSING METHOD

(75) Inventors: Yasushi Kawakura, Yokohama (JP); Miho Uno, Yokohama (JP); Sachio Kizu, Yokohama (JP); Hideo Hirahara, Taito-ku (JP); Takunari Yoshizawa, Yokohama (JP); Masayuki Yoshida, Tama (JP)

(73) Assignees: Kabushiki Kaisha Toshiba, Tokyo (JP); Cell-Infortech Inc., Tokyo (JP)

( * ) Notice: Subject to any disclaimer, the term of this patent is extended or adjusted under 35 U.S.C. 154(b) by 213 days.

(21) Appl. No.: 11/751,514

(22) Filed: May 21, 2007

(65) Prior Publication Data

US 2007/0214214 A1    Sep. 13, 2007

Related U.S. Application Data

(62) Division of application No. 10/398,656, filed as application No. PCT/JP01/02690 on Mar. 29, 2001, now Pat. No. 7,231,421.

(30) Foreign Application Priority Data

Oct. 13, 2000    (JP)    ............................. 2000-313009

(51) Int. Cl.
   *G06F 15/16*    (2006.01)
(52) U.S. Cl. ........................ 709/203; 709/217; 709/219; 715/264; 707/3
(58) Field of Classification Search ................ 709/203; 705/26, 27; 707/4; 704/8
   See application file for complete search history.

(56) References Cited

U.S. PATENT DOCUMENTS

| 5,442,782 A |   | 8/1995 | Malatesta et al. |
| 6,018,742 A |   | 1/2000 | Herbert, III |
| 6,138,086 A | * | 10/2000 | Rose et al. ..................... 704/8 |
| 7,058,626 B1 | * | 6/2006 | Pan et al. ....................... 707/4 |

FOREIGN PATENT DOCUMENTS

| JP | 9-81569 | 3/1997 |
| JP | 10-232883 | 9/1998 |

OTHER PUBLICATIONS

Akiki Aizawa, "HTTP Message No Contents Henkan Wo Okonau Kyotsu Filter Server No Sekkei to Shisaku", Gakujutsu Joho Center Kiyou, No. 10, pp. 119-125, Mar. 1998.

* cited by examiner

*Primary Examiner*—Yves Dalencourt
(74) *Attorney, Agent, or Firm*—Oblon, Spivak, McClelland, Maier & Neustadt, L.L.P.

(57) ABSTRACT

A data relay and information processing method including storing in a database section identification information for identifying language-dependent data and replacement data corresponding to the language-dependent data in association with each other, receiving server data from the server system, detecting the replacement data from the database section on the basis of the identification information contained in the server data, replacing the language-dependent data as contained in the server data by the replacement data, and transmitting the server data as replaced to a client system. Thus, even in the case where the language used in the server system providing a service on the Internet is different from the language used in the client system, it is possible to recognize the information from the server by the client with reference to the replacement data.

11 Claims, 53 Drawing Sheets

FIG.13 Hotel Reservation And Hotel Information Search In Multiple Languages

Multilingual Search For Reservation
Search For Reservation With A Name
(Multiple Entries Hit)

FIG. 20A Customer Basic Table

| Customer Number | Name | Birth Day | Postal Guide Number | Tel. Number | Residence |
|---|---|---|---|---|---|
| <Numerical/Symbol Type> | <Character String Type> | <Numerical/Symbol Type> | <Numerical/Symbol Type> | <Numerical/Symbol Type> | <Character String Type> |

FIG. 20B Account Basic Table

| Account Number | Bank Code | Type of Account | Customer Number | Balance | Password |
|---|---|---|---|---|---|
| <Numerical/Symbol Type> | <Numerical/Symbol Type> | <Numerical/Symbol Type> | <Numerical/Symbol Type> | <Numerical/Symbol Type> | <Numerical/Symbol Type> |

FIG. 20C Money Reception History Table

| Account Number | Reception Day | Reception Amount | Reception Item |
|---|---|---|---|
| <Numerical/Symbol Type> | <Numerical/Symbol Type> | <Numerical/Symbol Type> | <Numerical/Symbol Type> |

FIG. 20D Money Withdrawal History Table

| Account Number | Withdrawal Day | Withdrawal Amount | Withdrawal Item |
|---|---|---|---|
| <Numerical/Symbol Type> | <Numerical/Symbol Type> | <Numerical/Symbol Type> | <Numerical/Symbol Type> |

FIG. 20E Bank Basic Table

| Bank Code | Bank's Name | Address | Tel. Number |
|---|---|---|---|
| <Numerical/Symbol Type> | <Character String Type> | <Character String Type> | <Numerical/Symbol Type> |

FIG. 20F Account Type Table

| Account Type | Account Type Name |
|---|---|
| <Numerical/Symbol Type> | <Character String Type> |

FIG.21A Customer Table

| Customer Number | Name | Residence |
|---|---|---|
| <Numerical/Symbol Type> | <Character String Type> | <Character String Type> |

FIG.21B Bank Table

| Bank Code | Bank's Name | Bank's Address |
|---|---|---|
| <Numerical/Symbol Type> | <Character String Type> | <Character String Type> |

FIG.21C Account Type Name (E to J) Table

| Account Type Name (E) | Account Type Name |
|---|---|
| <Character String Type> | <Character String Type> |

FIG.21D Account Type Code Table

| Account Type Code | Account Type Name |
|---|---|
| <Numerical/Symbol Type> | <Character String Type> |

FIG.22A

Bank Basic Table

| Bank Code | Bank's Name | Address | Tel. Number |
|---|---|---|---|
| B01 | xxx bank | xxx Naka, Yokohama | 045-xxx-yyy |

FIG.22B

Account Type Code Table

| Account Type Code | Account Type Name |
|---|---|
| 001 | teiki |
| 002 | futsu |

FIG.23A

Bank Table

| Bank's Code | Bank's Name | Bank's Address |
|---|---|---|
| B01 | xxx銀行 | 横浜氏中区xxx |

FIG.23B

Account Type Name (E to J) Table

| Account Type Name (E) | Account Type Name |
|---|---|
| futsu | 普通預金 |
| teiki | 定期預金 |

FIG.23C

Account Type Code Table

| Account Type Code | Account Type Name |
|---|---|
| 001 | 定期預金 |
| 002 | 普通預金 |

FIG.24

```
<SessionNumber="xxx1">
<RequestForTheNewAccount>
   <BankCode>B01</BankCode>
   <AccountTypeCode>002</AccountTypeCode>
   <Password>7777</Password>
   <AmountOfMoney>1000</AmountOfMoney>
   <Name Country="81">山田太郎</Name>
   <Name>YAMADA TARO</Name>
   <DateOfBirth>20001231</DateOfBirth>
   <PostalGuide>111-2222</PostalGuide>
   <TelephoneNumber>03-3xxx-xxxx</TelephoneNumber>
   <Residence Country="81">東京都港区xxx</Residence>
   <CountryCode>81</CountryCode>
</RequestForTheNewAccount>
</Session>
```

FIG.26

```
<SessionNumber="xxx1">
<RequestForTheNewAccount>
   <BankCode>B01</BankCode>
   <AccountTypeCode>002</AccountTypeCode>
   <Password>7777</Password>
   <AmountOfMoney>1000</AmountOfMoney>
   <Name>YAMADA TARO</Name>
   <DateOfBirth>20001231</DateOfBirth>
   <PostalGuide>111-2222</PostalGuide>
   <TelephoneNumber>03-3xxx-xxxx</TelephoneNumber>
   <Residence Country>xxxx Minato-ku Tokyo</Residence>
</RequestForTheNewAccount>
</Session>
```

FIG.28

```
<SessionNumber="xxx1">
<ResponseOfNewAccount>
   <CustomerNumber>a00001</CustomerNumber>
   <AccountTypeName>futsu</AccountTypeName>
   <AccountNumber>01234567</AccountNumber>
   <AmountOfMoney>1000</AmountOfMoney>
</ResponseOfNewAccount>
</Session>
```

FIG.27A
Customer Basic Table

| Customer Number | Name | Birth Day | Postal Guide Number | Tel. Number | Residence |
|---|---|---|---|---|---|
| a00001 | YAMADA TARO | 20001231 | 111-2222 | 03-3xxx-xxxx | xxxx Minato-ku Tokyo |

FIG.27B
Account Basic Table

| Account Number | Bank Code | Type of Account | Customer Number | Balance | Password |
|---|---|---|---|---|---|
| 1234567 | B01 | 002 | a00001 | 1000 | 7777 |

FIG.27C
Money Reception History Table

| Account Number | Reception Day | Reception Amount | Reception Item |
|---|---|---|---|
| 1234567 | 200010214 | 1000 | 01 |

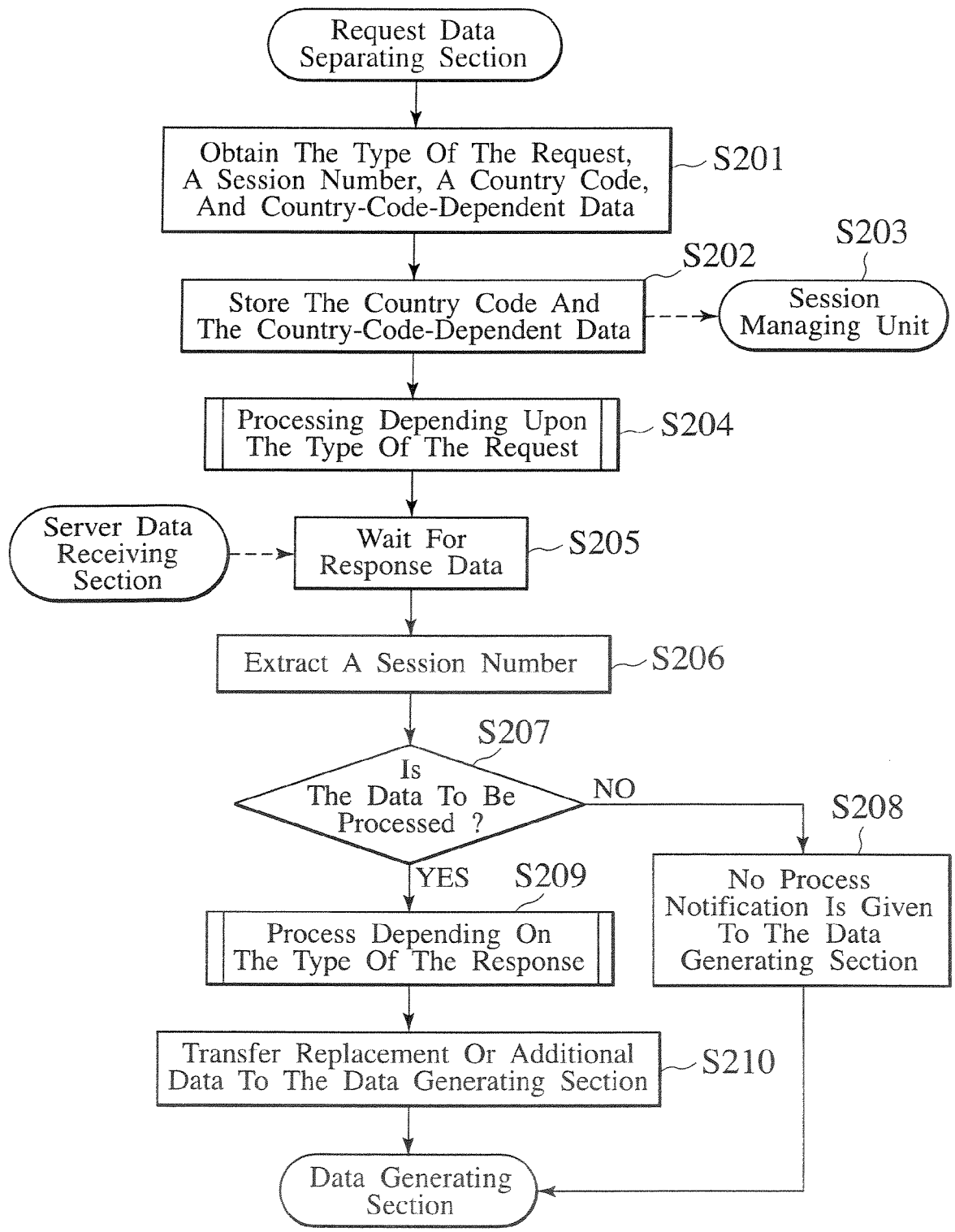

FIG.31

```
<SessionNumber="xxx1">
<ResponseOfTheNewAccount>
   <CustomerNumber>a00001</CustomerNumber>
   <AccountTypeNam Country="81">普通預金</AccountTypeName>
   <AccountNumber>01234567</AccountNumber>
   <AmountOfMoney>1000</AmountOfMoney>
   <CountryCode>81</CountryCode>
</ResponseOfTheNewAccount>
</Session>
```

FIG.32

```
<SessionNumber="xxx2">
<RequestForLodgment>
   <BankCode>B01</BankCode>
   <AccountNumber>01234567</AccountNumber>
   <Password>7777</Password>
   <AmountOfMoney>4000</AmountOfMoney>
   <CountryCode>81</CountryCode>
</RequestForLodgment>
</Session>
```

FIG.33A

Account Basic Table

| Account Number | Bank Code | Type of Account | Customer Number | Balance | Password |
|---|---|---|---|---|---|
| 1234567 | B01 | 002 | a00001 | 5000 | 7777 |

FIG.33B

Money Reception History Table

| Account Number | Reception Day | Reception Amount | Reception Item |
|---|---|---|---|
| 1234567 | 200010214 | 1000 | 01 |
| 1234567 | 200010305 | 4000 | 02 |

FIG.34

```
<SessionNumber="xxx2">
<ResponseOfLodgment>
   <BankName>xxx bank</BankName>
   <Balance>5000</Balance>
</ResponseOfLodgment>
</Session>
```

FIG.35

```
<SessionNumber="xxx2">
<ResponseOfLodgment>
   <BankName 国="81">xxx銀行</BankName>
   <Balance>5000</Balance>
   <CountryCode>81</CountryCode>
</ResponseOfLodgment>
</Session>
```

FIG.36

```
<SessionNumber="xxx3" />
<RequestForUpdatingRegistrationInformation>
   <UpdatingTheResidence/>
   <BankCode>B01</BankCode>
   <AccountNumber>01234567</AccountNumber>
   <Password>7777</Password>
   <CountryCode>81</CountryCode>
</RequestForUpdatingRegistrationInformation>
</Session>
```

FIG.37

```
<SessionNumber="xxx3" />
<ResponseOfUpdatingRegistrationInformation>
    <CustomerNumber>a00001</CustomerNumber>
    <Name>YAMADA TARO</Name>
    <Residence>
        <PostalGuide>111-2222</PostalGuide>
        <Residence>xxxx Minato-ku Tokyo</Residence>
        <TelephoneNumber>03-3xxx-xxxx</TelephoneNumber>
    </Residence>
</ResponseOfUpdatingRegistrationInformation>
</Session>
```

FIG.38

```
<SessionNumber="xxx3" />
<ResponseOfUpdating RegistrationInformation>
    <CustomerNumber>a00001</CustomerNumber>
    <Name Country="81">山田太郎</Name>
    <Name>YAMADA TARO</Name>
    <Residence>
        <PostalGuide>111-2222</PostalGuide>
        <Residence Country="81">東京都港区xxx</Residence>
        <TelephoneNumber>03-3xxx-xxxx</TelephoneNumber>
    </Residence>
    <CountryCode>81</CountryCode>
</ResponseOfUpdatingRegistrationInformation>
</Session>
```

FIG.39

```
<SessionNumber="xxx3" />
<RequestForUpdatingResidence>
    <CustomerNumber>a00001</CustomerNumber>
    <UpdatingResidence>
        <PostalGuide>444-5555</PostalGuide>
        <Residence Country="81">東京都港区cccc</Residence>
    </UpdatingResidence>
    <CountryCode>81</CountryCode>
</RequestForUpdatingResidence>
</Session>
```

FIG.40

```
<SessionNumber="xxx3" />
<RequestForUpdatingResidence>
    <CustomerNumber>a00001</CustomerNumber>
    <UpdatingResidence>
        <PostalGuide>444-5555</PostalGuide>
        <Residence>cccc Chuo-ku Tokyo</Residence>
    </UpdatingResidence>
</RequestForUpdatingResidence>
</Session>
```

FIG.41

```
<SessionNumber="xxx3" />
<ResponseOfUpdatingResidence>
    <UpdatingStatus>0</UpdatingStatus>
    <CountryCode>81</CountryCode>
</ResponseOfUpdatingResidence>
</Session>
```

FIG.44

```
<Item>
    <ItemNumber>206-0001</ItemNumber>
    <ItemName>Cotton Button Front Cardigan</ItemName>
    <ItemPrice>
        <Currency code=01>U.S.$</Currency>
        <Price>49.0</Price>
    <ItemPrice>
    <ItemColor code=01>white</ItemColor>
    <ItemColor code=08>pastel blue</ItemColor>
    <ItemColor code=09>pastel pink</ItemColor>
</Item>
<Item>
    <ItemNumber>206-0002</ItemNumber>
    <ItemName>Cashmere V-neck Cardigan</ItemName>
    <ItemPrice>
        <Currency code=01>U.S.$</Currency>
        <Price>120.0</Price>
    <ItemPrice>
    <ItemColor code=01>white</ItemColor>
    <ItemColor code=08>pastel blue</ItemColor>
    <ItemColor code=09>pastel pink</ItemColor>
</Item>
<Item>
    <ItemNumber>206-0003</ItemNumber>
    <ItemName>Hooded Zip-Front Cardigan</ItemName>
    <ItemPrice>
        <Currency code=01>U.S.$</Currency>
        <Price>69.0</Price>
    <ItemPrice>
    <ItemColor code=01>white</ItemColor>
    <ItemColor code=08>pastel blue</ItemColor>
    <ItemColor code=09>pastel pink</ItemColor>
</Item>
```

Commodity Table

| Commodity Code | Commodity Name |
|---|---|
| 206-0001 | コットン 前ボタン カーディガン |
| 206-0002 | カシミア Vネックカーディガン |
| 206-0003 | フード付き 前ファスナーカーディガン |
| ・・・ | ・・・ |

FIG.45B

Color Table

| Color Code | Name |
|---|---|
| 01 | 白 |
| 08 | パステルブルー |
| 09 | フパステルピンク |
| ・・・ | ・・・ |

FIG.45C

Currency Table

| Currency Code | Name |
|---|---|
| 01 | 米ドル |
| 08 | 円 |
| 09 | リラ |
| ・・・ | ・・・ |

FIG.46

```
<Item>
    <ItemNumber>206-0001</ItemNumber>
    <ItemName>コットン 前ボタン カーディガン</ItemName>
    <ItemPrice>
        <Currency code=01>米ドル</Currency>
        <Price>49.0</Price>
    <ItemPrice>
    <ItemColor code=01>白</ItemColor>
    <ItemColor code=08>パステルブルー</ItemColor>
    <ItemColor code=09>パステルピンク</ItemColor>
</Item>
<Item>
    <ItemNumber>206-0002</ItemNumber>
    <ItemName>カシミア Ｖネックカーディガン</ItemName>
    <ItemPrice>
        <Currency code=01>米ドル</Currency>
        <Price>120.0</Price>
    <ItemPrice>
    <ItemColor code=01>白</ItemColor>
    <ItemColor code=08>パステルブルー</ItemColor>
    <ItemColor code=09>パステルピンク</ItemColor>
</Item>
<Item>
    <ItemNumber>206-0003</ItemNumber>
    <ItemName>フード付き 前ファスナーカーディガン</ItemName>
    <ItemPrice>
        <Currency code=01>米ドル</Currency>
        <Price>69.0</Price>
    <ItemPrice>
    <ItemColor code=01>白</ItemColor>
    <ItemColor code=08>パステルブルー</ItemColor>
    <ItemColor code=09>パステルピンク</ItemColor>
</Item>
```

```
<Order>
  <Item>
    <ItemNumber>206-0001</ItemNumber>
    <ItemName>コットン 前ボタン カーディガン</ItemName>
    <ItemColor code=09>パステルピンク</ItemColor>
    <ItemSize code=S>小</ItemSize>
    <Quantity>1</Quantity>
  </Item>
  <Customer>
    <LastNameJa>東芝</LastNameJa>
    <LastName>Toshiba</LastName>
    <FirstNameJa>花子</FirstNameJa>
    <FirstName>Hanako</FirstName>
    <Gender code=1>女性<Gender>
    <Address1>芝浦1-1</Address1>
    <Address2></Address2>
    <City>港区</City>
    <State>東京</State>
    <Zip>105-0001</Zip>
    <Country code=81>日本</Country>
    <eMail>hanako.toshiba@aaa.co.jp</eMail>
    <Telephone>03-1234-5678</Telephone>
  </Customer>
</Order>
```

```
<Order>
   <Item>
      <ItemNumber>206-0001</ItemNumber>
      <ItemName></ItemName>
      <ItemColor code=09></ItemColor>
      <ItemSize code=S></ItemSize>
      <Quantity>1</Quantity>
   </Item>
   <Customer>
      <LastName>Toshiba</LastName>
      <FirstName>Hanako</FirstName>
      <Gender code=1><Gender>
      <Address1>Shibaura 1-1</Address1>
      <Address2></Address2>
      <City>Minato-ku</City>
      <State>Tokyo</State>
      <Zip>105-0001</Zip>
      <Country code=81></Country>
      <eMail>hanako.toshiba@aaa.co.jp</eMail>
      <Telephone>03-1234-5678</Telephone>
   </Customer>
</Order>
```
~S4

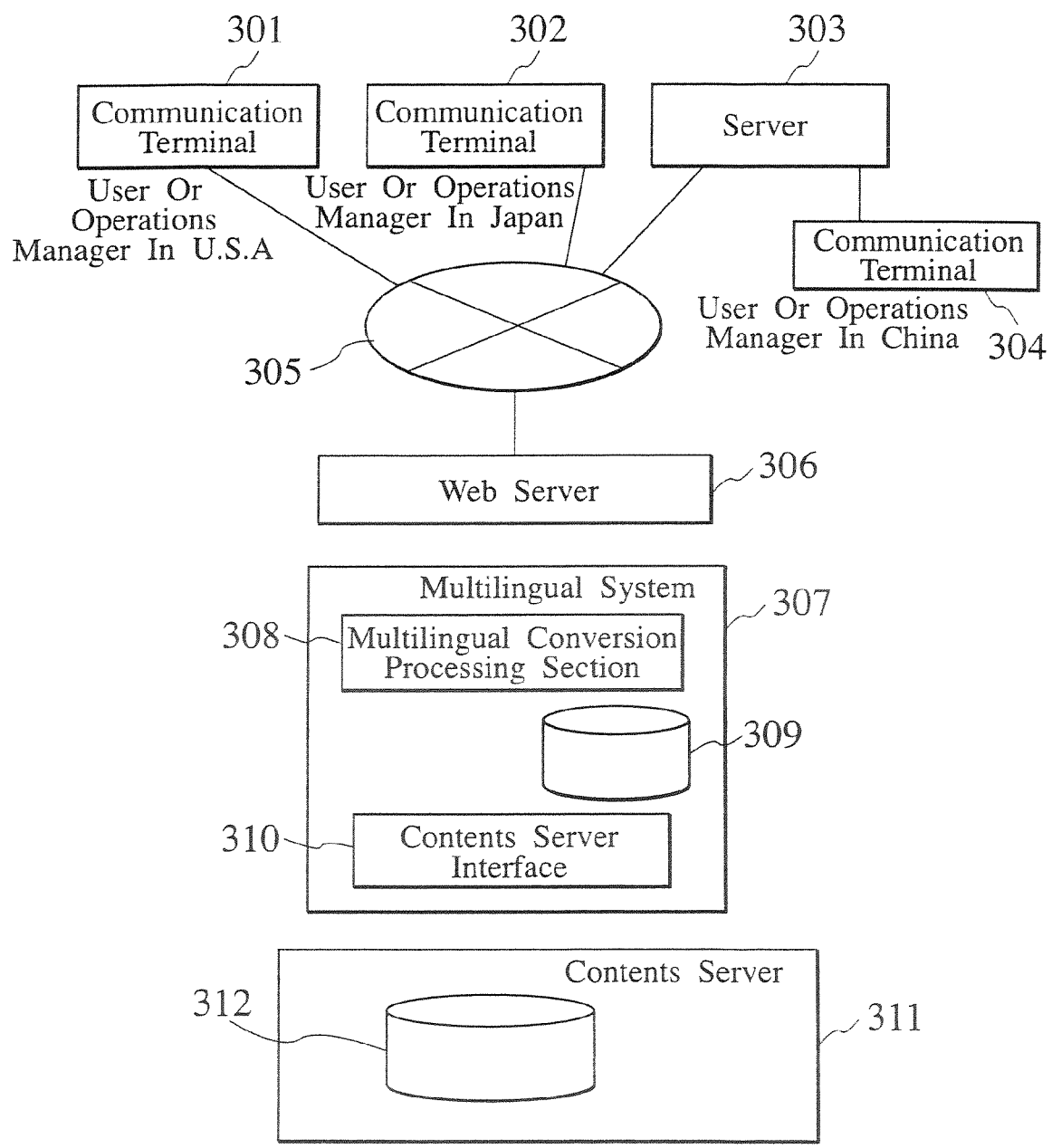

FIG.53

```
<EC>
   <Local-Code>Japan</Local-Code>
   <Global><BookStore>Universal Books</BookStore></Global>
      <Local><Title> Society Of Mind </Title></Local>
      <Local><Author> Robert Williams </Author></Local>
      <IX></ISBN></IX>
      <Local><Price></Price><Local>
      <Addition1> (Picture) </Addition1>
      <Global><Addition2> (Voice) <Addition2></Global>
      <Addition3> (Author) </Addition3>
</EC>

分解
Local-Code=JP
Global
<IX><ISBN></ISBN></IX>
<BookStore>Universal Books</BookStore>
<Addition2> (Voice) </Addition2>

Local
<IX><ISBN></ISBN></IX>
<Title> Science Of Mind </Title>
<Author> Marvine Minsky </Author>
<Price></Price>

付加情報
(Picture)
(Author)
```

```
Local-Code=JP-SJIS
Global
<IX><ISBN> ISBN4-3688-4455</ISBN></IX>
<BookStore>Universal Books</BookStore>
<Addition2>Book.US.ISBN4-3688-4455 (Voice) </Addition2>

Local
<Attention>日本語翻訳があります</Attention>
<IX><ISBN> ISBN4-8245-6504-4</ISBN></IX>
<Title> 心の科学 </Title>
<Author> ロバート　ウィリアムス </Author>
<Price>￥6,500</Price>

付加情報
Book.Localize. ISBN4-8245-6504-4.JP (Picture)
Book.US. ISBN4-3688-4455 (Author)

<EC>
   <Global><BookStore>Universal Books< /BookStore>< /Global>
      <Attention>日本語翻訳があります</Attention>
      <Local><Title> 心の科学 </Title>< /Local>
      <Local><Author> ロバート　ウィリアムス </Author></ /Local>
      <IX><ISBN> ISBN4-8245-6504-4< /ISBN>< /IX>
      <Local><Price>￥6,500</Price><Local>
      <Addition1>Book.Localize. ISBN4-8245-6504-4.JP (Picture) < /Addition1>
      <Global><Addition2>Book.US. ISBN4-3688-4455 (Voice) < /Addition2>< /Global>
      <Addition3>Book.US.ISBN4-3688-4455 (Author) < /Addition3>
< /EC>
```

Contents NAME : Book

| Packet Number | P1 | P2 | P3 | · · · | Pn−1 | Pn |
|---|---|---|---|---|---|---|
| Multilingual Information | 0 | 0 | 0 | · · · | 0 | 0 |
| Basic Information | 0 | 0 | 0 | · · · | 0 | 0 |
| Multilingual Additional Information | 0 | 0 | 0 | · · · | 0 | 0 |
| Basic Additional Information | 0 | 0 | 0 | · · · | 0 | 0 |

FIG.55B

| Packet Number | P1 | P2 | P3 | · · · | Pn−1 | Pn |
|---|---|---|---|---|---|---|
| Multilingual Information | 1 | 0 | 0 | · · · | 0 | 0 |
| Basic Information | 1 | 1 | 0 | · · · | 0 | 0 |
| Multilingual Additional Information | 0 | 0 | 1 | · · · | 1 | 1 |
| Basic Additional Information | 0 | 0 | 1 | · · · | 1 | 1 |

FIG.55C

| Packet Number | P1 | P2 | P3 | · · · | Pn−1 | Pn |
|---|---|---|---|---|---|---|
| Multilingual Information | 0 | 0 | 0 | · · · | 1 | 0 |
| Basic Information | 0 | 0 | 0 | · · · | 0 | 0 |
| Multilingual Additional Information | 0 | 0 | 1 | · · · | 0 | 1 |
| Basic Additional Information | 0 | 0 | 0 | · · · | 0 | 0 |

FIG.57

| Transaction ID | Country Code | Character Code | Auxiliary Character Code | Terminal Information | Content ID | Acquisition Flag |
|---|---|---|---|---|---|---|
| TPHTML00675 | JP | SJIS | MS | PC | Book | 0 |
| | | | | | Author | On |
| | | | | | Price | 0 |
| TPHTML00678 | CH | Big5 | Simplified Characters | Mobile Terminal | Book | On |
| | | | | | Price | On |

FIG.58

| Country Code | Character code | Auxiliary Character code | Alternate Character code | Unicode |
|---|---|---|---|---|
| JP | SJIS Character code Table | MS | Unicode(UTF8) Character code Table | Unicode(UTF16) Character code Table |
| | EUC Character code Table | Sun | SJIS Character code Table | Unicode(UTF16) Character code Table |
| | JIS Character code Table | JIS | SJIS Character code Table | Unicode(UTF16) Character code Table |
| CH | Big5 Character code Table | Simplified Characters | Unicode(UTF8) Character code Table | Unicode(UTF16) Character code Table |
| | Big5 Character code Table | Traditional Characters | Unicode(UTF8) Character code Table | Unicode(UTF16) Character code Table |

| Contents ID | Country Code | Character code | Auxiliary Character code | Content | Object Handle |
|---|---|---|---|---|---|
| TEXTBOX1 | JP | Unicode | UTF8 | 翻訳版があります。 | book.Localize.book1.jp(picture) |
| | | Unicode | UTF16 | 翻訳版があります。 | book.Localize.book1.jp(picture) |
| | CH | Unicode | UTF8 | 翻訳版があります。 | book.Localize.book1.台湾(picture) |
| | | Unicode | UTF8 | 翻訳版があります。 | book.Localize.book1.中国(picture) |

DATA RELAY METHOD AND INFORMATION PROCESSING METHOD

CROSS REFERENCES TO RELATED APPLICATIONS

This application is divisional of U.S. patent application Ser. No. 10/398,656 now U.S. Pat. No. 7,231,421, filed on Apr. 14, 2003, which is the National Stage of PCT/JP01/02690, filed on Mar. 29, 2001. Both claim priority to Japanese Patent Applications P2000-313009, filed on Oct. 13, 2000. The contents of each of these documents are incorporated herein by reference, and related to a data relay system, a data relay method and a data relay program provided for the purpose of making it possible for a server/client system exchanging data through the Internet to use a new language in addition to the currently language available in said server/client system.

BACKGROUND OF THE INVENTION

In recent years, along with the advent of the Internet technology, this Internet has increasingly been used for buying and selling goods and services by receiving and transmitting data through the Internet. Such transactions for buying and selling goods and services through the Internet can be made between different countries so that different languages are often used between a server system for selling goods and services and a client system which will buy goods and services on the Internet. Accordingly, the necessity arises of translating languages between a server system and a client system.

An exemplary relay server for the purpose of converting languages is EtoJ Proxy (English-to-Japanese word translation server EtoJ_Proxy—for Web by "DeleGate" Proxy, 1995.11, Yoshihiro Ugawa, Manabu Akimoto, Nobuyuki Fujita and Yutaka Satoh, World Wide Web Conference '95). This relay server is characterized in that a word for word dictionary is provided in order to translate an English response from the server of a client-server system into a Japanese response and transmit the response after conversion. FIG. 1 is a schematic diagram showing an implementation of the system.

As illustrated in FIG. 1, this relay server 13 is located between a server system 1 and a client system 2. When a request for the URL of the server system 1 is sent from the client system 2 to the server system 1, the URL is transferred to the Server system 1 as it is through a client message receiving section 133 and a server message transmitting section 131. Then, the relay server 13 receives, through a server message receiving section 135, a WWW hyper text markup language document (HTML) which has been written in English and transferred from the server system 1 while each word of the text data of this HTML is converted into a Japanese word by the use of an EtoJ word for word dictionary 134 in an EtoJ word for word translating section 132 and returned to the client system 2 through a client message transmitting section 136.

This type of the relay server 13 is designed for the purpose of converting a document which has been described in a certain language into another language for reading and therefore it is necessary to provide a word for word dictionary 134 having a sufficient number of entries so that few implementations have been put to practical use at this time. Also, this type of the relay server 13 serves to perform a unidirectional translation process of only the response from the server system 1 and therefore it can not be applied to a bi-directional online system which has to convert one language to another language for the request from the client system 2 and the response from the server system 1.

Meanwhile, pre-arranged accommodation systems, delivery systems and so forth are examples in which a server system is accessed by client systems to refer to and update associated data. In the case of these system, language-dependent information such as customer information and language-independent information such as numerical values are input to the server system 1 while said language-dependent information and said language-independent information are output from the server system to the client system 2.

In the case where it is desired for these system to implement additional functions for providing services in another language corresponding to the existing services in the current language, for example, for providing services in English in addition to in Japanese, the necessity arises of extending the client server system for implementing additional functions. In the prior art technique, such extension of the system has been implemented in the following manner.

At the end of the server system where a system 204 is implemented with data 201 in a current language 1, as illustrated in FIG. 2, server systems (205, 206, . . . ) implemented with data 202, 203 in different languages 2 to n are added anew in order to operate on line together with the system 204 implemented with data 201 in the language 1. Also, as illustrated in FIG. 3, another implementation of an improved system 208 is possible by extending a server system in a language 1 with additional functions required for providing services in different languages 2 to n.

On the other hand, at the end of the client system where an existing system 209 is implemented, as illustrated in FIG. 4, client systems 210, 211, . . . each of which can be operated for adding, updating, deleting or referring to data only in the other language are added anew in order to operate on line together with the system 209 operating in the current language. Alternatively, as illustrated in FIG. 5, the client system can be improved for providing services in different languages by implementing functions 212 therein.

Also, the server/client system can be designed for practical operation by combining the above two types of server systems and the above two types of client systems.

In the case of the implementation as illustrated in FIG. 2 where a server has to be developed anew for the other language, if new systems 205, 206, . . . are to be added without halting the existing system 204, the implementation can be applied only to services in which any one of the systems shall not refer to information in the language of another system, for example, in the form of independent services for the respective languages such as a service for use inside of Japan, a service for use inside of U.S.A., and so forth.

Accordingly, in the case of this kind of server systems, for example, when a hotel in US wants to provide an online booking service in English and in Japanese, it is needed to manage data of language-independent information to be controlled under unified management such as information about available rooms, avoiding data redundancy among the server systems.

Also, in the case of this example, it is impossible to partially provide service(s) in another language on the basis of the existing services in the current language, for example, to provide, in Japanese, only part of the services which have been provided in English while providing the remainder only in English.

Conversely, in the case where a server system is extended as illustrated in FIG. 3 by making use of information in another language together with information in the existing language, the system 208 as operating has to be halted for extension so that stoppage of the service is inevitable while, in the case of a wide-scale and complicated system, development works also become wide-scale and complicated.

Furthermore, in the case where a server system is extended as described above, it is necessary to continue providing services in the current language for current clients and therefore to maintain upward compatibility with the current server system in the current language.

Furthermore, in the case where a server system is implemented in each language to provide services in different languages in addition to the server system in the current language as illustrated in FIG. 2, unified management of language-independent data is required among the server systems. In order to implement this in the configuration as illustrated in FIG. 2, it is needed to provide additional functions for managing the language-independent data among the existing server and all the servers other than its own system or to provide a separate data management system for synchronizing data under unified management among the server systems. Furthermore, there is a problem that it is impossible to provide only part of data in Japanese on the basis of English information.

Also, in the case where an existing system is extended to an multilingual system for providing services in different languages in addition to the current language as illustrated in FIG. 3, stoppage of the service is inevitable and therefore it is difficult to apply to a wide-scale and complicated system. Also after updating the server, it is needed to maintain compatibility with the previous system in order that existing clients can make use of the new system.

In order to solve these problems, it is an object of the present invention to unify management of language-independent information without modifying the existing system for providing online services in a plurality of languages in a client-server system as an online system for selling goods and services through the Internet.

On the other hand, in recent years, contents on the Internet have increasingly been accessed from a plurality of countries along with the advent of the Internet technology.

However, most currently available contents have been provided only in the native language of each contents provider while some contents have been provided in two languages, i.e., in English and in the native language at the best. In other words, it can be said that there are few contents which have been provided in more than two languages.

Such provision of contents having been provided in two languages at the best becomes a factor impeding revitalization of the online electronic transactions and a barrier of the social infrastructure which can be used with fairness to all ages.

In addition to this, it is necessary for providing contents in a plurality of languages to repeat the provision of the same contents in the respective languages and therefore require very troublesome work taking more efforts for creating and updating contents and so forth. Furthermore, while it is inevitable to give users the contract detail and the notabilia with reasonable accuracy in the case of online electronic transactions and so forth, a number of troubles have arisen under the current circumstances.

Another invention has been made in the circumstances as described above in order to provide an information processing method and a program for handling different languages with ease when providing contents in different languages.

DISCLOSURE OF THE INVENTION

In order to accomplish the above described object, the present invention comprises, when relaying data exchanged between a server system of a service provider and a client system of a user, storing identification information for identifying language-dependent data and replacement data corresponding to said language-dependent data associated with each other; receiving server data from said server system; searching said database section on the basis of said identification information contained in the server data as received, and detecting the replacement data associated with said identification information; identifying said language-dependent data contained in the server data as received, and replacing said language-dependent data as identified by said replacement data associated therewith; and transmitting the server data replaced by said data generating section to said client system.

In accordance with the present invention, even in the case where the language used in a server system providing a service is different from language used in a client system, the language-dependent data is replaced by replacement data associated therewith and transmitted to the client system, and therefore it is possible to recognize the information from the server by the client with reference to the replacement data.

In the case of the invention as described above, it is preferred to output server data without replacement of the language-dependent data in the case where the replacement data is not specified in the server data.

By this configuration, since the server data is transferred as it is even if there is available no replacement data, it is possible to continue smooth management of a system without halting the operation of the system due to introduction of the present system.

In the case of the invention as described above, it is preferred to receive request data from the client system; extract first identification information contained in the request data as received for identifying the replacement data, extract second identification information for identifying language-dependent data contained in the server data, and detect the replacement data on the basis of the first identification information and the second identification.

By this configuration, since the information for identifying language-dependent data from the client system and the server system, it is possible to quickly and accurately detect replacement data associated with the language-dependent data as identified and therefore to remove the failure relating to the languages between the client system and the server system.

In accordance with the invention as described above, it is preferred to receive the replacement data and the first identification information corresponding to said replacement data from said client system and to store said replacement data and the first identification information; to acquire said second identification information as the processing result of said server system; and to register said replacement data as stored, the first identification information corresponding thereto and the second identification information as acquired in said database section in accordance with the processing result.

By this configuration, it is possible to acquire in advance the replacement data corresponding to the language-dependent data used in the server system and the first identification information for identifying said language-dependent data from the client as well as the second identification information from the server system, and then, after confirming the completion of the operation of the server system, to register the replacement data in the database section in association with the first and second identification information. As a result, it is possible to accumulate only effective data to the server system in the database section and therefore to establish the database section in an appropriate manner.

In accordance with the invention as described above, it is preferred to delete, from the request data as obtained from the client system, language-dependent data which can not be handled by the server system and said first identification information, and to transfer the server request data to said server system.

By this configuration, since the language-dependent data which can not be recognized by the server system is removed when request data is transmitted to the server system, it is possible to prevent unnecessary data from transferred to the server system and to maintain an appropriate operation of the server system.

In accordance with the invention as described above, it is preferred to add pseudo data in place of the language-dependent data as deleted.

By this configuration, it is possible to prevent other language-dependent data which can not be handled by the server system from being input to an item indispensable for the server system, to avoid an error which otherwise would occur if no data was input to said item, and therefore to maintain an appropriate operation of the server system.

In accordance with the invention as described above, it is preferred that the pseudo data includes data for display which can be handled by the server system and used to identify the language used in the client system.

By this configuration, in the case where the pseudo data is transferred to the client system without replacement in the relay server, it is possible to estimate the cause of the fact that the pseudo data is not replaced by the data for display.

Also, the information processing method supporting multiple languages in accordance with another invention comprises: a first step of accessing a Web server on the Internet by users respectively using their native languages; a second step of outputting search requests corresponding to a plurality of languages used by the access step by a multilingual system connected to the Web server; and a third step of receiving the search requests, searching a contents database for contents matching the search requests and returning the contents to the multilingual system by a contents server.

Furthermore, the second step includes a fourth step of returning the contents as the search results to the users through the Web server.

Still further, the second step includes: a fifth step of performing multilingual conversion required for supporting multiple languages on the basis of the information of a multilingual conversion filter database by a multilingual conversion processing section; and a sixth step of outputting the search requests to the contents server through a contents server interface, and receiving contents as search results from the contents server.

Still further, the fifth step includes: a seventh step of processing a respective markup language by a markup language processing section; an eighth step of determining the language code which is used by the communication terminal of a user and setting the country code of the communication terminal; a ninth step of dividing the telegraphic message information as transmitted from the communication terminal by a telegraphic message division processing section; a tenth step of recording a country code, a character code set, terminal information and a content ID for each transaction to manage the acquisition process of the respective contents; an eleven step of converting character codes relating to local information with reference to the information of the multilingual conversion filter database; a twelfth step of outputting the search request to the contents server interface by generating a search managing table in a search processing section, managing whether search information is obtained for each searching item, searching global information and the local information for the same information, and outputting the search request to the contents server interface; and a thirteenth step of assembling a telegraphic message as resultant information of searching by a telegraphic message assembly processing Still further, the fifth step includes a fourteenth step of storing country codes, character codes, character auxiliary codes, alternate character codes and Unicodes in the information registered in the multilingual conversion filter database.

Still further, the seventh step includes a fifteenth step of dividing and extracting information from the markup language as input from the Web server while conversely inserting markup tags into the telegraphic message to be output to the Web server followed by requesting the Web server to output the telegraphic Still further, when the local information contains information in a plurality of character encoding systems in a single native language, the eleventh step includes a sixteenth step of converting the character codes used in the communication terminal of a user to corresponding character codes as used in the contents database and converting the character codes of content information as obtained in the reverse direction to the character codes used in the communication terminal of the user.

Still further, the twelfth step includes a seventeenth step of selecting, if there is available local information, the local information with priority and, if not, selecting global information, and returning the information as selected to the language specific filter processing section.

Still further, while an internal timer is provided to install an interrupt processor for the purpose of accelerating the process, the seventeenth step includes an eighteenth step of returning the information as available at the time when time has elapsed, irrespective of whether global or local information, to the language specific filter processing section.

Still further, the twelfth step includes: a nineteenth step of setting all the items of the search managing table as being generated to "0" in the initial state while each item associated with a search request is set to "1"; a twentieth step of changing the "1" of each item associated with a successful search to a "0"; and a twenty-first step of performing an operation in a row direction and in a column direction of the search managing table and judging that all the information becomes available if all the items are set to "0".

Still further, the third step includes a twenty-second step of by making use of the contents database as a basic information database, a basic information auxiliary database, a multilingual database and a multilingual auxiliary database.

Still further, the twenty-second step includes: a twenty-third step of registering global information in the basic information database; a twenty-fourth step of registering global auxiliary information in the basic information auxiliary database; a twenty-fifth step of registering local information in the basic information database; and a twenty-sixth step of registering local auxiliary information in the basic information auxiliary database.

Still further, the twenty-second step includes a twenty-seventh step of operating the basic information database and the basic information auxiliary database in a different server separate from a server in which the multilingual database and the multilingual auxiliary database operate.

Still further, the twenty-second step includes a twenty-eighth step of operating the multilingual database and the multilingual auxiliary database integrally with the multilingual system.

Still further, the information processing technique for handling multiple languages in accordance with the present invention as described above can be implemented with a program written in a predetermined program language.

In accordance with the information processing method and the program relating to the other invention as described above, when users respectively using their native languages access a Web server on the Internet with the communication terminals, the multilingual system connected to the Web server serves to output search requests corresponding to a plurality of languages used by the accesses while the contents server receives the search requests, searches the contents database for contents matching the search requests and returns the contents to the multilingual system.

BRIEF DESCRIPTION OF DRAWINGS

FIGS. 20A to 20F show the basic data of the databases of a server system in accordance with the third embodiment.

FIGS. 21A to 21D show the basic data of the databases of a relay server in accordance with the third embodiment.

FIGS. 22A to 22B show exemplary basic data of the database of a server system in accordance with the third embodiment.

FIGS. 23A to 23C show exemplary basic data of the database of a relay server in accordance with the third embodiment.

FIG. 24 shows the request data for opening a new account in accordance with the third embodiment.

FIG. 26 shows the request data for opening a new account as transmitted from the relay server to the server system in accordance with the third embodiment FIGS. 27A to 27C show exemplary data of new customers and account data registered in the server system in accordance with the third embodiment.

FIG. 28 shows the response data for opening a new account as transmitted from the server system to the relay server in accordance with the third embodiment FIG. 29 is a flowchart of the data processing section of the relay server in accordance with the third embodiment.

FIG. 31 shows the response data for opening a new account as transmitted from the relay server to a client in accordance with the third embodiment FIG. 32 shows the request data for lodgment operation as transmitted from the client in accordance with the third embodiment FIGS. 33A and 33B show exemplary data of the lodgment operation registered in the server system in accordance with the third embodiment FIG. 34 shows the response data of the lodgment operation as transmitted from the server system to the relay server in accordance with the third embodiment FIG. 35 shows the response data of the lodgment operation as transmitted from the relay server to the client in accordance with the third embodiment FIG. 36 shows the request data for updating registration information from the client to the relay server in accordance with the third embodiment.

FIG. 37 shows the response data for updating the registration information from the server system to the relay server in accordance with the third embodiment.

FIG. 38 shows the response data for updating the registration information from the relay server to the client in accordance with the third embodiment.

FIG. 39 shows the request data for updating a residence from the client to the relay server in accordance with the third embodiment.

FIG. 40 shows the request data for updating the residence from the relay server to the server system in accordance with the third embodiment.

FIG. 41 shows the response data indicative of completion of updating the residence in accordance with the third embodiment

FIG. 44 is a view for explaining a list as the results of searching from the server system.

FIGS. 45A to 45C are views for explaining data tables accumulated in a database section.

FIG. 46 shows a list as the results of searching as converted by the relay server.

FIG. 49 shows an order list which is obtained from a user by the relay server in accordance with the fourth embodiment.

FIG. 50 shows an order list from the user which is converted by the relay server in accordance with the fourth embodiment.

FIG. 51 is a view for explaining the overview of the information processing apparatus in accordance with a sixth embodiment of an information processing method of another invention for handling multiple languages.

FIG. 53 is a view for explaining the information input in a markup language and the information obtained by dividing it in the information processing method as illustrated in FIG. 51.

FIG. 54 is a view for explaining the information input in a markup language and the information obtained by dividing it in the information processing method as illustrated in FIG. 51.

FIGS. 55A to 55C are diagrams showing search managing tables generated by a search processing section as illustrated in FIG. 52.

FIG. 57 is a diagram showing a conversion managing table generated by the multilingual conversion filter processing section as illustrated in FIG. 52.

FIG. 58 is a view for explaining a multilingual filter conversion database as illustrated in FIG. 52.

PREFERRED EMBODIMENTS OF THE INVENTION

First Embodiment

System Configuration

Figure 1:
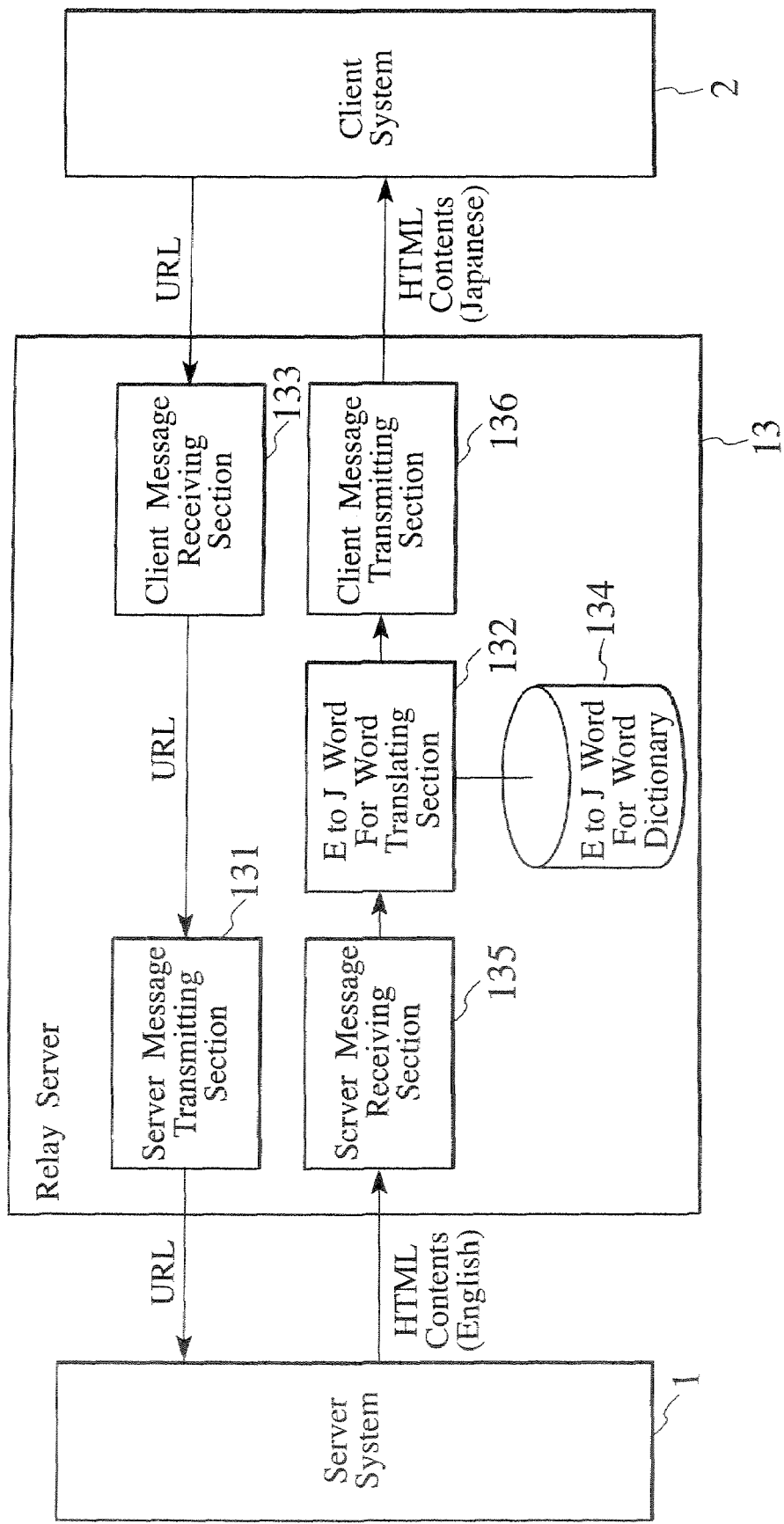
FIG. 1 is an organization diagram of an EtoJ translation relay server in accordance with a prior art technique.
Figure 2:
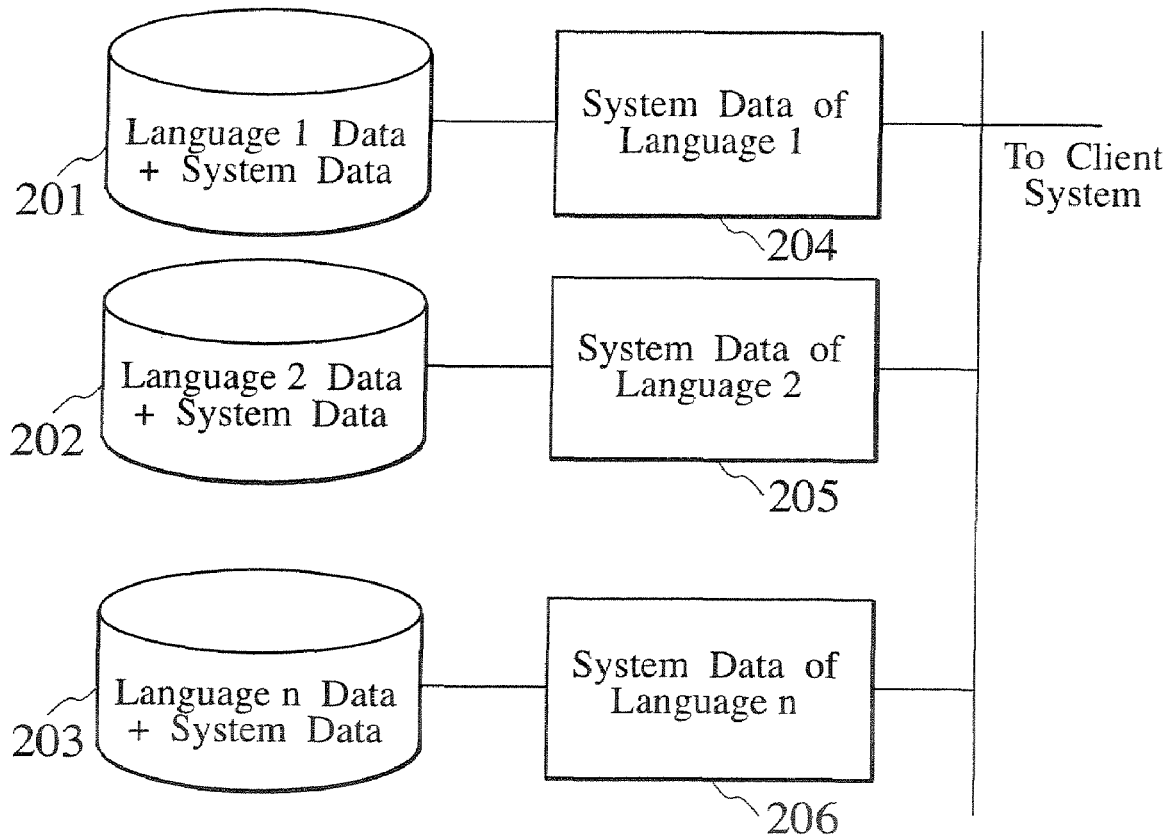
FIG. 2 is an organization diagram in which a separate server is provided for each language with corresponding language data and system data in accordance with a prior art technique.
Figure 3:
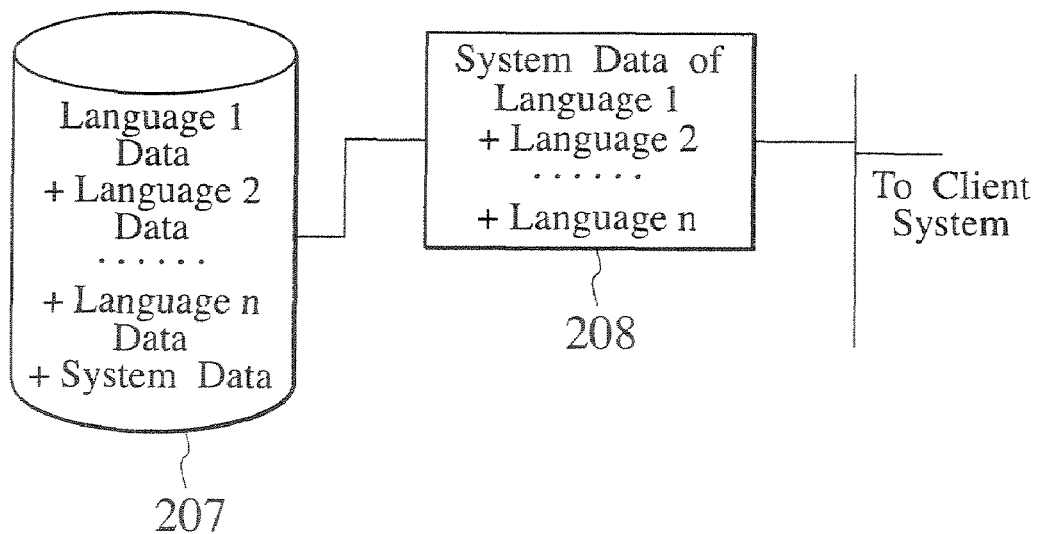
FIG. 3 is an organization diagram in which a single server is provided for the respective languages with multilingual data and system data in accordance with a prior art technique.
Figure 4:
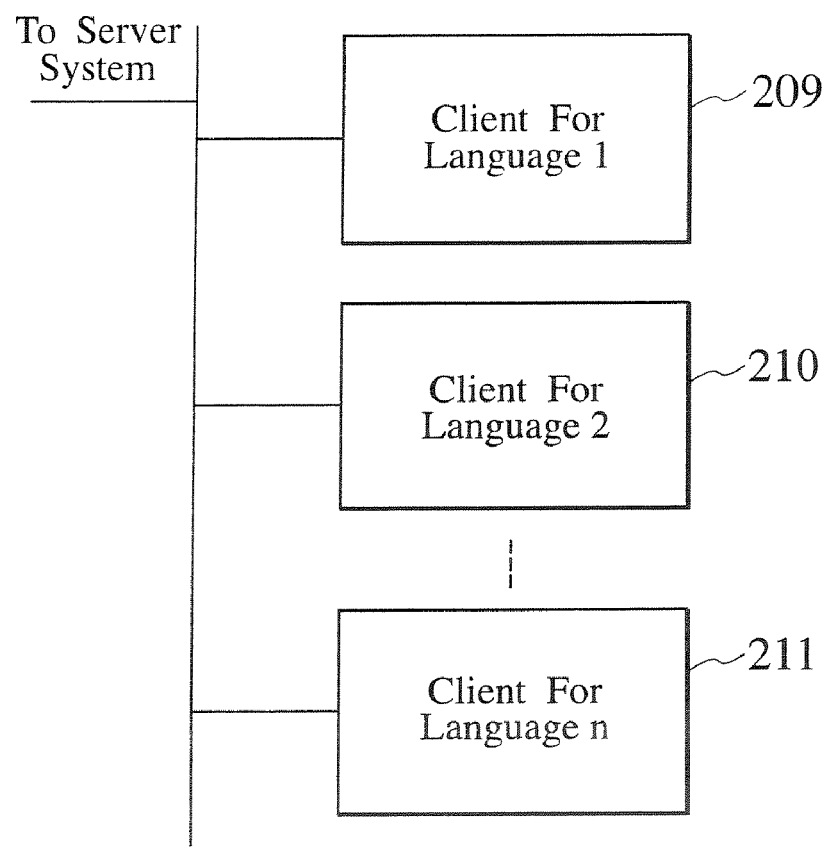
FIG. 4 is an organization diagram in which a separate client is provided for each language in accordance with a prior art technique.
Figure 5:
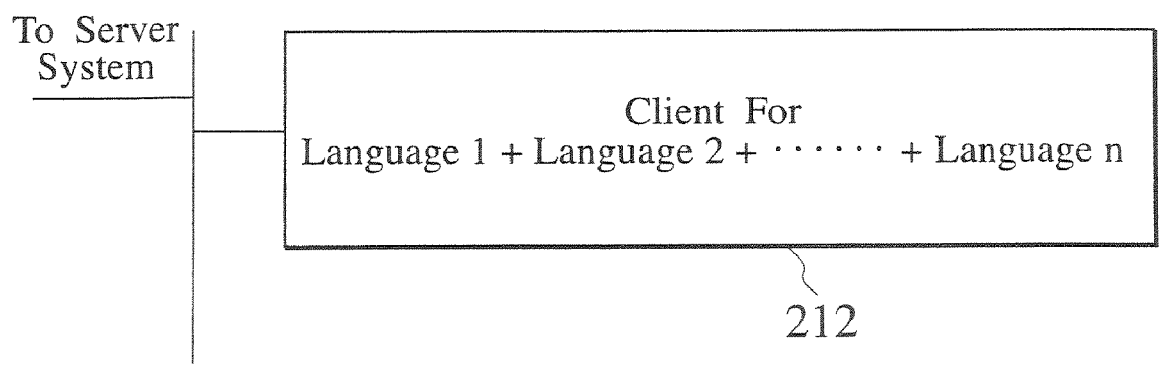
FIG. 5 is an organization diagram in which a single client is provided for the respective languages to process multilingual data in accordance with a prior art technique.
Figure 6:
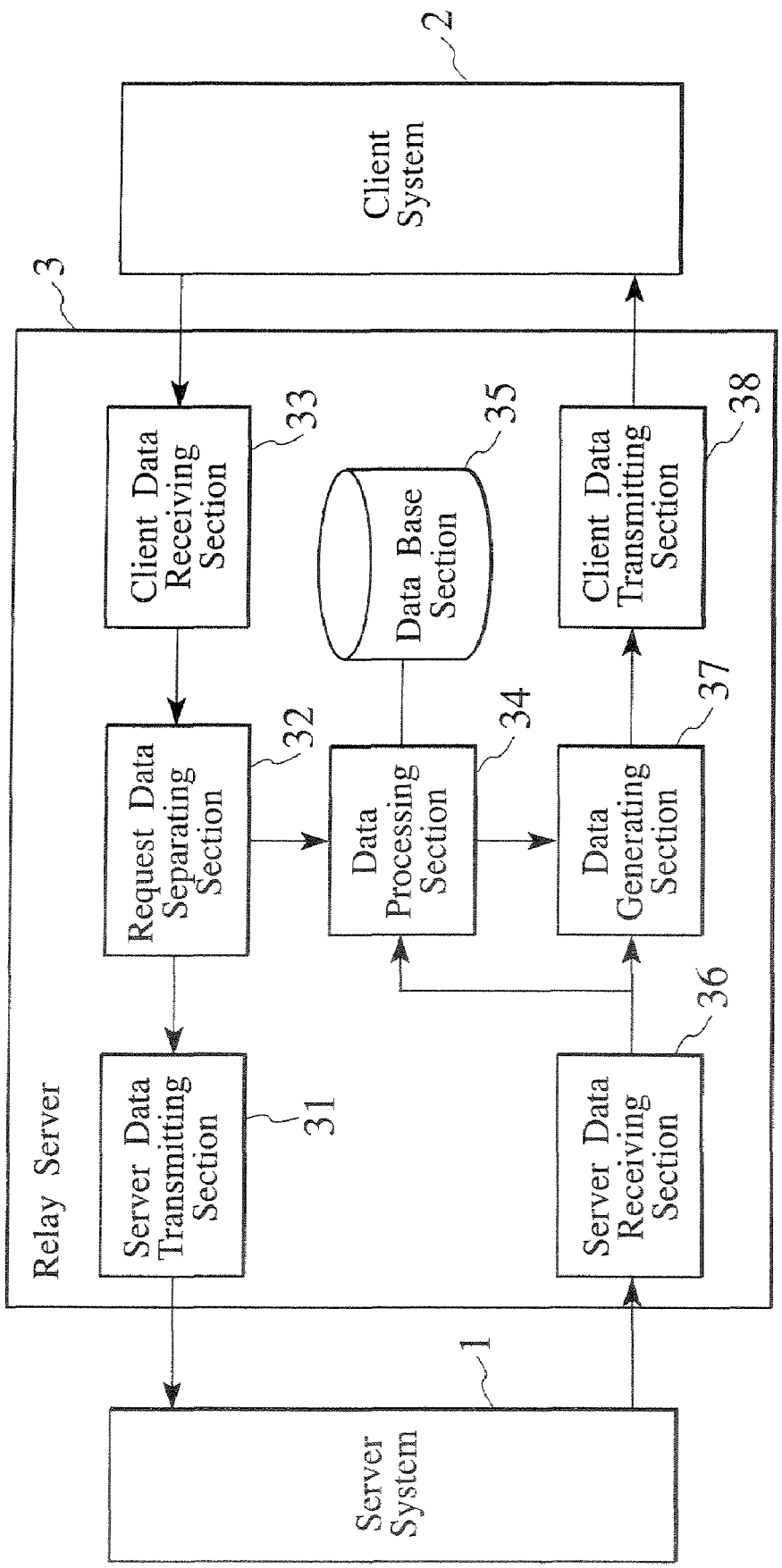
FIG. 6 is an organization diagram showing a data relay system in accordance with a first embodiment.
Figure 7:
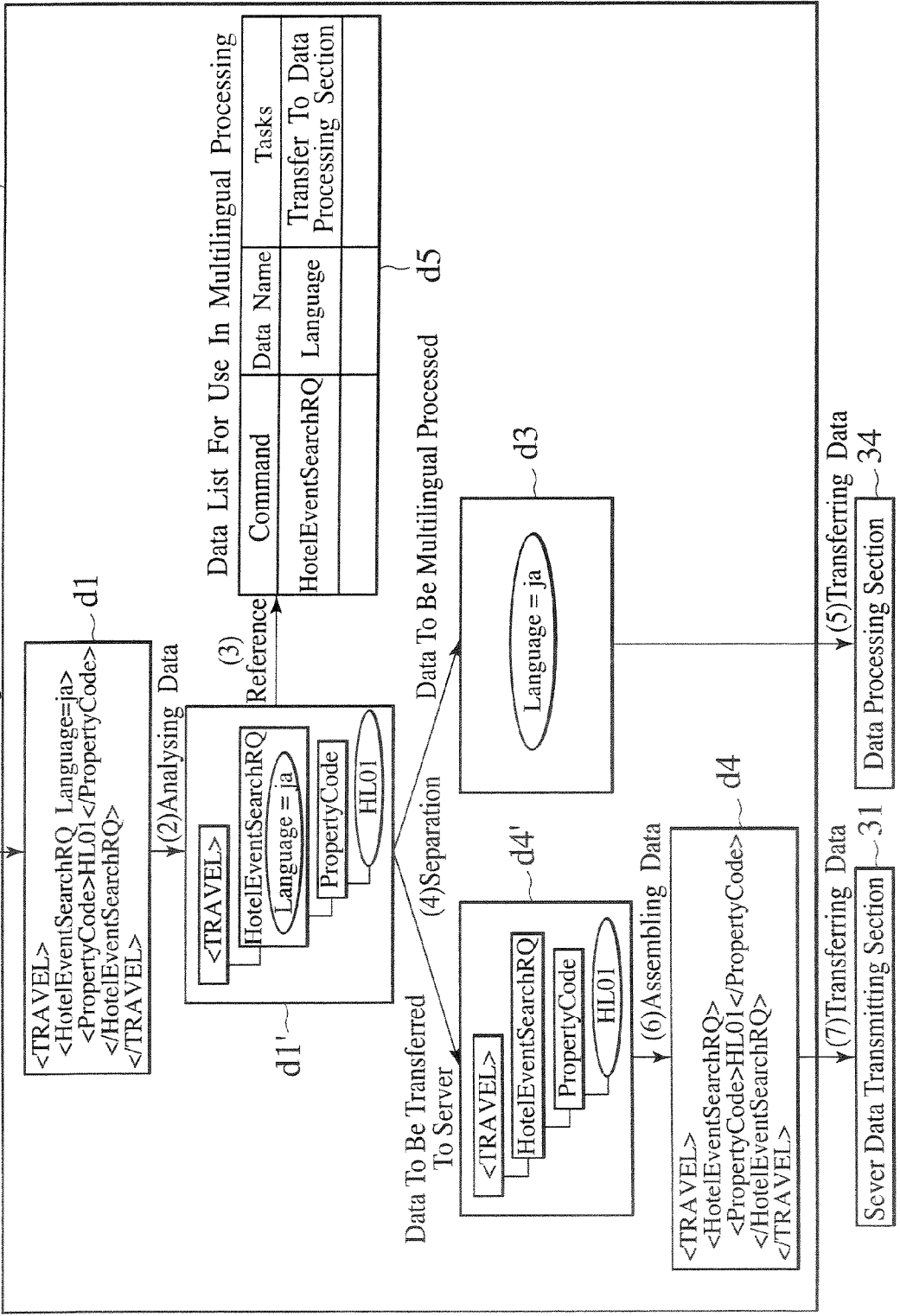
FIG. 7 is a block diagram for explaining the operation of a request data separating section when multilingual information is referred to in accordance with the first embodiment.

A first embodiment of the data relay server in accordance with the present invention will be explained. FIG. 6 is a block diagram showing the configuration of the data relay server in accordance with the present embodiment. As illustrated in the same figure, the data relay server in accordance with the present embodiment includes a relay server 3 located between an existing server system 1 and an existing client system 2 in order to enable the existing server system 1 to be used in different languages.

It is assumed that the server system 1 is provided with a database server capable of handling a certain language while the present embodiment will be explained with a "hotel booking system", as an example, which is provided for managing hotel information and reservation information in English. Information handled by the server system 1 includes reservation information such as hotel names, guest's names, accommodation dates, the numbers of guests and so forth which are registered by the client system 2, and hotel information such as accommodation plans, restaurant information and so forth which are provided by the hotel. All the information is managed in English. On the other hand, the client system 2 is provided for enabling not only users in English-speaking countries but also users in Asia, Europe and so forth other than English-speaking countries to make procedures such as reservation in the native languages of the respective user.

The relay server 3 in accordance with the present embodiment is provided for registering and referring to multilingual information (language-dependent data other than English). In the case of the present embodiment, a hotel booking system will be explained as an example to perform a process wherein hotel information can be referred to with a hotel code as a keyword for searching, a process wherein hotel information is registered in Japanese and the like process. Meanwhile, the relay server 3 in accordance with the present embodiment can be implemented by running in a server a data relay program in accordance with the present invention.

Figure 17:
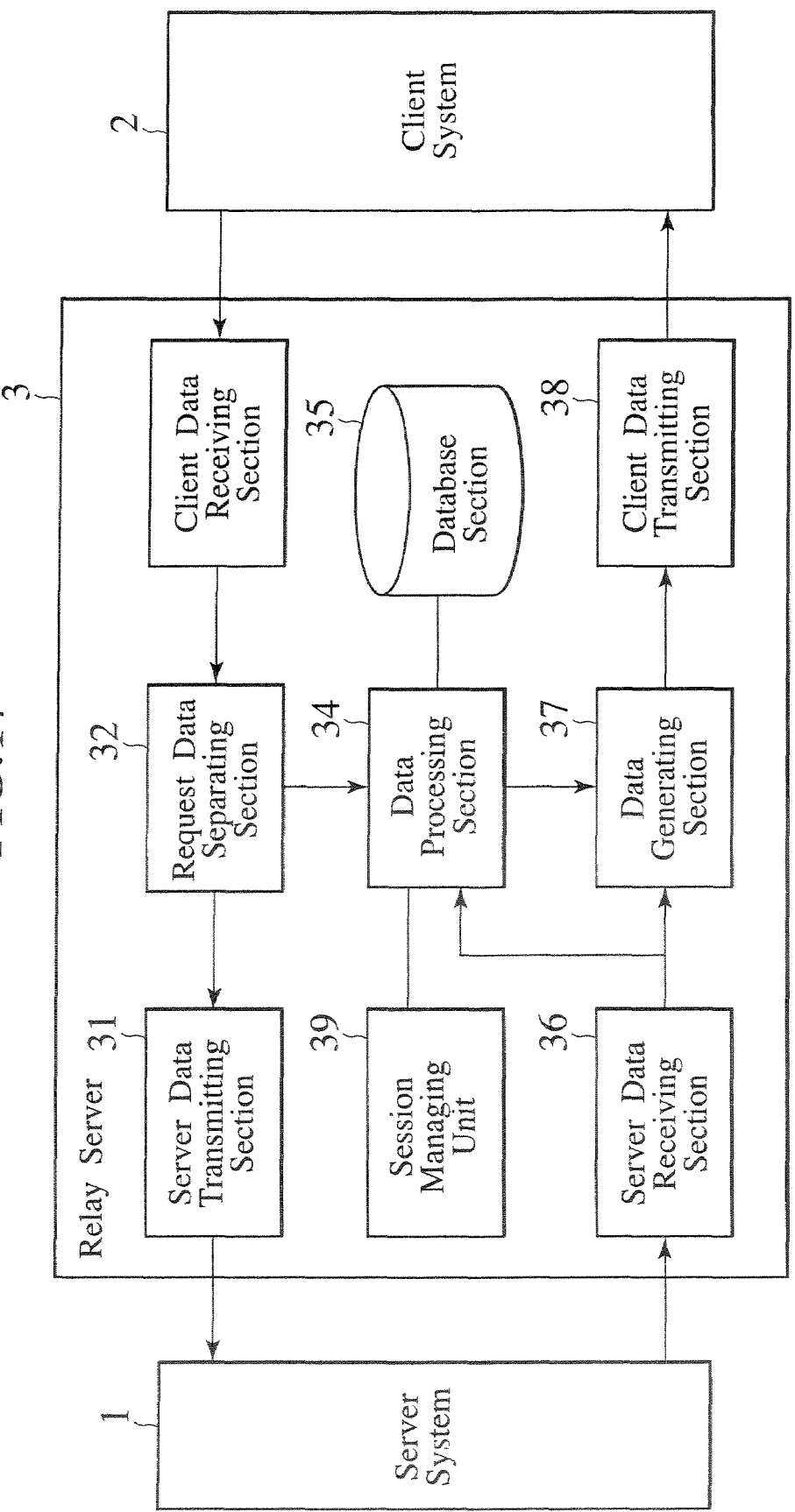
FIG. 17 is a block diagram showing an exemplary modification of the data relay system in accordance with the first embodiment.

More specifically speaking, as illustrated in FIG. 6, implemented in this relay server 3 by running the data relay program therein are a server data transmitting section 31, a request data separating section 32, a client data receiving section 33, a data processing section 34, a database section 35, a server data receiving section 36, a data generating section 37 and a client data transmitting section 38. Meanwhile, in this description are explained also an example where a session managing unit 39 is provided in order to manage sessions occurring between the client system 2 and the server system 1 as illustrated in FIG. 17.

The server data transmitting section 31 serves to transmit data from the relay server 3 to the server system 1, and connected to the request data separating section 32 in this embodiment of the present invention in order to transmit request data as obtained from the client system 2 to the server system 1 through the request data separating section 32.

The request data separating section 32 is connected the client data receiving section 33 for extracting first identification information for identifying language-dependent data contained in the request data as obtained, analyzing the request data from the client system 2, transmitting the request data as analyzed through the server data transmitting section 31 to the server system 1, and transmitting the identification information as extracted to the data processing section 34. The request data separating section 32 also has functions to delete language-dependent data which cannot be recognized by the server system 1 and to add dummy data pseudo data) in place of the language-dependent as deleted.

The request data separating section 32 is provided with data list for use in multilingual processing. This data list is used to store data names, commands and process specifications in the form of tables for extracting second identification information which is required for identifying language-dependent data.

The client data receiving section 33 serves to obtain request data from the client system and to transfer the request data as obtained to the request data separating section 32.

The data processing section 34 has functions as a searching section for detecting replacement data from the database section 35 on the basis of the first and the second identification information for identifying language-dependent data contained in request data and server data. This data processing section 34 also has functions to replace language-dependent data by pseudo data as replacement data and to extract language-dependent data, pseudo data and replacement data contained in the server data as obtained.

The database section 35 serves to store replacement data obtained by translating language-dependent data into data in another language(s) and identification information for accessing items of the replacement data in correspondence with the language-dependent data in association with each other. In accordance with this embodiment, the database section 35 includes tables in which replacement data is associated with language designation information as the first identification information, for example, language codes and so forth as designated by the client and language-dependent data as the second identification information, for example, hotel codes, reservation numbers and so forth as given from the server 2.

The above described request data and server data include language-independent data which need not be translated in the other language such as "numerical/symbol information" and the like, and language-dependent data which has to be translated in the other language such as "letter information". For example, the dates of accommodation and the numbers of guests are "numerical/symbol information" and therefore language-independent data while the names of hotels and the name of guests having reserved are "letter information" and therefore language-dependent data. The relay server 3 is responsible for managing "letter information" as translated in multiple languages while the existing server system is responsible for managing the other "numerical/symbol information".

In accordance with this embodiment, the database schema of the database section 35 is a subset of the database schema of the server system 1. However, it is not required to make the schema a subset as long as the English data in the existing server system is associated with the multilingual data in the relay server.

Also, language keys are added to the respective tables as stored in the database section 35 for the purpose of managing language information relating to a plurality of languages. For example, a country name table includes language codes in addition to country codes and country names. Even with the same country code "1" are registered "アメリカ" in the case where the language code is "ja" and "美國" in the case where the language code is "zh". In this case, since a variety of languages are handled on a single database, information may be stored in Unicode inside of the database. Alternatively, there may be provided a separate database for each language.

Relating to the physical configuration of the system, the relay server 3 and the database section 35 can be implemented within the same machine or separately implemented within different machines respectively. Furthermore, the database section 35 can be distributed implemented within a plurality of machines.

The server data receiving section 36 serves to obtain server data from the server system and transfer the server data as obtained to the data processing section 34 and the data generating section 37.

The data generating section 37 serves to replace data items, which can be replaced, with respect to server data (response data) as obtained from the server system 1 to generate data to be transferred to the client system 2 wherein language-dependent data and pseudo data are replaced by corresponding language-dependent data and/or wherein language-dependent data is added to language-dependent data and pseudo data. Also, this data generating section 37 has a function to use language-dependent data transmitted from the server data as it is if there is no available corresponding language-dependent data.

The client data transmitting section 38 serves to transmit the response data as generated by the data generating section 37 to the client system 2.

Meanwhile, the session managing unit 39 as illustrated in FIG. 17 is connected to the data processing section 34 and receives and stores log-in information, the language information as designated and the like of a client in order to identify the client when the relay server 3 is accessed with a plurality of requests.

(Operations of the Respective Components)

The operations of the respective components of the data relay server having the above-described configuration will be explained. FIG. 7 through FIG. 11 are drawings for explaining the operations of the present system when multilingual information is registered or referred to.

1. Reference to Multilingual Information:

In what follows is explained the procedure for referring to replacement data as registered in the database section 35 as described above.

When a user transmits request data for a service from the client system 2 to the relay server 3 while a language is designated, the client data receiving section 33 receives this request data and transfer it to the request data separating section 32. Since a language is designated by this user, a language code is transmitted to the relay server 3 as the first identification information.

When a request data d1 for designating the language is received, the request data separating section 32 analyzes the request data d1 to obtain data d1' which is easily handled by internal processing and separates a language code d3 which is processed by the relay server 3 and a language-independent data d4 which is removed this language code d3 to be transferred to the server system 1 with reference to a data list d5 for use in multilingual processing.

That is, the "Language" information as contained in the "HotelEventSearchRQ" corresponds to the language code d3. The language code d3 is transferred to the data processing section 34 while the language-independent data d4 generated by deleting the language code d3 is created in order to conform with the interface of the server system 1 and transferred to the server data transmitting section 31. The server data transmitting section 31 serves to transmit the language-independent data d4 to the server system 1. The server system 1 serves to process the data d4 as received and return data d2 to the relay server 3.

Figure 8:
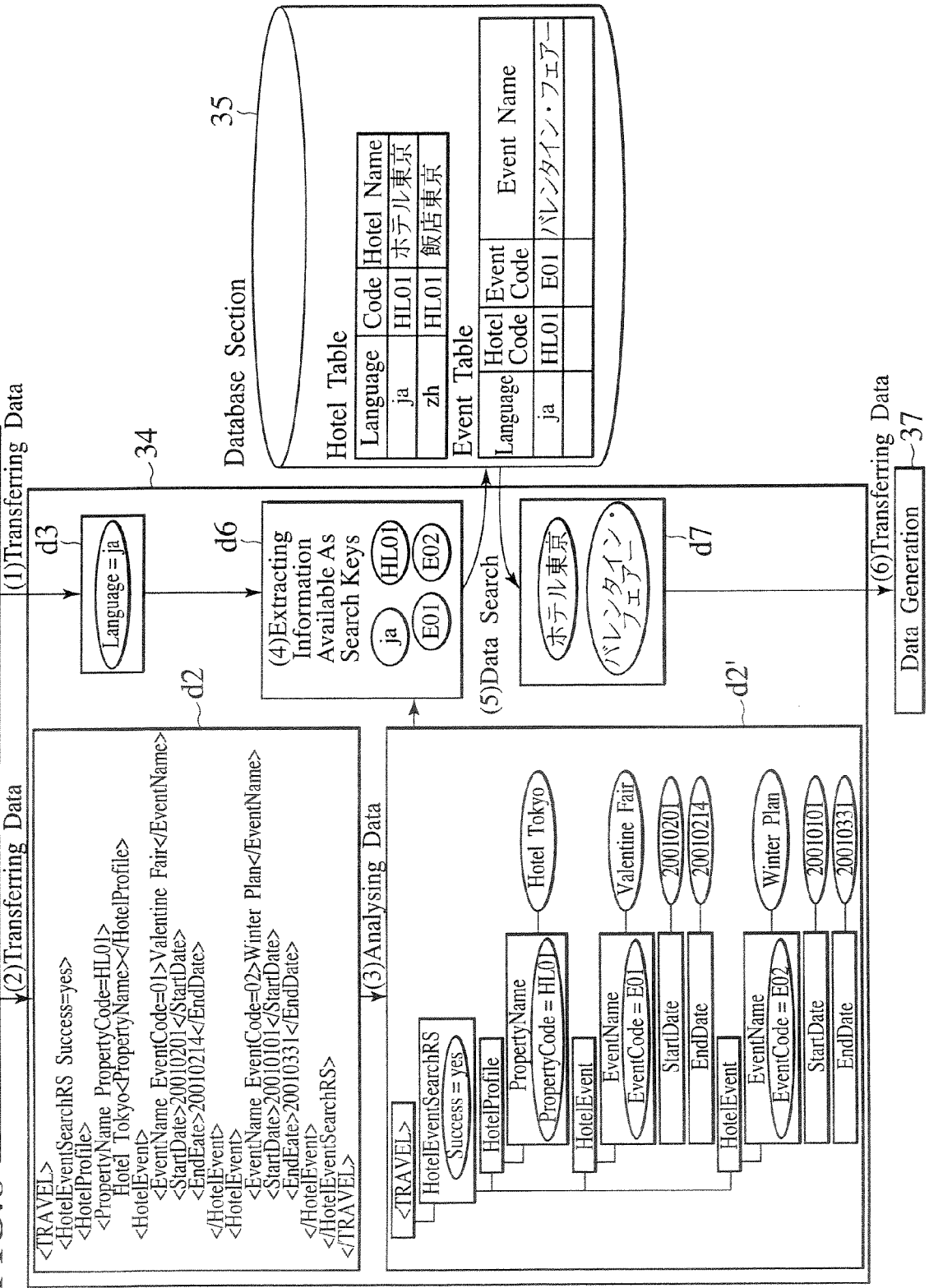
FIG. 8 is a block diagram for explaining the operation of a data processing section when multilingual information is referred to in accordance with the first embodiment.

The response data d2 as transmitted from the server system 1 is transferred to the data processing section 34 through the server data receiving section 36 as illustrated in FIG. 8. The data processing section 34 serves to analyze the response data d2 to obtain data in a format which is easily handled by internal processing and extract the second identification information d6 (a hotel code "HL01" and two event codes "E01" and "E02") functioning as searching keys together with the information as received from the request data separating section 32.

As illustrated in the same figure, the searching keys d6 comprises the language code d3 ("ja") as received from the request data separating section 32, the hotel code "HL01" and two event codes "E01" and "E02" as received from the server system and so forth are used to from the searching keys d6 in combination. Next, by the use of these searching keys d6, the corresponding replacement data is obtained from the database section 35. The language information "ja" and the hotel code "HL01" are used as keys to extract Japanese replacement data d7, i.e., "ホテル東京",from a hotel table. If Chinese "zh" is designated in a request from a client, Chinese replacement data d7, i.e., "飯店東京",is obtained. On the other hand, from the language information "ja", the hotel code "HL01" and the event codes "E01" is obtained Japanese replacement data, i.e., "バレンタイン・フェアー".There is no Japanese data corresponding to the event codes "E02" so that no information is obtained. These data items d7 as obtained are transferred to the data generating section 37.

Figure 9:
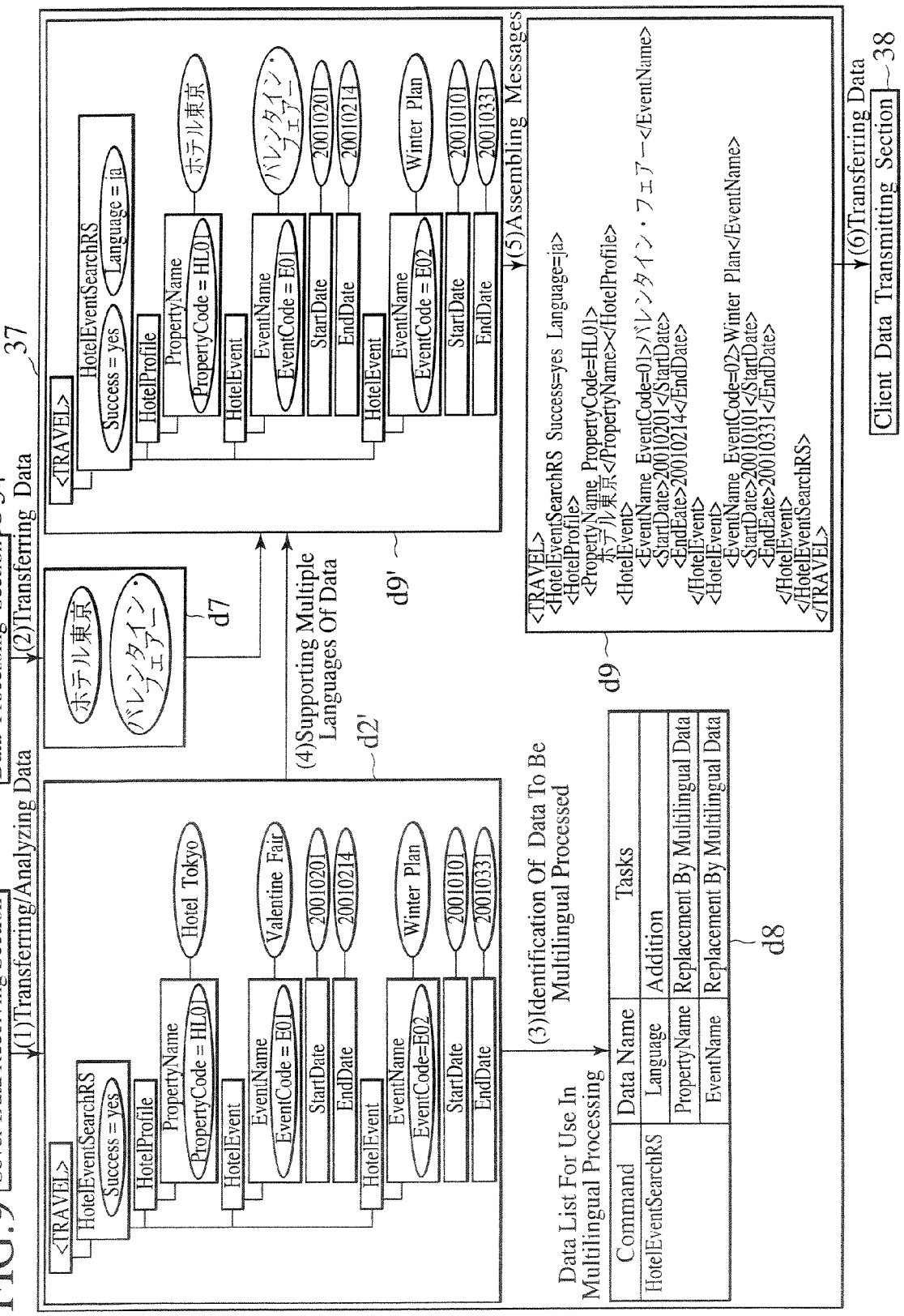
FIG. 9 is a block diagram for explaining the operation of a data generating section when multilingual information is referred to in accordance with the first embodiment.

Next, as illustrated in FIG. 9, the data generation section 37 receives the response data d2 from the server data receiving section 36, analyzes the request data d2 to obtain data d2' which is easily handled by internal processing and confirms data items to be translated in the other language with reference to the data list d8 indicative of items to be used in different languages. In this case, the language information, the hotel names and the event names are data items to be translated in the other language. Next, these data items to be translated in the other language are replaced by the replacement data d7 as received from the data processing section 34 to generate data d9. In accordance with the data list d8, the process as designated of the language designation information (Language=ja) is "addition" so that language information is added to the original response data d2. The process as designated of other items, i.e., the hotel names and the event names is "replacement by multilingual data" so that the original English response data d2', i.e., "HOTEL Tokyo" and "Valentine Fair" is replaced by corresponding Japanese data. In this case, there is no corresponding Japanese data to the event "Winter Plan" so that the English data is used as it is. Next, the data d9 is created from data d9' in order to conform with the interface of the client system 2 and transferred to the client data transmitting section 38.

By this configuration, it is possible to replace the English response data d2' as output from the server system 1 in response to the request from the client system 2 by Japanese data d9 and output it to the client system 2.

2. Registration of Multilingual Information:

In the case of the present system, it is necessary to register multilingual information (replacement data) in the database section 35 in association with the first and second identification information in advance for providing services.

Figure 10:
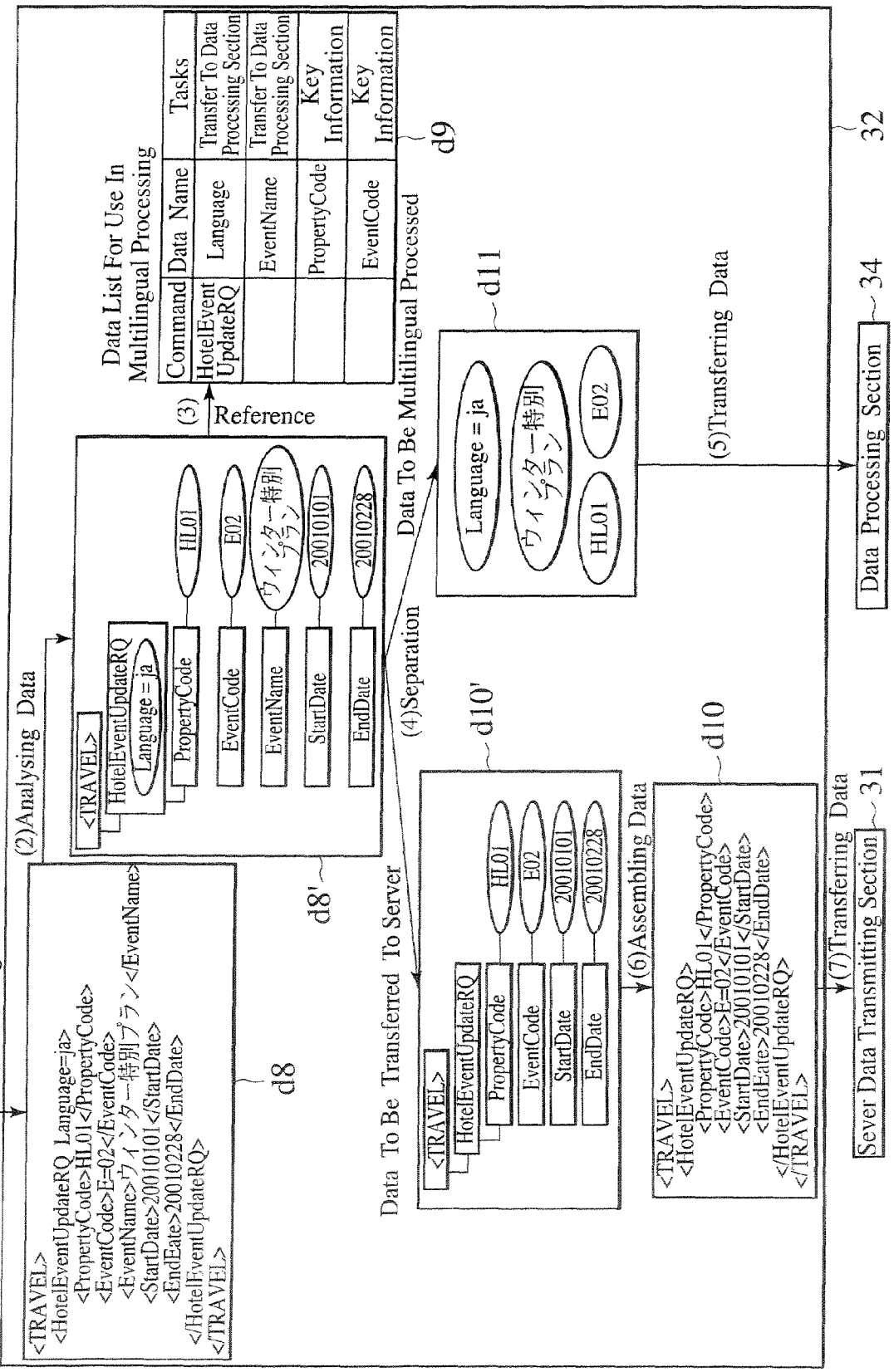
FIG. 10 is a block diagram for explaining the operation of the request data separating section when multilingual information is registered in accordance with the first embodiment.

As illustrated in FIG. 10, when there is a request from the client system 2 for registering replacement data, the client data receiving section 33 transfers the request data d8 (message) as received from the client system 2 to the request data separating section 32.

When a request data d8 for registering replacement data is received, the request data separating section 32 analyzes the request data d8 to obtain data d8' which is easily handled by internal processing and extracts data d11 required for registering the multilingual information in the relay server 3 with reference to a data list d9 for use in multilingual processing.

That is, in this case, the key information "ja", "HL01" and "E02" is extracted as the first and second identification information as well as Japanese data "ウィンター特別プラン"which is replacement data to be registered in the relay server 3. On the other hand, since data transferred to the server system 1 can not includes language-dependent data, the data "ウィンター特別プラン"as language-dependent data and "Language=ja" as the first identification information are extracted therefrom and transmitted to the data processing section 34 while the remaining data d10' is arranged in order to conform with the interface of the server system and transferred to the server data transmitting section 31 as data d10. The server system 1 serves to process the data d10 as received and return data d13 to the relay server 3.

Figure 11:
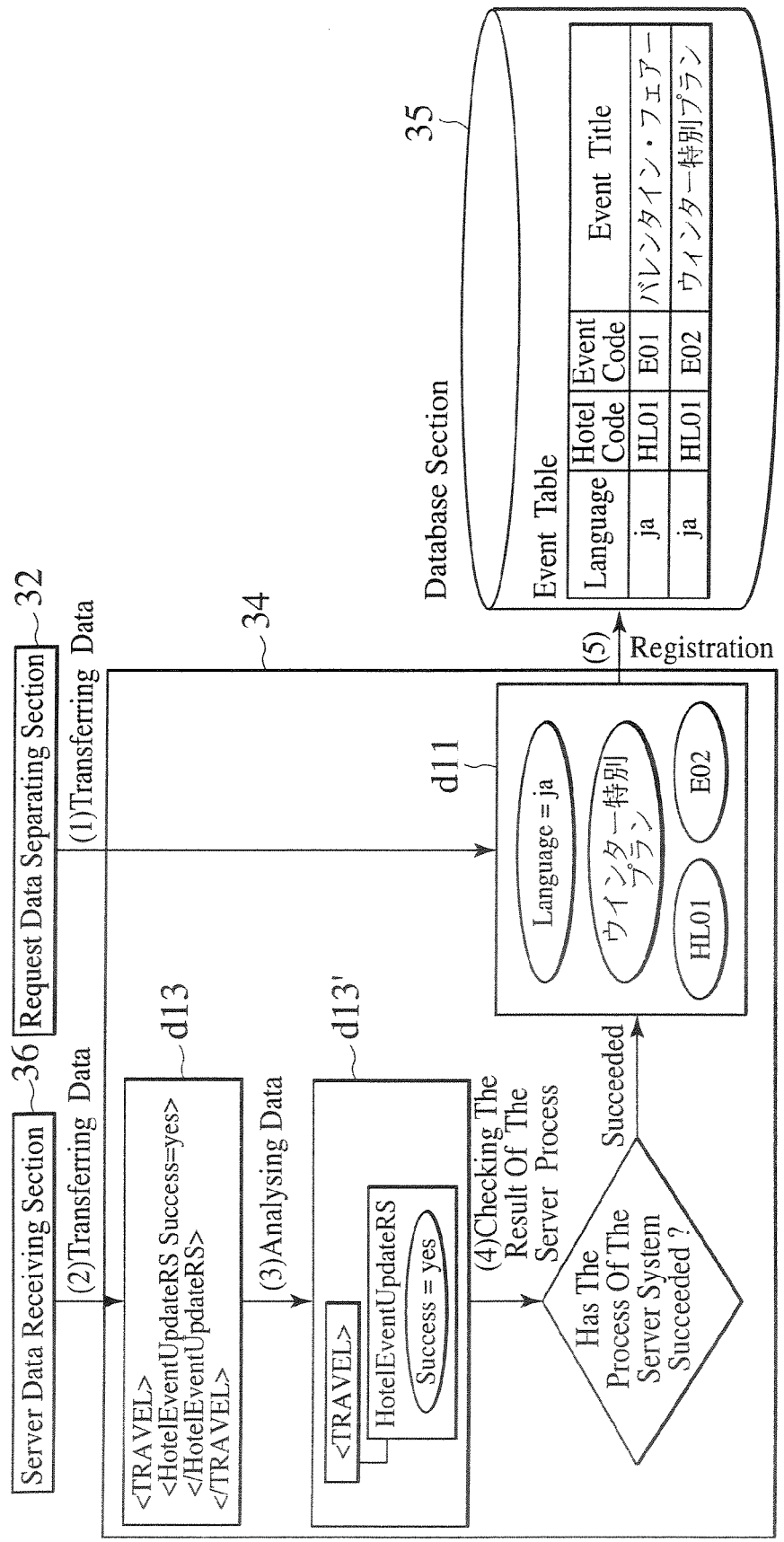
FIG. 11 is a block diagram for explaining the operation of the data processing section when multilingual information is registered in accordance with the first embodiment.

Thereafter, as illustrated in FIG. 11, the response data d13 as transmitted from the server system 1 is transmitted to the data processing section 34 through the server data receiving section 36. The data processing section 34 serves to analyze the response data d13 to obtain data d13' in a format which is easily handled by internal processing and confirm whether or not the registration process has succeeded. If the process by the server system 1 has failed, the relay server 3 does not conduct the registration process. If the process by the server system 1 has succeeded, as illustrated in FIG. 11, the data d11 including key data and replacement data as received from the request data separating section 32 is registered in the database section 35.

The data generating section 37 then judges that it is not necessary to replace the response data as received from the server data receiving section 36 by replacement data, and therefore transmits the received data to the client system 2 through the client data transmitting section 38 as it is.

In this manner, by separately registering the replacement data for the multilingual processing in the relay server 3 and the other language-independent data in the server system 1, it becomes possible to register Japanese data transmitted from the client system 2 without a need for particular modification of the server system 1.

Also, several examples are given here about the method of registering multilingual information.

(1) The Case where "Letter Information" and "Numerical/Symbol Information" are Separately Registered:

In the case where English information such as a hotel name and an address has already been registered in the server system 1, a user begins registration of new Japanese data by logging on while designating "Japanese". Next, the current hotel information is acquired by accessing a "hotel information update" menu. Since there has been registered no Japanese data yet, all the information is displayed in English, e.g., "Hotel Tokyo". In this page, Japanese data such as "ホテル東京" is entered to an item which has been given a "multilingual" marking, followed by clocking an "Update" button. Of course, it is possible to update any numerical value such as a check-in time at the same time.

The relay server 3 may therefore receive Japanese letter information as well as numerical/symbol information at the same time. The relay server 3 serves to separate "letter information" and "numerical/symbol information", store the letter information in the relay server 3 and transmit only the numerical/symbol information to the server system 1.

(2) The Case where Dummy Data is Registered in the Server System:

In many cases, depending upon the specification of the server system 1, there is provided an "Indispensable Input Item" when registering or updating information. If the server system 1 requires input of a certain letter information item as an indispensable input item, it is not compatible with the above described technique in which the letter information of language-dependent data is extracted while only the numerical/symbol information is transmitted to the server system 1. For example, this is true when requiring, as an indispensable input item, the name and the residence of a guest who wants to reserve a hotel room.

In this case, the relay server 3 transfers, as data corresponding to the name and the residence, additional English dummy data pseudo data) to the server system 1. In accordance with this configuration, while the dummy data which is unrelated to the actual name and the actual residence is registered, there is no problem since when the information is accessed the dummy data is replaced by the actual name and the actual residence in Japanese in advance of returning to the client.

(3) The Case where Both English Data and Japanese Data are Input at the Same Time:

Another system than "the hotel booking system" may make use of the database section 35. For example, a customer management system which is not supporting multiple languages may refer to the database section 35. The customer management system accesses a variety of information with the name of a reserving guest as a key, and therefore cannot operate with dummy data. In this case, while the names can be handled as monolingual data, it is also possible to input a name both in English and in Japanese.

When receiving a name both in English and in Japanese, the relay server 3 treats the same "letter information" by saving the Japanese data in the relay server and transferring the English data to the server system 1.

(4) The Case where Data is Registered Only in the Relay Server:

While it is assumed in the above described three cases that the registration information as transmitted from the client system 2 includes both "letter information" and "numerical/symbol information", there is a case where only "letter information" is updated, depending upon the type of information.

In this case, the relay server 3 has no numerical/symbol information to be transferred to the server system 1 and therefore returns a response to the client system 2 after saving the letter information in the relay server 3 without opening a session with the server system 1.

(5) Another Registration Case:

While residences are stored in the relay server 3 both in Japanese and in English in association with corresponding postal guide numbers in advance, a Japanese residence is registered in the relay server 3 while an English residence is registered in the relay server 3 with reference to the postal guide number as input by a reserving guest. By this configuration, it is not necessary to register a dummy residence in the server system.

(Data Relay Method by the Use of a Data Relay System)

The data relay method by the use of the data relay server in accordance with the present embodiment of the configuration and the operation as described above comprises the following steps. FIG. 12 through FIG. 16 are flow diagrams showing the procedure of the data relay method in accordance with the present embodiment. Meanwhile, in the case of the present embodiment, a hotel booking system will be explained as an example of a data relay technique.

That is, in this case, a hotel booking system is provided in order to support multiple languages, enabling the registration of and the reference to hotel information and the registration of and the reference to reservation information in Japanese. Also, it is assumed here that the client system 2 may be representative of two types of users, i.e., hotel-side users to register hotel information with a dedicated terminal and representative service providers to accept telephone calls from users of hotels in general and carry out the reservation procedure with a dedicated terminal for the users in general.

1. User Authentication:

First of all, a user has to input his ID/password to the client system 2 in advance of making use of the hotel booking system. The relay server 3 does not have user authentication functionality and therefore transfers request data as received from the client system 2 for logging in to the server system 1 as it is. The server system 1 serves to perform the user authentication in accordance with the request data as received and return the result to the relay server 3.

The relay server 3 saves the result of the user authentication as received from the server system 1 in the session managing unit 39 as illustrated in FIG. 17 and transmit the data to the client system 2. When accessed by the same user next time, the relay server 3 judges whether the access is accepted or denied on the basis of the result of the user authentication as saved. By this configuration, it is avoided to redundantly perform user management by the existing server system 1 and the relay server 3. Meanwhile, in the case where the server system 1 does not perform user authentication, the relay server 3 may perform own user authentication. Alternatively, it is possible to completely dispense with user authentication.

Furthermore, during user authentication, it is possible to designate a "language" for use in this session. More specifically speaking, the relay server 3 may open a dialog box for selecting a language to prompt to input a language. The language designation is associated with a request for user authentication and transmitted together to the relay server 3 as the first identification information of a language code.

When receiving the request for user authentication as well as a language code, the relay server 3 extracts language-dependent data from the request data to transfer the remaining language-independent data to the server system 1.

At this time, the relay server 3 judges whether or not the language is supported with reference to the language code as received, and, if not supported, returns a response indicative of an error to the client system 2. If the language is supported by the relay server 3, the relay server 3 saves the language information in the session managing unit 39 together with the result of the user authentication and makes use of the language information to handle requests from the same user until log-out.

Meanwhile, if the language information is not designated by the client system 2, the language used by the server system 1 is selected as a default language. In this case, the relay server 3 does not perform any language translation but simply relays data between the client system 2 and the server system 1. Alternatively, a language can be designated not only at log-in but also for each request. By this configuration, it becomes possible that, for example, while the hotel information is referred to in Japanese, the reservation procedure is conducted in English so that a local American can confirm the reservation.

Furthermore, while only a language code is designated in accordance with the present embodiment, it is possible to add a country code to the language code. This make it possible to differentiate American English from British English so that different data formats can be output for American English and British English. Furthermore, the character code set may be switched in addition to the language. By this configuration, it is possible not only to translate English information to Japanese information but also to convert character codes to S-JIS codes, EUC codes and so forth in accordance with the environment of the client.

The server system 1 then performs user authentication on the basis of a request data as received, and when authenticated the result of authentication is transmitted to the relay server 3 as response data. The relay server 3 transfers the response data as received to the client system 2.

Figure 12:
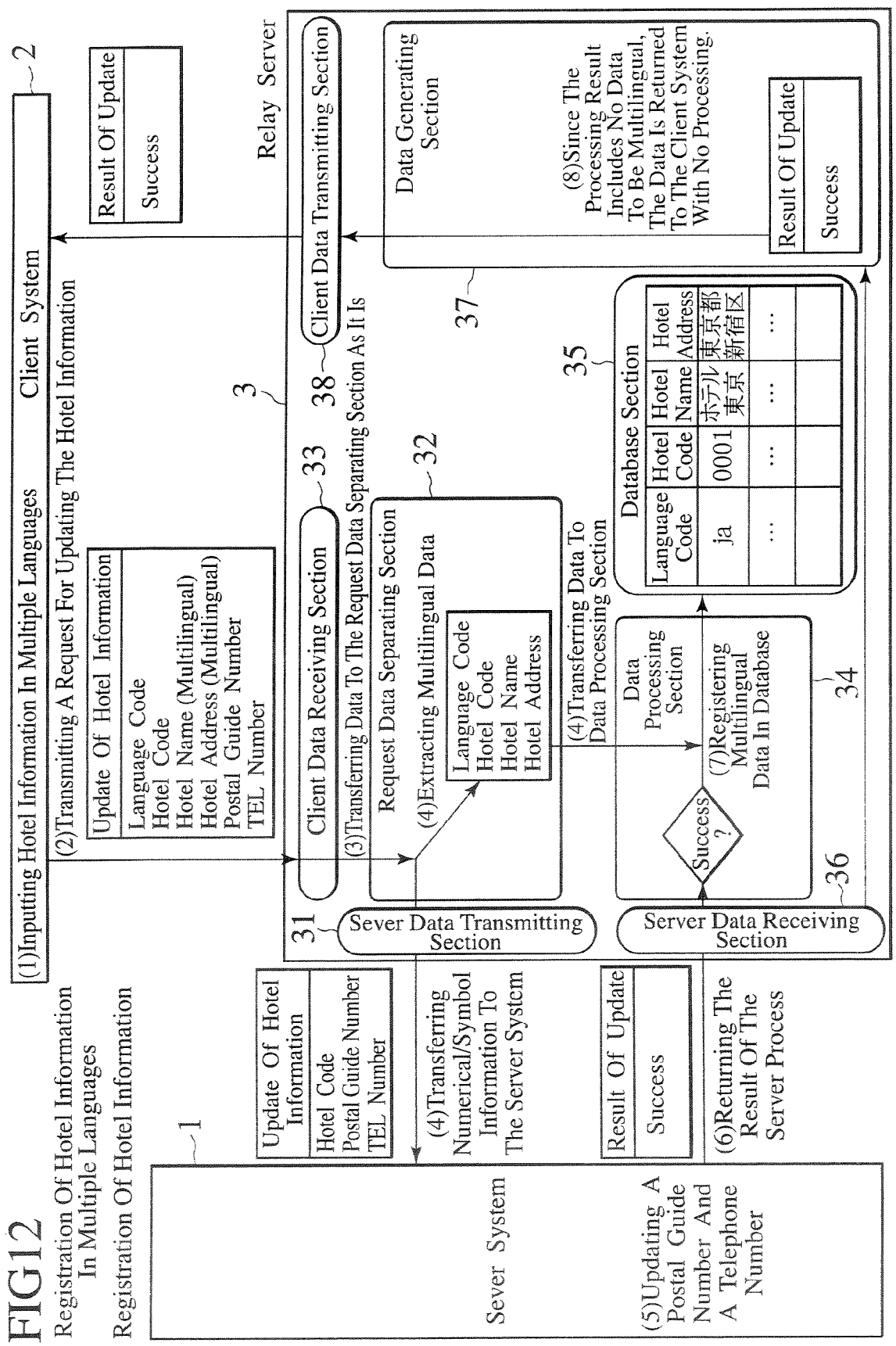
FIG. 12 is a view for explaining the procedure of registering hotel information in accordance with the first embodiment.

2. Registration of Hotel Information in Multiple Languages:

Next, as illustrated in FIG. 12, a hotel-side user has to register hotel information in advance of beginning a reservation acceptance service in Japanese. The user has to conduct user authentication when registering this hotel information.

Next, the user opens the homepage of "Update Hotel Information" from which the page of "Update Hotel Information" is opened through a menu of the homepage. After accessing this page for updating hotel information, the current hotel information as registered is displayed.

The relay server 3 then prompts the user to select a hotel to receive a request for hotel information, i.e., a language code as the first identification information and a hotel code as the second identification information. The language code is transferred to the data processing section 34 while the hotel code is transferred to the server system 1.

After receiving the hotel code, the server system 1 serves to search the hotel information with reference to the hotel code and return English hotel information to the relay server 3. On the other hand, the relay server 3 serves to search the database section 35 for hotel information in the other language as replacement data with the language code and the hotel code as keys.

In this case, since it is assumed that hotel information in Japanese is registered for the first time, no data is extracted because no multilingual data is available yet. When there is no available language-dependent data corresponding thereto, the relay server 3 transfers the English hotel information as received from the server system 1 to the client system 2 as it is. In the page of the user, the English hotel information is displayed.

Next, the user begins the registration of hotel information. Namely, the user rewrites the English hotel information as displayed in the language as designated followed by transmitting a request for update. The relay server 3 then accepts the request for updating the hotel information from the client system 2.

The hotel name and the address have been input with letters as designated by the language code (in this case, Japanese letters used in the client system). The client data receiving section 33 transfers the received data as replacement data to the request data separating section 32 as it is.

The request data separating section 32 then serves to extract the replacement data (the hotel name and the address) and the first and second identification information (the language code and the hotel code) and transfer them to the data processing section 34. On the other hand, the remaining data other than the language-dependent data is transferred to the server system 1. The server system 1 then receives the request for updating the hotel information and updates a postal guide number and a telephone number. The server system 1 returns the result of the updating process to the relay server 3.

The data processing section 34 confirms success of the process by the server system 1, and registers the replacement data and the first and second identification information in the database section 35. If the process by the server system 1 fails, the information for multilingual processing is not registered for the purpose of maintaining the consistency with the server system 1. Since the processing result of the server system 1 includes no multilingual data, the data generating section 37 return the data to the client system 2 with no processing.

3. Representative Service to Carry Out Reservation Procedure in Multiple Languages:

Next, the procedure of a representative service to carry out reservation procedure by the use of the present system will be explained.

Figure 13:
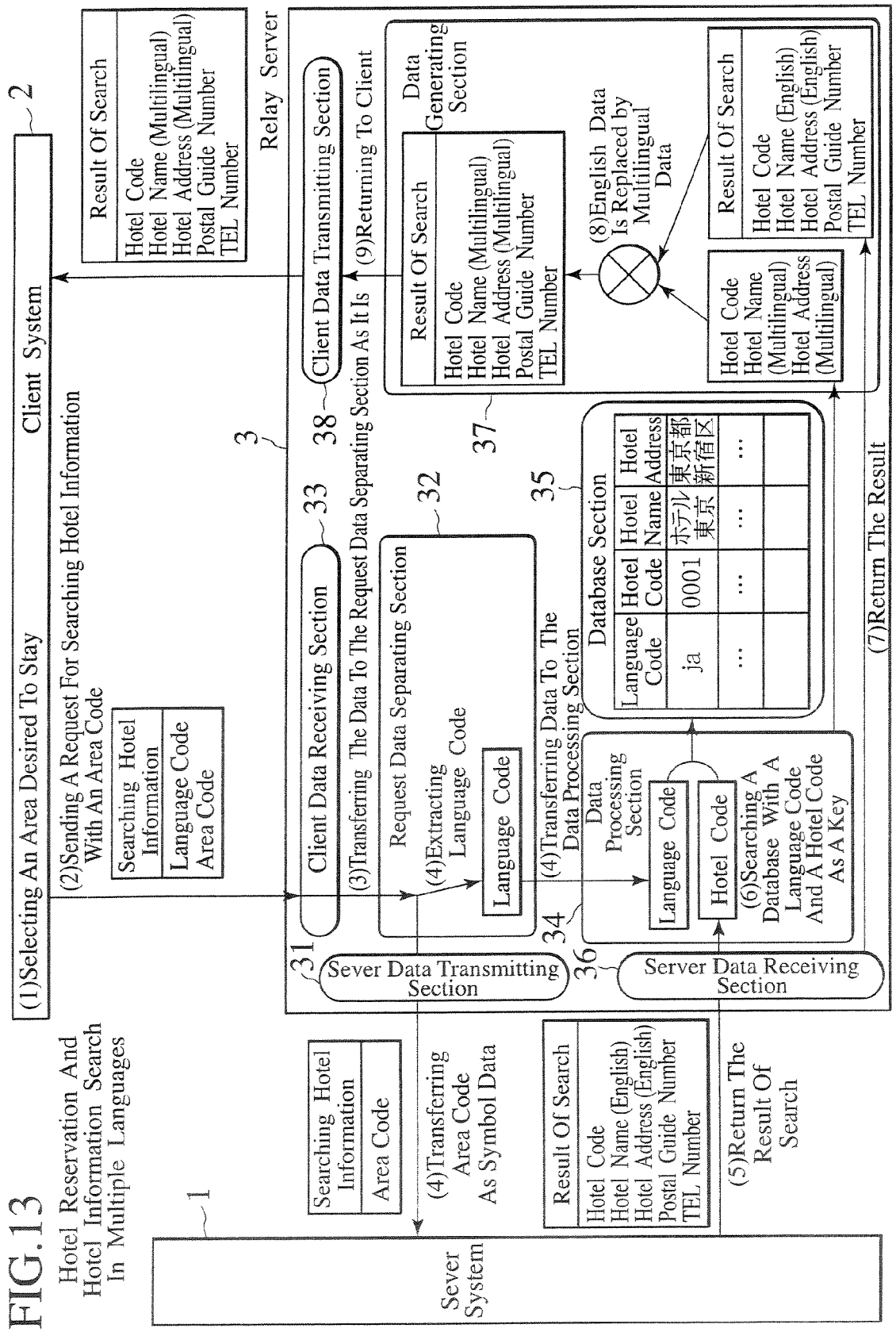
FIG. 13 is a view for explaining the procedure of hotel reservation in accordance with the first embodiment.

(3.1) Hotel Information Search:

First, as illustrated in FIG. 13, the user has to conduct user authentication when making use of the reservation service.

Next, the user searches hotel information. The user selects at the outset an area he desired to stay for searching hotel information. The relay server 3 receives a request for searching hotel information from the client system 2. At this time, a language code and an area code are designated as the first identification information by the client system 2. The client data receiving section 33 transfers the data as received to the request data separating section 32 as it is. The request data separating section 32 extracts the language code and transfers it to the data processing section 34 while the area code is transferred to the server system 1.

The server system 1 returns the English information of hotels (hotel codes and the like) of the area as designated as the second identification information to the relay server 3. The data processing section 34 serves to search the database section 35 for multilingual hotel information (Japanese) as replacement data with the keys of the hotel code contained in the results of searching and the language code as received from the request data separating section 32.

The data generating section 37 receives the English hotel information from the server system 1 and the multilingual hotel information from the data processing section 34. The English information (the hotel name and the address) as received from the server system 1 and contained in the results of searching is then replaced by the multilingual hotel information. The multilingual hotel information list as generated is returned to the client system 2.

Figure 14:
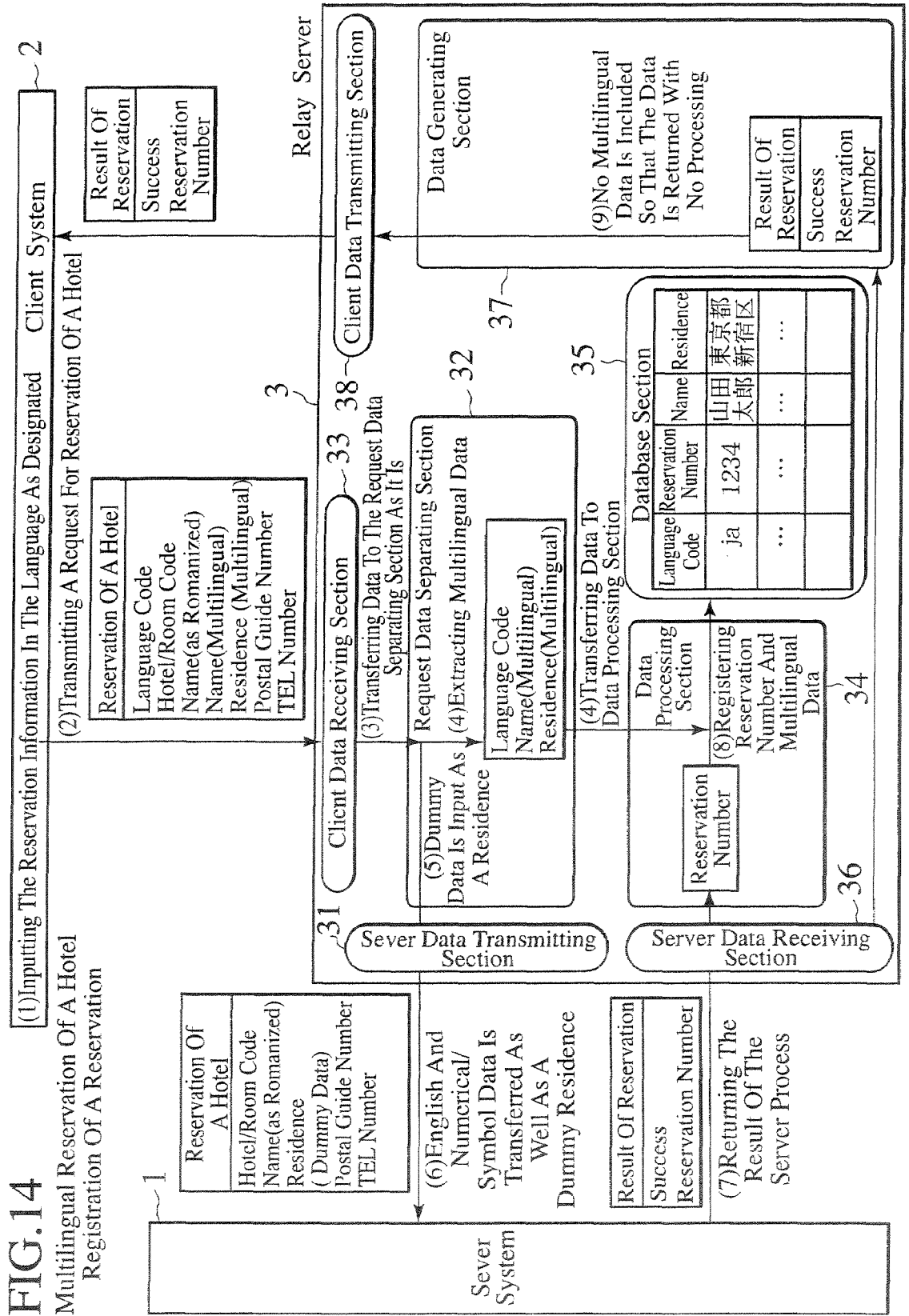
FIG. 14 is a view for explaining the procedure of registering hotel reservation in accordance with the first embodiment.

(3.2) Reservation of a Hotel:

Then, the user registers a reservation. Namely, as illustrated in FIG. 14, the user makes the reservation by inputting the reservation information in the language as designated. At this time, in accordance with this embodiment, the name alone is input both in English and in the other language. The relay server 3 receives a request for executing reservation from the client system 2.

The name and the residence are input in the other language. The client data receiving section 33 transfers the data as received to the request data separating section 32. The request data separating section 32 extracts the multilingual data (the name and the residence) and the language code and transfers them to the data processing section 34. Since the residence is indispensable for the server system 1, dummy data is generated as the residence data.

The numerical/symbol data is transferred to the server system 1 as well as a name written with romanized Japanese words and the dummy data as the residence. The server system 1 returns the result of registering the reservation and a reservation number to the relay server 3. The data processing section 34 then registers the multilingual reservation information in the database section 35 with keys of the reservation number and the language code. Since the processing result of the server system 1 includes no multilingual data, the data generating section 37 return the data to the client system 2 with no processing.

Figure 15:
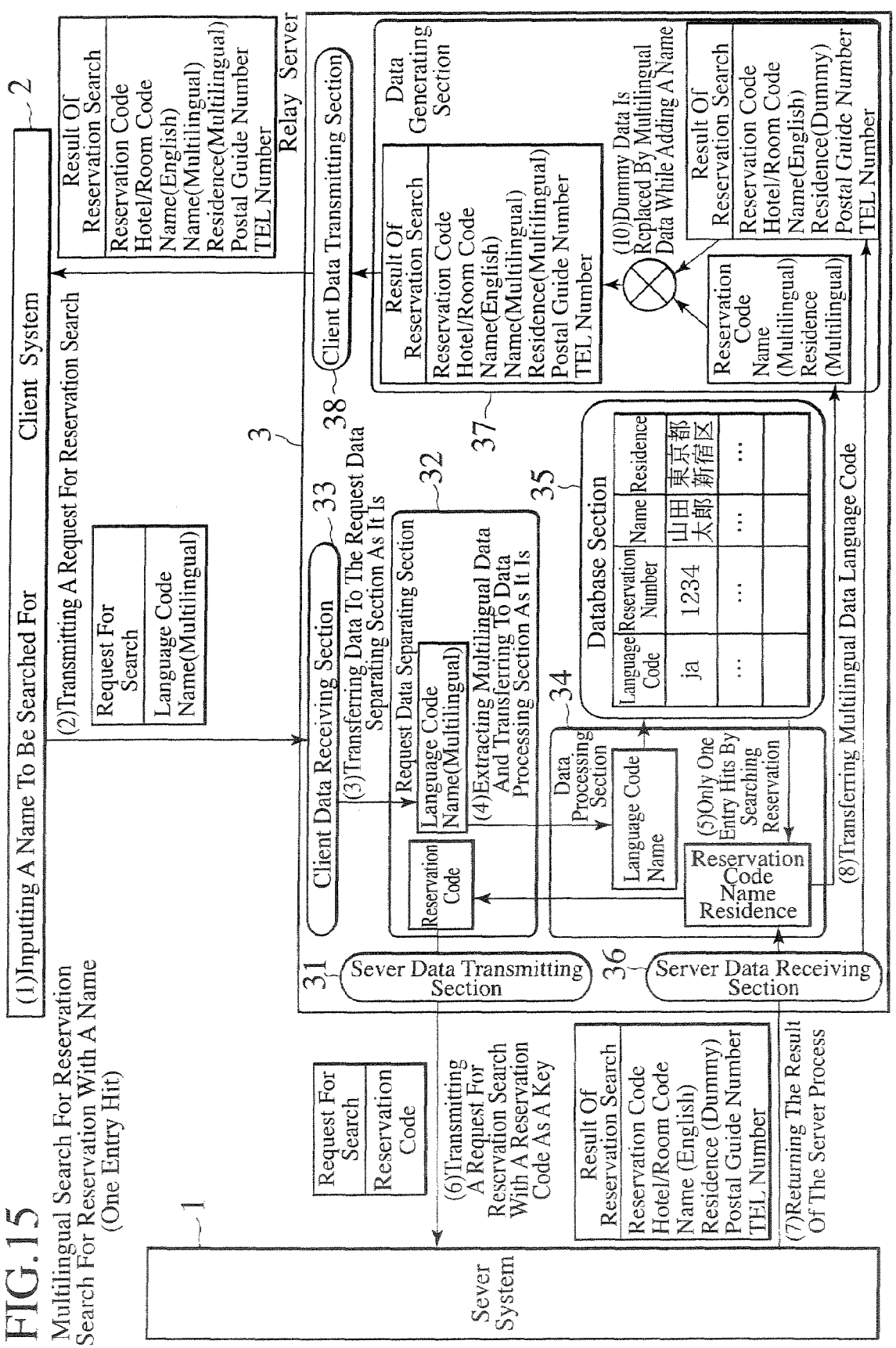
FIG. 15 is a view for explaining the procedure of searching for reservation in accordance with the first embodiment.
Figure 16:
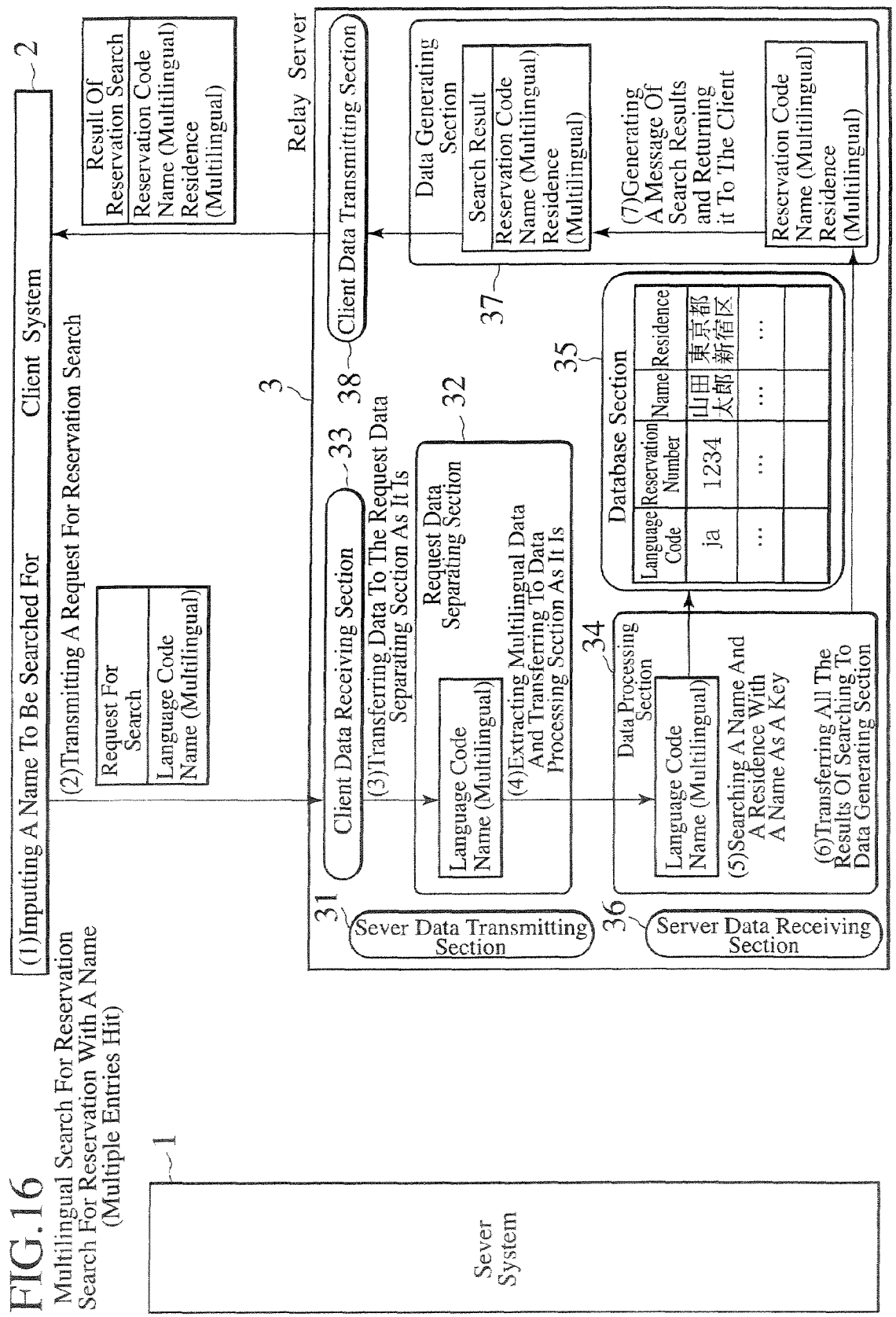
FIG. 16 is a view for explaining the procedure of searching for reservation with reference to a name in accordance with the first embodiment.

(3.3) Search for Reservation (One Entry Hit):

Next, an example of searching for reservation from the name of a reserving guest is illustrated in FIG. 15.

A user sends a request for search by inputting a name he wants to search for. The relay server 3 then receives, as the request for search, a language code and the name. The client data receiving section 33 transfers the received data to the request data separating section 32 as it is. Since the data as received includes only language-dependent data, the request data separating section 32 transfers all the data to the data processing section 34. The data processing section 34 searches a reservation table with the language code and the name as keys and obtain a reservation code, a name and a residence. At this time, it is assumed that only one entry matches the name. The reservation code contained in the reserving data as obtained is transferred to the server system 1. The server system 1 returns the English reservation information corresponding to the reservation code to the relay server 3.

The data processing section 34 transfers the multilingual reservation information as obtained to the data generating section 37. The data generating section 37 receives the English reservation information from the server system 1 and the multilingual reservation information from the data processing section 34 respectively. The data generating section 37 then replaces English residence information by the multilingual residence information. Since the name is input both in English and in the other language, the name is added rather than replacement. The multilingual reservation information as generated is returned to the client system 2.

(3.4) Search for Reservation (Multiple Entries Hit)

A user sends a request for search by inputting a name he wants to search for. The relay server 3 then receives, as the request for search, a language code and the name. The client data receiving section 33 transfers the received data to the request data separating section 32 as it is.

Since the data as received includes only language-dependent data, the request data separating section 32 transfers all the data to the data processing section 34. The data processing section 34 searches the reservation table with the language code and the name as keys and obtain a reservation code, a name and a residence. At this time, all the reservation entries associated with the same name are extracted by searching. A plurality of reservation data items as obtained is transferred to the data generating section 37. The data generating section 37 serves to generate the results of searching to be returned to the client system 2 on the basis of the reservation data as received. Then, the data is returned to the client system 2.

The user having received a plurality of results of searching then selects one reservation item among from the plurality of results and send a request for displaying the reservation information. The relay server 3 receives a language code and a reservation code as a request for searching reservation information. The client data receiving section 33 transfers the data as received to the request data separating section 32. The request data separating section 32 transfers the language code to the data processing section 34 and transfers the reservation code to the server system 1. The server system 1 returns, to the relay server 3, the English reservation information corresponding to the reservation code. The data processing section 34 serves to search the multilingual reservation information with the reservation code and the language code as keys. The data generating section 37 receives the English reservation information from the server system 1 and the multilingual reservation information from the data processing section 34. The data generating section 37 replaces English residence information by multilingual residence information. Since the name is input both in English and in the other language, the name is added rather than replacement. The multilingual reservation information as generated is returned to the client system 2.

4. Deleting Multilingual Information;

When information is deleted after logging in by designating Japanese, there are mainly two ways of operations. One way is such that only Japanese "letter information" is deleted from the relay server 3 while information managed by the server system is not deleted. The other way is such that both Japanese data and data managed by the server system are deleted at once.

In accordance with the former case, when the relay server 3 receives a request for deletion from the client system 2, it deletes data in the relay server 3 corresponding thereto and returns a response to the client system 2 without accessing the server system 1. Contrary to this, in accordance with the later case, the relay server 3 transmits a request for deletion as received from the client system 2 to the server system 1, and when receiving a response indicative of "success" from the server system 1, the relay server 3 deletes data as managed therein followed by returning a response to the client system 2. Meanwhile, in the case where the client system 2 logs in without designating any language, the data in the server system is deleted.

(Exemplary Modification)

Figure 18:
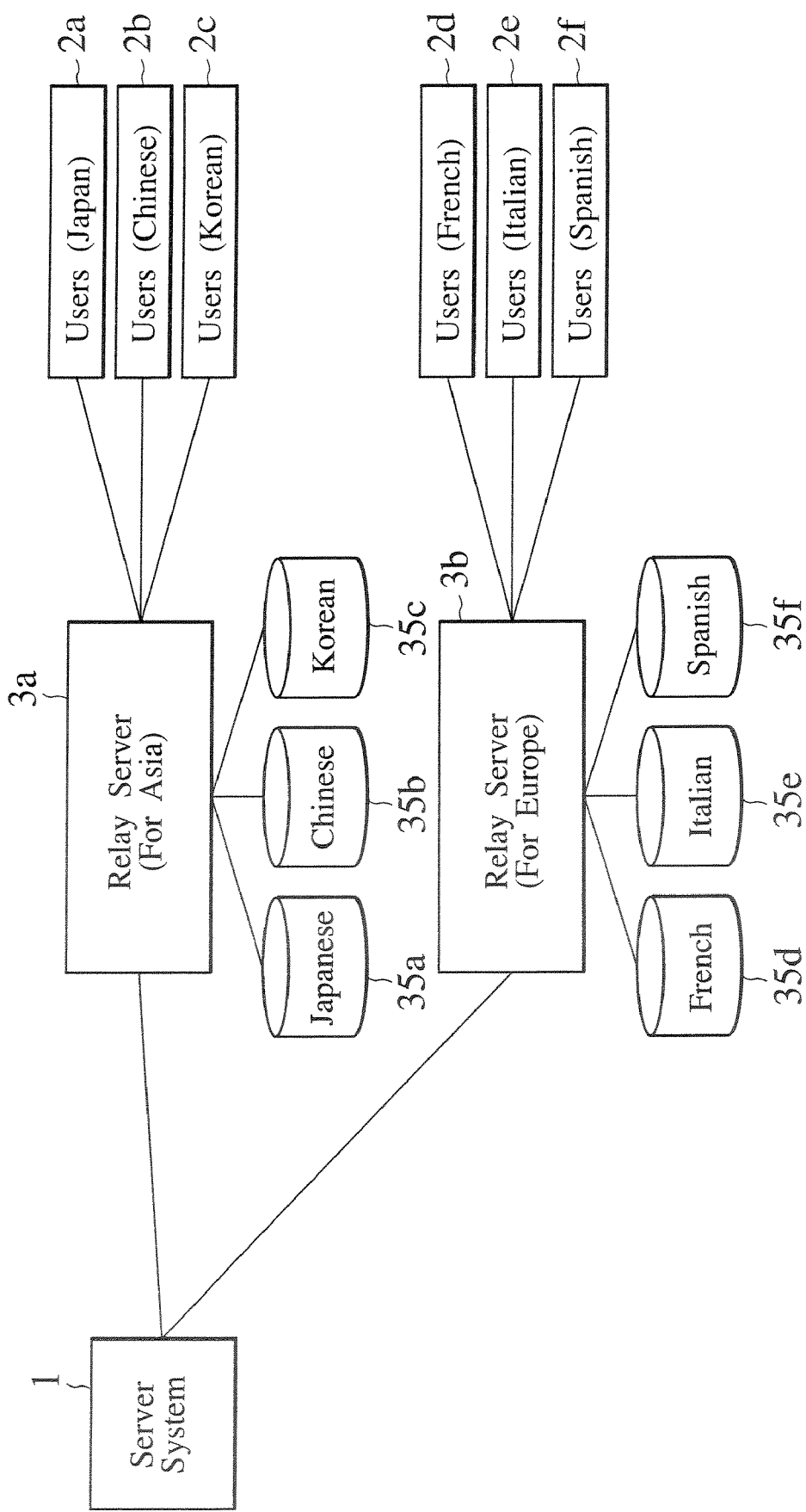
FIG. 18 is a block diagram showing a exemplary modification of the data relay system in accordance with the first embodiment.

Meanwhile, in accordance with the present embodiment, the relay server 3 is located between the server system 1 and the client system 2. However, it is possible that the relay server 3 is physically implemented within the same machine as the server system 1 or the client system 2. Also, while the server system 1 and the relay server 3 are not necessarily provided in a one-to-one correspondence, it is possible to provide, corresponding to one existing server system 1, a plurality of relay servers such as a relay server 3a for Asia, a relay server 3b for Europe and so forth as illustrated in FIG. 18.

Second Embodiment

Next, a second embodiment of the present invention will be explained. In this example as explained, it is assumed that a certain catalog retailer handles operations of sending monthly direct mail of "Advisable Item List for This Month" in accordance with the preference of each customer by the use of the data relay system and method in accordance with the present invention. A server system manages commodity information, customer information, sales information and so forth and provided with a recommendation engine.

It is also assumed that, in advance of introducing a relay server, the server system had periodically generated monthly "Advisable Item List for This Month" and transferred it to a mail transmitting server in order to send the respective customers. the In accordance with this embodiment, it is possible to implement a multilingual direct mail system by introducing a relay server between the server system and the mail transmitting server. Meanwhile, the relay server in accordance with the present embodiment is provided with a substantially equivalent configuration and equivalent functions as the relay server 3 explained as the first embodiment described above.

The client system transmits a customer list containing "language codes", "member numbers", "names", "residences" and "postal guide numbers" to the relay server. This list includes customer information relating to a variety of countries and made up in a variety of languages, for example, Japanese, Chinese, French, and so forth.

The relay server receives the list, and then transmits a "membership number" to the server system separately for each record followed by receiving information containing "item numbers", "the names of items (English)" and "prices" as an advisable item list for this month from the server system. The "commodity names (English)" as received are replaced by multilingual names of items as replacement data which is obtained by searching the database section with keys (the first and second identification information) which are a "language code" and "the names of items" in a commodity name table provided in the relay server.

The relay server serves to generate an advisable item list for every customer in a language as designated and return it to the client.

Third Embodiment

Next, as a third embodiment of the present invention, the use of a relay server will be explained in order to make it possible to provide data in Japanese for online bank account transaction operating in English. The server system 7 for the online bank account transaction serves to manage bank information, account information and customer information to process a variety of online services among customer client systems and bank client systems.

In this case, the bank client systems 5 are client systems for processing tasks in the bank side while the customer client system 4 are client systems for providing online services for customers. Meanwhile, these client systems may be ATMs, personal computers, TVs, mobile information devices (mobile phones, PDA), and other types of online terminals.

Figure 19:
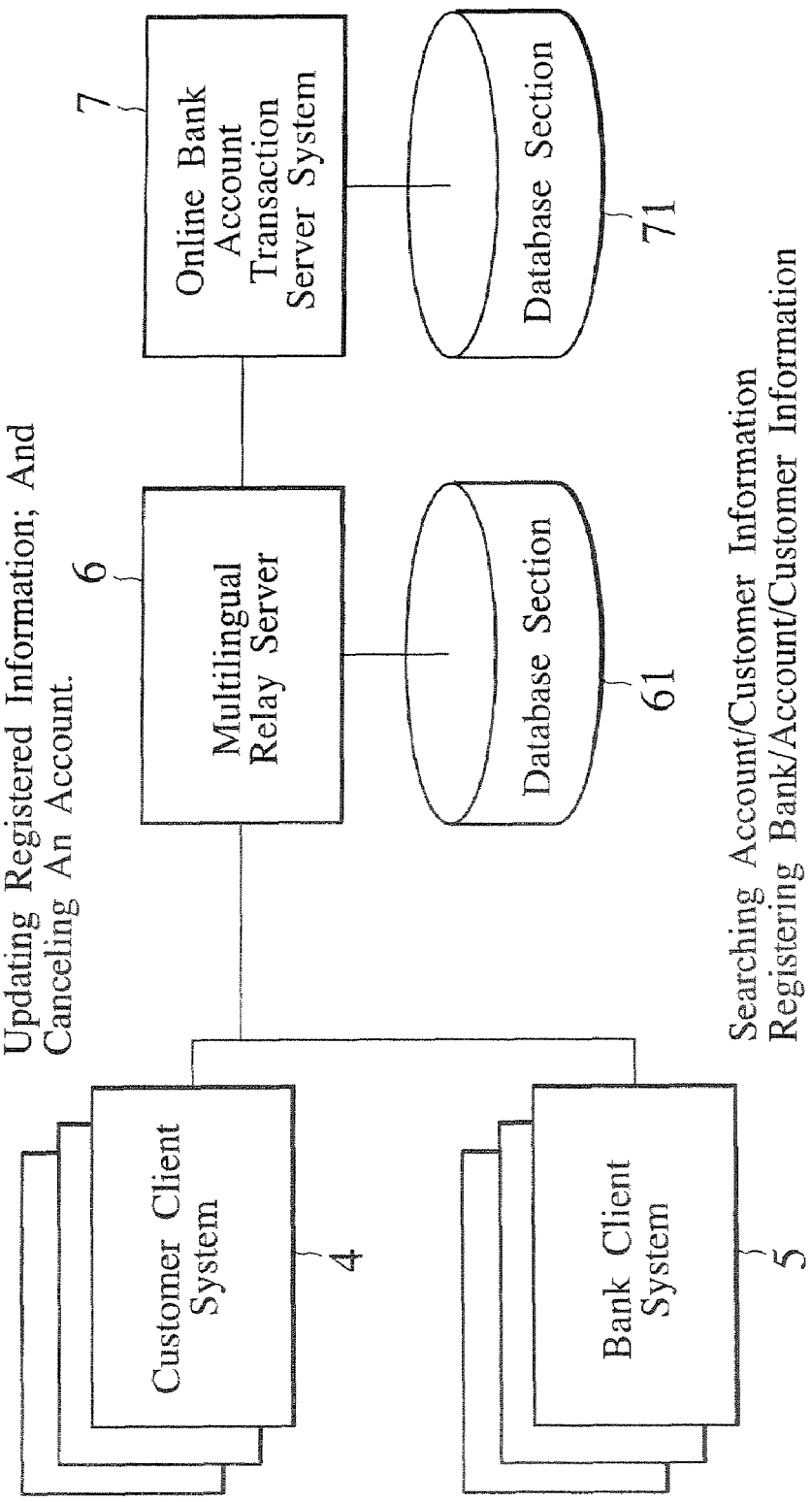
FIG. 19 is a system organization diagram of online bank transaction a third embodiment.

The data relay system in accordance with the present embodiment comprises a relay server 6 of the present invention between the server system 7 and the above described client systems 4 and 5 as illustrated in FIG. 19. The internal configuration of the relay server 6 is substantially equivalent to that of the first embodiment as described above so that explanation is dispensed with.

In this case, the online services to be provided for the customer client systems 4 includes, for example, 1) Opening a new account;

2) Withdrawals;

3) Lodgment;

4) Inquiry for the balances;

5) Transferring money;

6) Updating a bankbook;

7) Updating registered information; and

8) Canceling an account.

On the other hand, the tasks to be performed by the bank client system 5 includes, for example, 1) Referring to account information corresponding to the customer's name as given; and 2) Registering bank information.

In what follows, the operation of the relay server in accordance with the present invention will be explained in an exemplary case of opening a new account, withdrawals or lodgment of savings, and updating registered information among from the online services provided for customers. Meanwhile, among from the online services provided for customers as explained above, inquiry for the balances, transferring money, updating a bankbook, canceling an account, and tasks to be performed by the bank side are logically equivalent to the processes of opening a new account, withdrawals or lodgment of savings, and updating registered information.

First, examples of database tables to be managed by the database section 71 maintained in the server system 7 are illustrated in FIGS. 20A to 20F. In this case, the database section 71 includes six database tables, i.e., a customer basic table illustrated in FIG. 20A for storing basic information of customers, an account basic table illustrated in FIG. 20B for storing basic information of accounts, a money reception history table illustrated in FIG. 20C for storing a history of money as received by each account, a money withdrawal history table illustrated in FIG. 20D for storing a history of money as withdrawn from each account, a bank basic table illustrated in FIG. 20E for storing basic information of the bank, an account type code table illustrated in FIG. 20F for storing the type code of each account and the type name thereof. Data stored as data entries of the respective tables can be language-independent data such as numerical/symbol information and language-dependent data comprising English character string data while the character strings are hatched in the figures. Meanwhile, the names and the structures of the respective tables and the table configuration of the database section may be made in any other formats as long as data can be managed in the same manner so that the data management system of the server system 1 is not particularly limited thereto when implementing the relay server 6 in accordance with the present invention.

Next, examples of database tables to be managed by the relay server 6 are illustrated in FIGS. 21A to 21D. The database section 61 of the multilingual relay server 6 is corresponding to data of the English character string type as stored in the server system 7 and serves to manage replacement data in the other language. In accordance with this embodiment of the present invention, as illustrated in FIG. 21, the database section 61 comprises four tables, i.e., a customer table illustrated in FIG. 21A for storing the name and the residence of each customer in Japanese, a bank table illustrated in FIG. 21B for storing the name and the address of each bank in Japanese, an account type name (EtoJ) table illustrated in FIG. 21C for storing the type name of each account as described in English with the corresponding type name of said each account in Japanese, and an account type code table illustrated in FIG. 21D for storing the type name of each account in Japanese. While the database of the relay server 61 in accordance with the present embodiment has the structure as described above, the names and the structures of the respective tables and the configuration of the tables are not limited thereto and can be made in any other names, structures and configuration as long as the database is located between the server system 7 and the client systems 4 and 5 and contains replacement data to be input/output in Japanese corresponding to the existing English data and numerical/symbol data such as customer numbers functioning as the first and second identification information associated thereto and required for detecting replacement data items.

Next, the use of a relay server in accordance with the present embodiment as described above will be explained in the case where a customer send a request for opening a new account. While requests and responses described hereinafter are provided in the form of tag based data formats as illustrated in FIG. 24, an arbitrary data format can be used for the same purpose as long as the server and the client can be recognized them and the relay server can interpret data components as described, i.e., the data components required for processing English character strings and Japanese character strings. Also, while the tags are described in Japanese, this is solely for the sake of explanation so that the tags are not related to the multilingual processing in accordance with the present invention. Furthermore, it is assumed that data entries as illustrated in FIGS. 22A and 22B and data entries as illustrated in FIGS. 23A to 23C are input to the server system as basic data and the relay server respectively in advance.

Among from the basic data as illustrated in FIG. 19, the Japanese data (replacement data) of the name and the address of the bank to be input to the database section 61 of the multilingual relay server 6 may be registered in advance or may be registered at an arbitrary time from the client system 5 provided for inputting bank information. In the case where the Japanese data (replacement data) of the name and the address of the bank is not registered in advance, when the client system sends a request for bank information, the relay server returns the English information of the server system as it is as a response to the client system.

When a customer starts the operation for opening a new account with the client system 4, the client system 4 sends, as a request for the new account, the request data as illustrated in FIG. 24 to the relay server 6. In this case, the request data includes session information, the personal information of the customer required for opening a new account, information about the account to be opened and the first identification information for designating a country (a language).

Meanwhile, the session number is used for distinguishing a series of communication between the server system 7 and a certain client from a series of communication between the server system 7 and another client and determined by the server to establish the session through communication in advance of the transaction between the client and the server. Also, it is possible to make use of another item such as a terminal code available for identifying a session with the server in place of a numeral or a symbol such as a session number.

Figure 25:
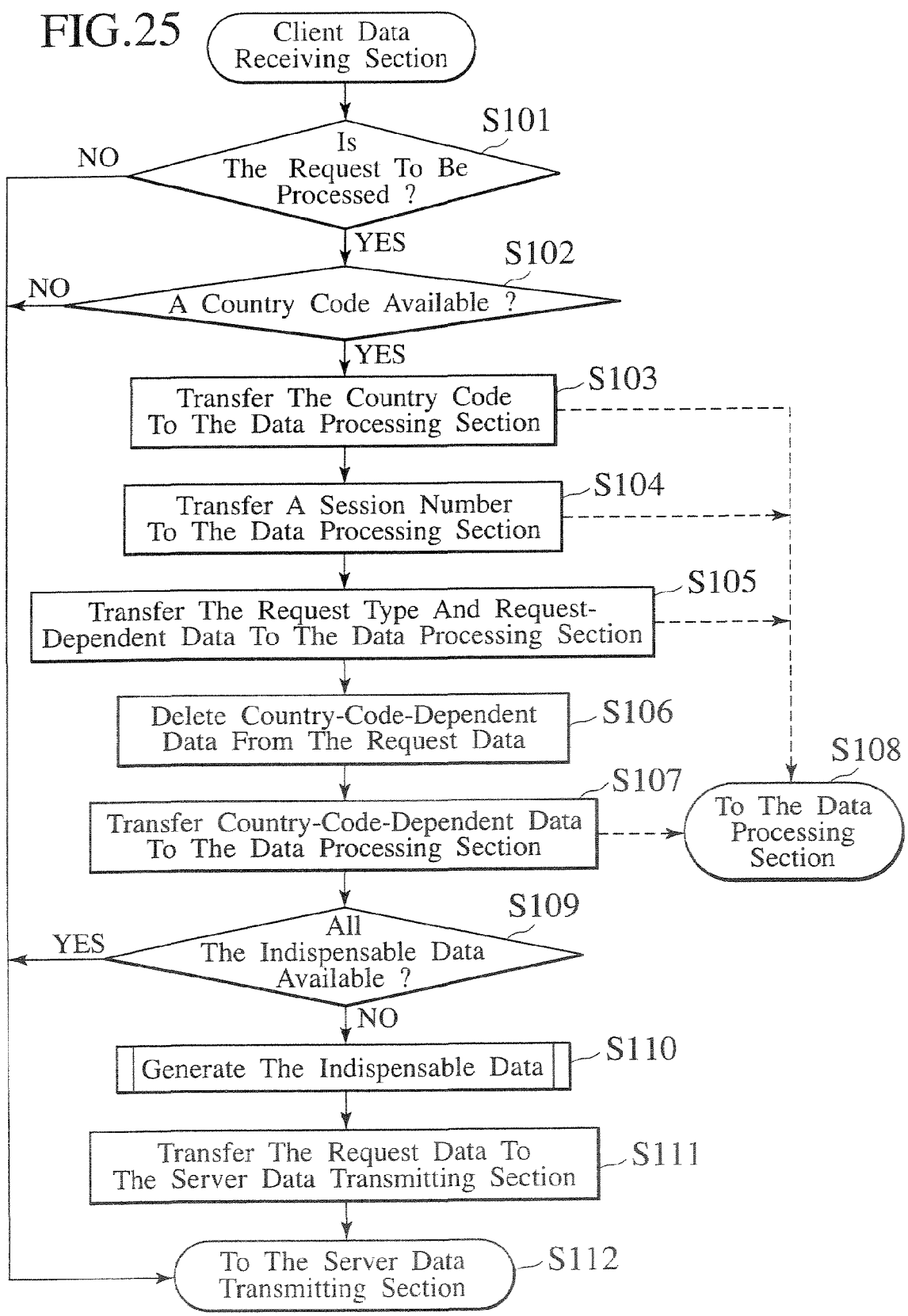
FIG. 25 is a flowchart of the request data separating section of the relay server in accordance with the third embodiment.

When receiving a request data, the relay server 6 transfers the request data from the client data receiving section to the request data separating section. The process sequence in the request data separating section is as illustrated in FIG. 25.

That is, it is judged (S101) whether or not the request data requires any process in the relay server 6. If no process is required, the request data is maintained in the server data transmitting section (S112). If some process is required, a country code contained in the request is analyzed (S102). The judgment of whether or not the request data requires any process is made by, while all the types of requests to be processed are managed by the request data separating section, judging all the requests out of the management as requests not to be processed. Conversely, the judgment can be made by managing the types of requests not to be processed.

If the request data does not contain a country code, it is judged that there is no data to be processed followed by transferring the request data to the server data transmitting section (S112). If the request data contains a country code, it is transferred to the data processing section together with a session number. Next, the name and the residence as designated by this country code are extracted from the request data as replacement data and are transferred to the data processing section (S105, S108). The data as extracted is deleted from the original request (S106). The request from which the country-code-dependent data is deleted is evaluated, and if there is contained all the indispensable data in the request as a request to be transferred to the server system 7, the request is transferred to the server data transmitting section as it is (S112). In the case where there lacks any indispensable data after deleting the country-code-dependent data from the request, the indispensable data is generated (S110) and added to the request data.

The generation of the indispensable data in the step S110 is performed as follows. Namely, while the types of requests and the indispensable data of the requests are managed in a table, if among from the name and the address to be included in the request the name for example is designated written with romanized Japanese words, the romanized name is used as it is. If not, dummy data containing for example the country code is generated with the tag of <氏名>and added to the request. With reference to the residence entry, a residence written with romanized Japanese words is generated from a postal guide number and added to the request with the tag of <住所>.

Then, the request as modified above is transferred to the server data transmitting section (S111). This request is illustrated in FIG. 26.

When receiving this request from the relay server, the server system 7 serves to perform the process for opening a new account while the data tables as illustrated in FIGS. 27A to 27C are updated by registration in association with the process for opening the new account. FIG. 28 shows a response to the request as transmitted from the server data transmitting section. As illustrated in the same figure, the response data from the server system 7 includes a customer number, an account type name, an account number, an amount of money and so forth. When the server data receiving section of the relay server receives this response data from the server system, it is transferred to the data generating section and the data processing section. The process sequence in the data processing section receiving this response data is as illustrated in FIG. 29.

Namely, the request from the client is transferred to the request data separating section while the data processing section receives, from the request data separating section, the type of the request, a session number, a country code and country-code-dependent data (S201). Among from the type of the request, the session number, the country code and the country-code-dependent data, thereafter, the session number and the country code (S202) are stored in the session managing unit while the remaining items depending upon the type of the request and the country are processed in accordance with the type of the request (S204). In the case of opening a new account in accordance with this example, since customer information is to be registered in Japanese, the relay server temporarily stores the name and the residence in association with the session number followed by waiting for response data from the server system (S205).

When a response from the server data receiving section is received, a session number is extracted (S206). Then, it is judged whether or not the response data associated with the session number is to be processed (S207). If to be processed, the data is processed depending upon the type of the response. If not to be processed, a notice is transmitted to the data generating section to indicate that the data is not processed (S208).

In accordance with this example, after confirming that the response is associated with the session in which data is temporarily stored, the customer number is extracted as the second identification information from the response as received and registered in the database section together with the replacement data such as the name and the residence as received by the request data separating section in association with each other as customer data in the response dependent process in the step S209. Furthermore, the data of account type name is extracted and used as a key to obtain a Japanese account type name from the database section followed by transferring the Japanese account type name together with the country code to the data generating section.

Figure 30:
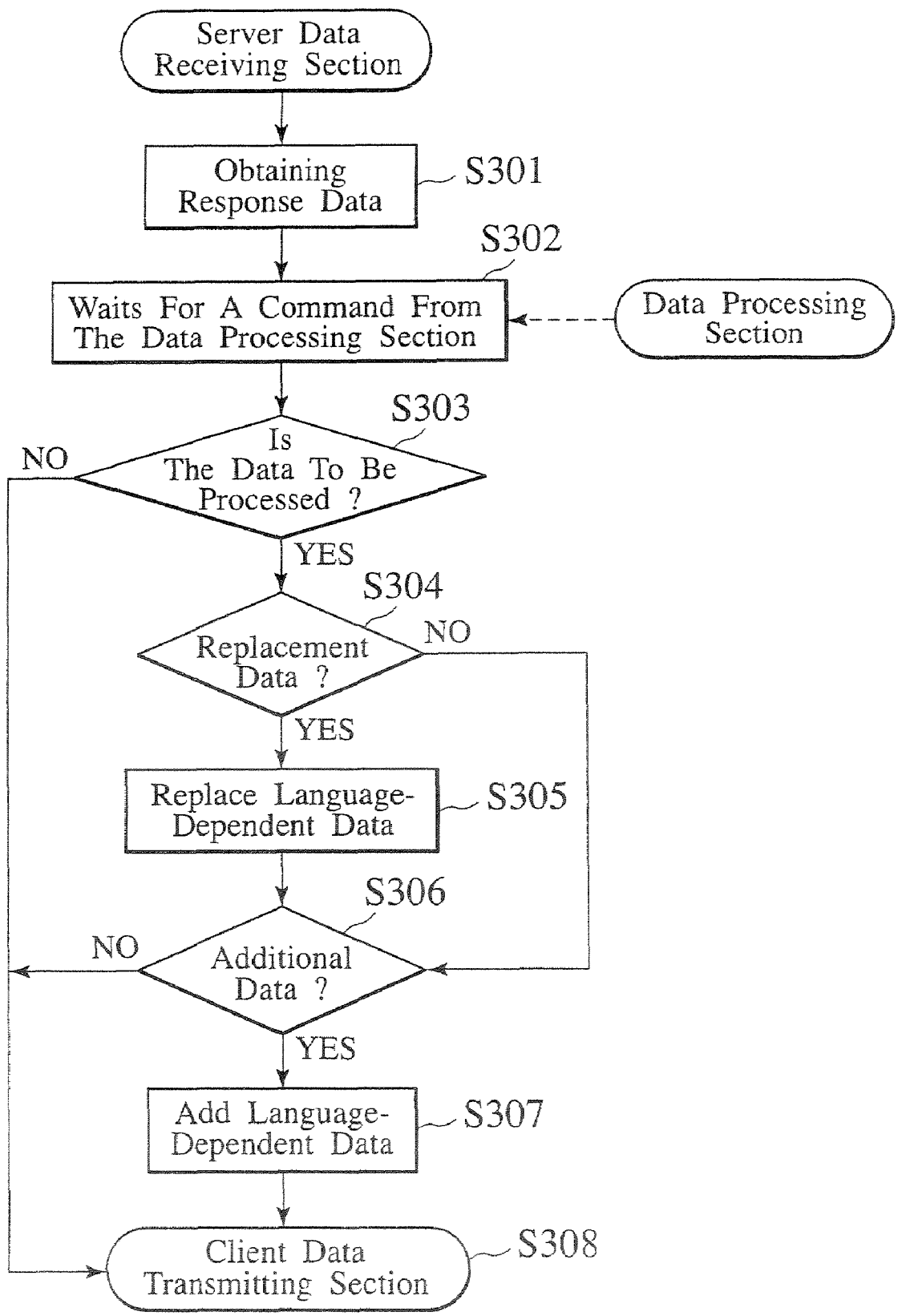
FIG. 30 is a flowchart of the data generating section of the relay server in accordance with the third embodiment.

The process sequence in the data generating section is as illustrated in FIG. 30. Namely, after obtaining the response data (S301), the data generating section waits for a command from the data processing section (S302) and judges whether or not the data is to be processed (S303).

If not to be processed, the data is transferred to the client data transmitting section as it is. If to be processed, it is judged whether or not the data contains language-dependent data to be replaced by Japanese data (S304). If there is contained language-dependent data to be replaced in the response data from the server system, such data is replaced by replacement data as obtained from the data processing section (S305) and then processing proceeds to the step S306. In this case, the account type name ("futsu") is replaced by country-dependent data ("普通預金").In the case where it is judged that there is available no language-dependent data to be replaced in the step S304, the processing proceeds to the step S306.

It is judged in the step S306 whether or not there is contained any language-dependent data to be added to the response data from the server system. If there is such data, country-dependent replacement data as obtained from the data processing section is added to the response data (S307). In this case, country code data (81) is added.

Then, the response data as generated is transferred to the client data transmitting section (S308) while the client data transmitting section transmits the response data to the client. At this time, the response data as illustrated in FIG. 31 is finally sent from the client data transmitting section to finish the process for opening a new account.

Next, as an example of withdrawals or lodgment of savings will be explained the case where the operation of lodgment is performed with a client used by a customer will be explained.

When the client data receiving section of the relay server 6 receives request data for lodgment as illustrated in FIG. 32 from the customer client system 4, the request data separating section serves to extract a country code, a session number, the type of the request, and a bank code from the request data and transfers them to the data processing section. Then, after the country code is deleted from the request data, the request data is transferred to the server data transmitting section as a request to be transferred to the server system.

When the request data is transferred from the server data transmitting section to the server system, the server system 7 serves to perform the lodgment operation. In this case, data in the server system 7 is changed for example as illustrated in FIGS. 33A to 33B. When the lodgment operation is completed in the server system 7, response data as illustrated in FIG. 34 is transferred to the server data receiving section of the relay server 6.

On the other hand, the server data receiving section transfers the response data as obtained to the data processing section and the data generating section while the data processing section searches the database section for a Japanese bank name from a bank code and then transfers the result of searching to the data generating section as replacement data. Also, the country code as obtained from the request data separating section is transferred to the data generating section.

The data generating section then serves to replace an English bank name by the bank name as obtained from the data processing section with reference to the response data as obtained from the server data receiving section, while adding the country code as obtained from the data processing section to the response data, and then the response data is transferred to the client data transmitting section. On the other hand, the client data transmitting section transmits the response data obtained from the data generating section as illustrated in FIG. 35 to the client system 4.

The following is a description of the case where a customer updates the residence information of a certain account. When the customer sends a request for updating residence information through the client system 4, the client data receiving section of the relay server 6 receives data as illustrated in FIG. 36 and transfers it to the request data separating section. The request data separating section then extracts a country code, the type of the request and a session number from the request data and transfers them to the data processing section. Also, the request data separating section deletes the country code from the request data and then transfers the request data to the server data transmitting section. The server data transmitting section transmits the request data to the server system.

The server system 7 then serves to search the customer information with reference to the request as received and return the result for example as illustrated in FIG. 37 to the relay server 6 as response data.

The relay server 6 transfers the response data as received by the server data receiving section to the data processing section and the data generating section while the data processing section searches for a Japanese name and a Japanese residence with reference to the customer number and transfers them to the data generating section. Also, the country code as obtained from the request data separating section is transferred to the data generating section.

On the basis of the response data as received from the server data receiving section, the data generating section serves to add the Japanese name thereto and replace an English residence by the Japanese residence to generate response data by adding the country code as illustrated in FIG. 38 and transfer it to the client data transmitting section. The client data transmitting section returns the response data as received from the data generating section to the client system 4.

The response data returned to the client system 4 is displayed, for example, on the display of the client system 4 to prompt the customer to indicate which information item is to be updated among from the registration information of the customer. At this time, when the customer wants to update the residence information by designating a new residence to the client, the request data as illustrated in FIG. 39 is transmitted again.

When receiving this request data, the relay server 6 extracts a session number, the type of the request, the customer number, the residence and the country code and then transfers them to the data processing section. Also, after removing the residence and the country code which are language-dependent data from the request data, an English residence is generated with reference to the postal guide number and replaced by the Japanese residence. The request data as generated at this time is as illustrated in FIG. 40. The request data as generated is transferred to the server data transmitting section.

On the basis of the customer number and the residence as received from the request data separating section, the data processing section serves to update the residence data stored in the database section with the customer number as a key.

The server data transmitting section serves to transmit the request data from the request data separating section to the server system 7 while the operation for updating residence information is performed by the server system 7. If the response indicative of the success of updating the residence data, for example, "<変更状態>0</変更状態>", is transmitted from the server system 7 and received by the server data receiving section of the relay server 6, the response is transferred to the data generating section and the data processing section. In response to the response indicative of the success of updating the residence data at the server system 7, the data processing section finalizes (commits) the process for updating the residence information in Japanese and transfers the country code data to the data generating section.

After receiving the country code data, the data generating section serves to add the country code to the response data as received from the server data receiving section. The response data at this time is as illustrated in FIG. 41. The client data transmitting section then receives the response data and transmits it to the client system 4 to complete the process in this session.

Fourth Embodiment

Figure 42:
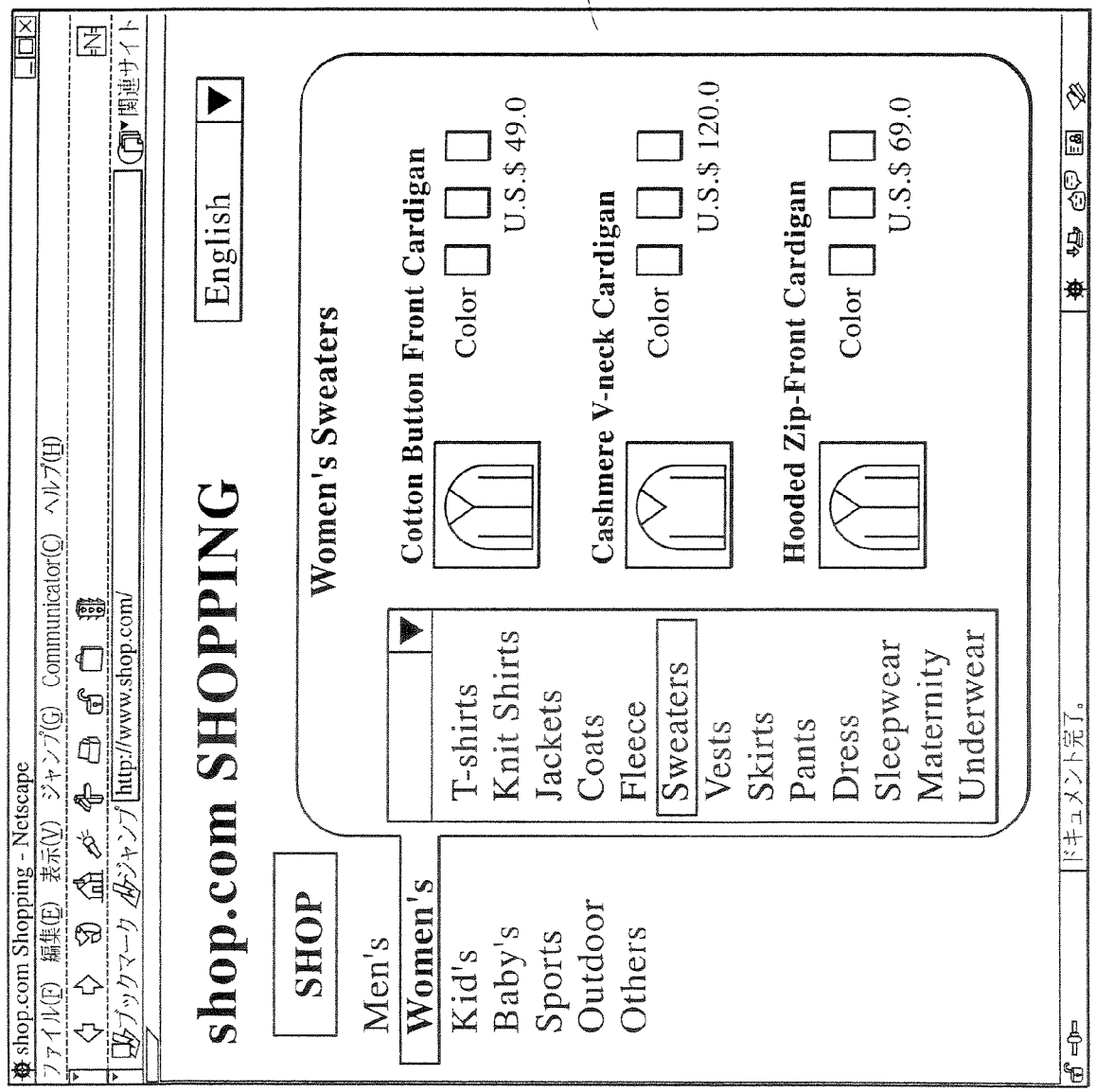
FIG. 42 is an organization diagram showing a Web page which is delivered by the server system in accordance with a fourth embodiment.
Figure 43:
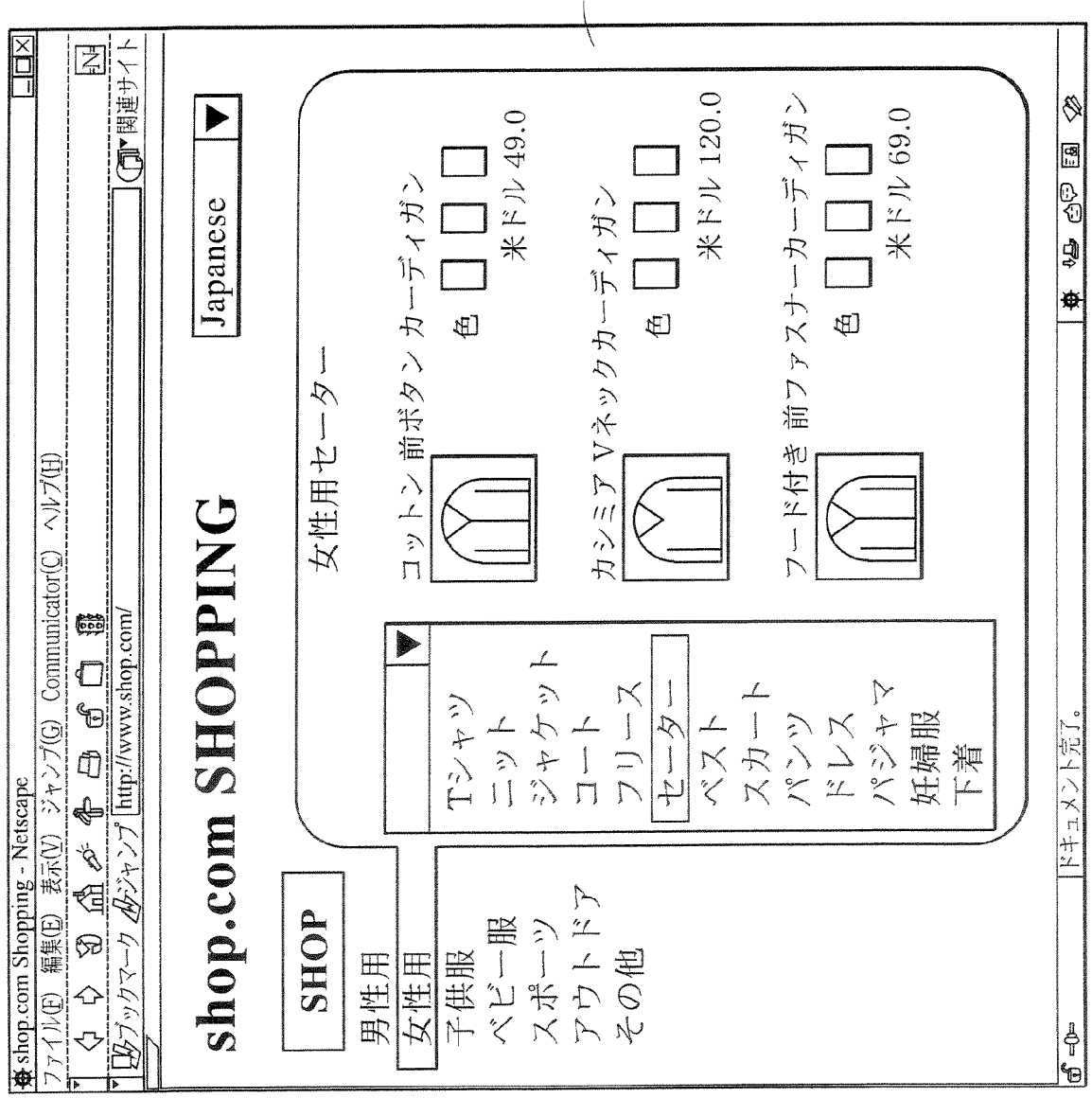
FIG. 43 is an organization diagram showing the Web page which is converted by the relay server in accordance with the fourth embodiment.

Next, a fourth embodiment of the present invention will be explained. The present embodiment will be explained with an example in which the present invention is applied to an online shopping system. In this embodiment of the present invention, the server system is an online shopping site (shop.com) for selling articles of clothing. This online shopping site includes a Web page P1 providing services in English as illustrated in FIG. 42.

Also, in accordance with the present embodiment, a relay server is located between the server system and client systems used by users who want to buy articles on the online shopping site of the server system. The relay server serves to replace the language-dependent data in the Web page P1 as illustrated in FIG. 42 by replacement data to convert the Web page P1 to a Web page P2 designed in Japanese so that users can browse the commodity information in Japanese and so forth.

1. Browsing Commodity Information;

When a user selects a ladies' sweater on the Web page P2, the WEB browser transmits a major division code (female=2) and a minor division code (sweater=6) which are stored therein together with the language code designating Japanese (the first identification information) to the relay server. The relay server transfers these codes to the server system as it is while the server system returns a list S1 as illustrated in FIG. 44 as the results of searching to the relay server. The relay server extracts from the list S1, as received, an ItemNumber, a Currency code, and an ItemColor code (the second identification information for identifying language-dependent data) and then searches the database section of the relay server. The database section contains data tables as illustrated in FIGS. 45A to 45C storing Japanese data (replacement data) corresponding to the respective codes.

The server system is responsible for unified management of all the language-independent data such as the correspondence between division codes, commodities, color types of commodities, prices and currencies and so forth. The relay server rewrites the list received from the server system as illustrated in FIG. 46 with reference to the results of searching the database and returns the list as rewritten to the client system.

Figure 47:
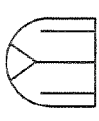
FIG. 47 is an organization diagram showing a Web page for ordering a commodity which is delivered by the server system in accordance with the fourth embodiment.
Figure 48:
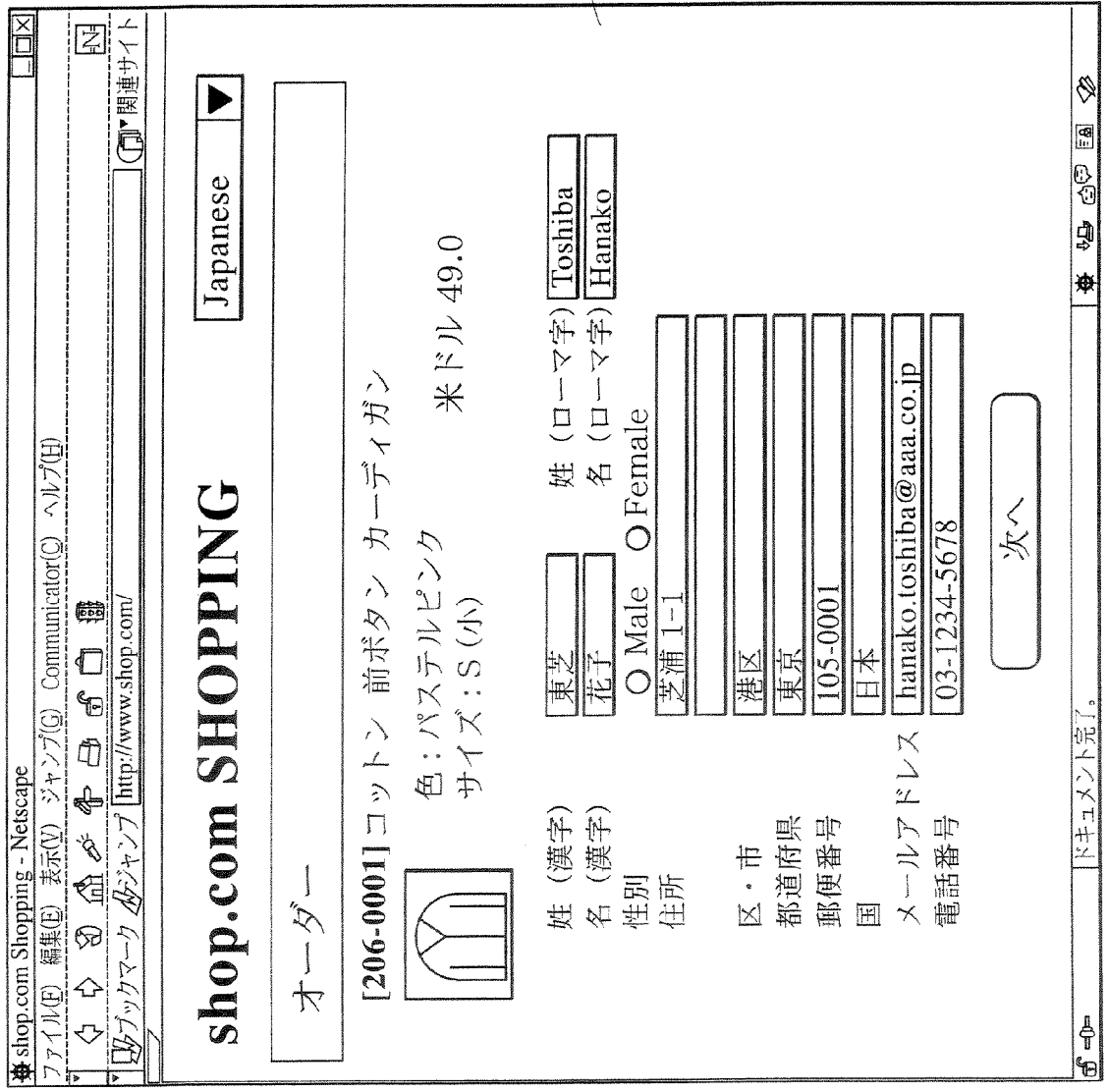
FIG. 48 is an organization diagram showing the Web page for ordering a commodity which is converted by the relay server in accordance with the fourth embodiment.

2. Ordering a Commodity:

Next, the flow of the procedure of ordering a commodity will be explained. The server system provides delivery information on a Web page P3 entirely described in English as illustrated in FIG. 47. The relay server in accordance with the present embodiment serves to provide a Web page P4 described in Japanese as illustrated in FIG. 48 by replacing the language-dependent data contained in the Web page P3 so that a user can place an order through the Web page P4.

First, the relay server receives an order list S3 as illustrated in FIG. 49 from the user. More specifically speaking, the relay server receives an HTML script transmitted together with predetermined input items (such as a name, sex, a commodity name, commodity properties (color, type and the like)) as input by the user on an input form of the WEB browser at the user's side.

The order list S3 includes a number of Japanese words and therefore cannot be transferred to the server system as it is. In order to convert the list to a list which can be handled by the server system, the following processing is performed.

(1) Deleting Tagged Data of a Name with Chinese Characters:

Data of a name is indispensable data for the server system so that the user is prompted to enter a name both with chinese characters and with romanized Japanese words. The relay server saves the name written with chinese characters while the server system saves the name written with romanized Japanese words.

(2) Searching for an English Residence and Replace Japanese Data Thereby.

In the relay server serves is maintained a residence table (in English) provided in correspondence with postal guide numbers. With a postal guide number 105-0001 as received from the user as a key, information can be obtained as "Tokyo, Minato-ku, Shibaura1-1". With the above English data, tagged data corresponding to <State>, <City> and <Address1> is replaced.

(3) Deleting Japanese Information Associated with Each Tag Having a Code:

The tags of commodity, color, size, sex and country name are used to designate both codes and Japanese names. Since the server system can perform operation only with a code, these Japanese names ("コットン,前ボタン,カーディガン","パステルピンク","小","女性"and "日本")are deleted.

FIG. 50 shows a list S4 which is generated by this process and transferred to the server system. The server system then performs an ordering operation and return an order number if resulting in success. The relay server judges that the operation of the server system has succeeded and therefore extract, with the order number as a key, the Japanese data as stored in a memory of the request data separating section followed by saving the Japanese data in the database section.

When shipping the commodity, it is delivered to the customer, if the commodity is in stock in Japan, by searching for the Japanese residence and the name through the relay server.

If the commodity is not in stock in Japan and therefore to be delivered directly from U.S.A., it is possible to use the English information as stored in the server system.

Fifth Embodiment

Next, a fifth embodiment of the present invention will be explained. In this example as explained in accordance with the present embodiment of the present invention, it is assumed that a hotel delivers direct mail to the guests having stayed at the hotel at a later date. In accordance with the present embodiment, the server system is a server serving to accept reservations of hotel rooms and the like in English alphabet.

This server system serves to perform reservations of hotel rooms in English alphabet. For this reason, when delivering direct mail to the guests having stayed at the hotel at a later date for merchandising, the addresses have to be identified only with alphabetical notations whereas the body text can be freely prepared. It appear odd if the name and the address are not written in Japanese in spite of the fact that a Japanese guest has stayed in a hotel located in Japan and that a mail has been posted in Japan, and therefore the marketing procedure may become ineffective.

In this situation, when a guest as stayed registers a name and a residence in Japanese (or in the native language), the relay server in accordance with the present embodiment saves the language-dependent data in the database section and transfers the stay specification (the number of nights, the class of the room, the rate per night, whether or not actually stayed and so forth) to the server system, while the stay specification is stored in the database of the server system. Also, the relay server in accordance with the present embodiment serves to take statistics of the performance of utilization and generate marketing information for each category of residences, frequencies and so forth.

When delivering an event information mail to guests having stayed or when delivering a courtesy invitation mail to such guests as having stayed for a predetermined times in a year at a later date for a merchandising purpose, the hotel person in charge of merchandising sends, through the relay server, a request for selecting addresses and printing mailing labels of direct mail to the booking system. When receiving this request data, the relay server transfers the data to the server system as it is since there is no language-dependent data in the request data at this time.

The server system serves to select a predetermined number of addresses with reference to the postal guide numbers and the frequencies of customers in accordance with a predetermined algorithm and generate an address list including residences, names, postal guide numbers and customer numbers.

This list can be used to prepare mailing labels written with alphabetical notations as in the prior art technique by transmitting the data to a printing machine. However, since the instruction of preparing a list is issued through the relay server in accordance with the present embodiment, the server system transmits this address list to the relay server.

The relay server then searches the database section with the customer numbers as keys to extract residences, names and language information to generate an address list including the residences, the names and the postal guide numbers. In the case where a character set permitting multilingual codes such as Unicode is used for preparing the address list, it is possible to use notations containing a mixture of a plurality of languages. Alternatively, separate lists for the respective languages may be output by sorting the entries with respect to languages just before the relay server outputs.

As explained in the above, by the use of the system in accordance with the present embodiment, it is possible to extend a booking system with ease in order to describe addresses in Japanese (or the native language of each customer having stayed) and therefore possible to obtain high merchandising effects at a low cost per performance. Meanwhile, while the above-described example is explained as a direct mail delivery system through the post, the technique is applicable to other types of delivery systems such as e-mail, My Pages of WWW (My Page is a private page as customized for each user and opened through WWW by inputting ID/Password) and so forth.

Sixth Embodiment

In what follows, a sixth embodiment relating to another invention will be explained.

Figure 52:
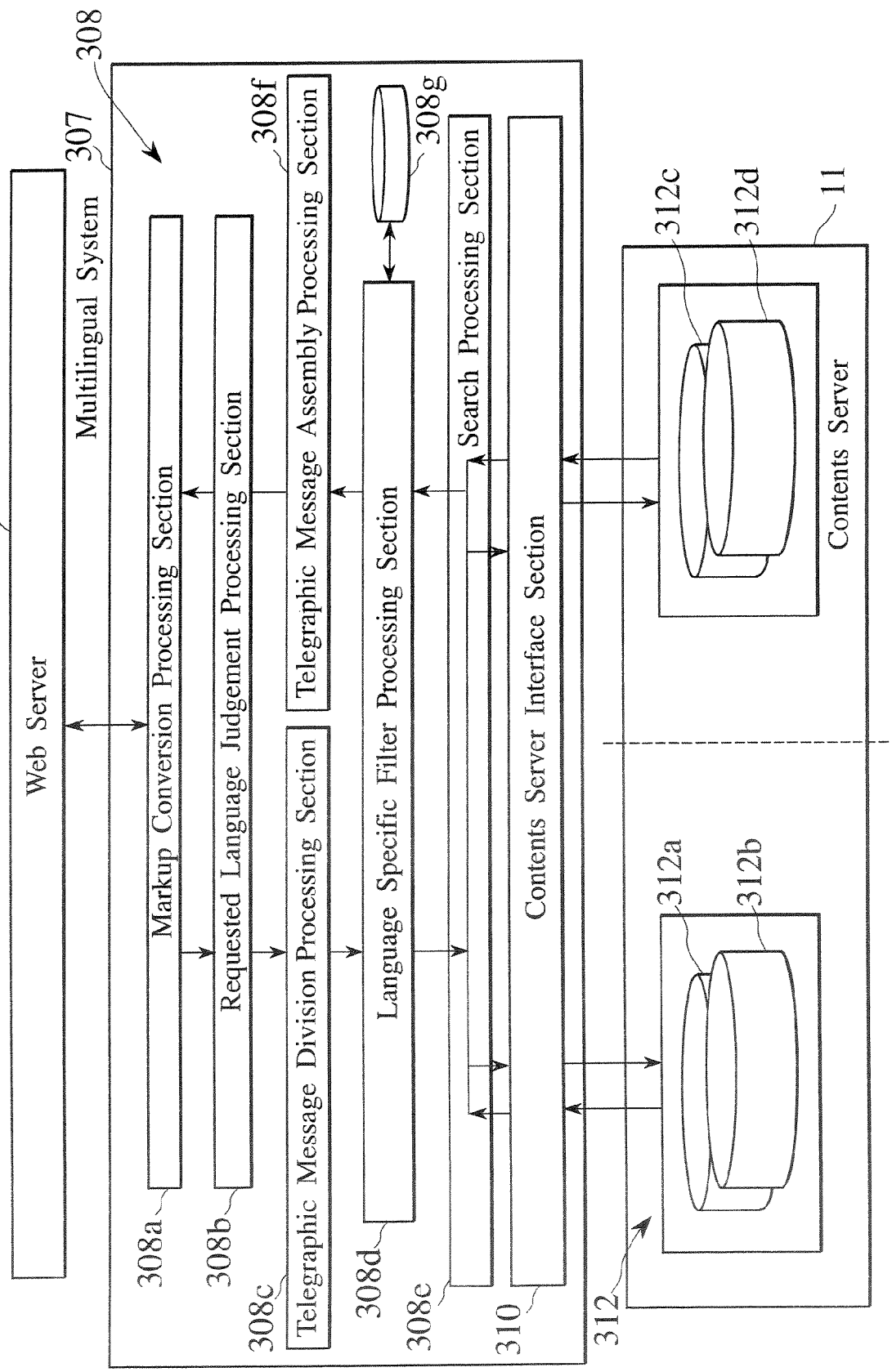
FIG. 52 is a schematic block diagram showing the major portions of FIG. 51.
Figure 56:
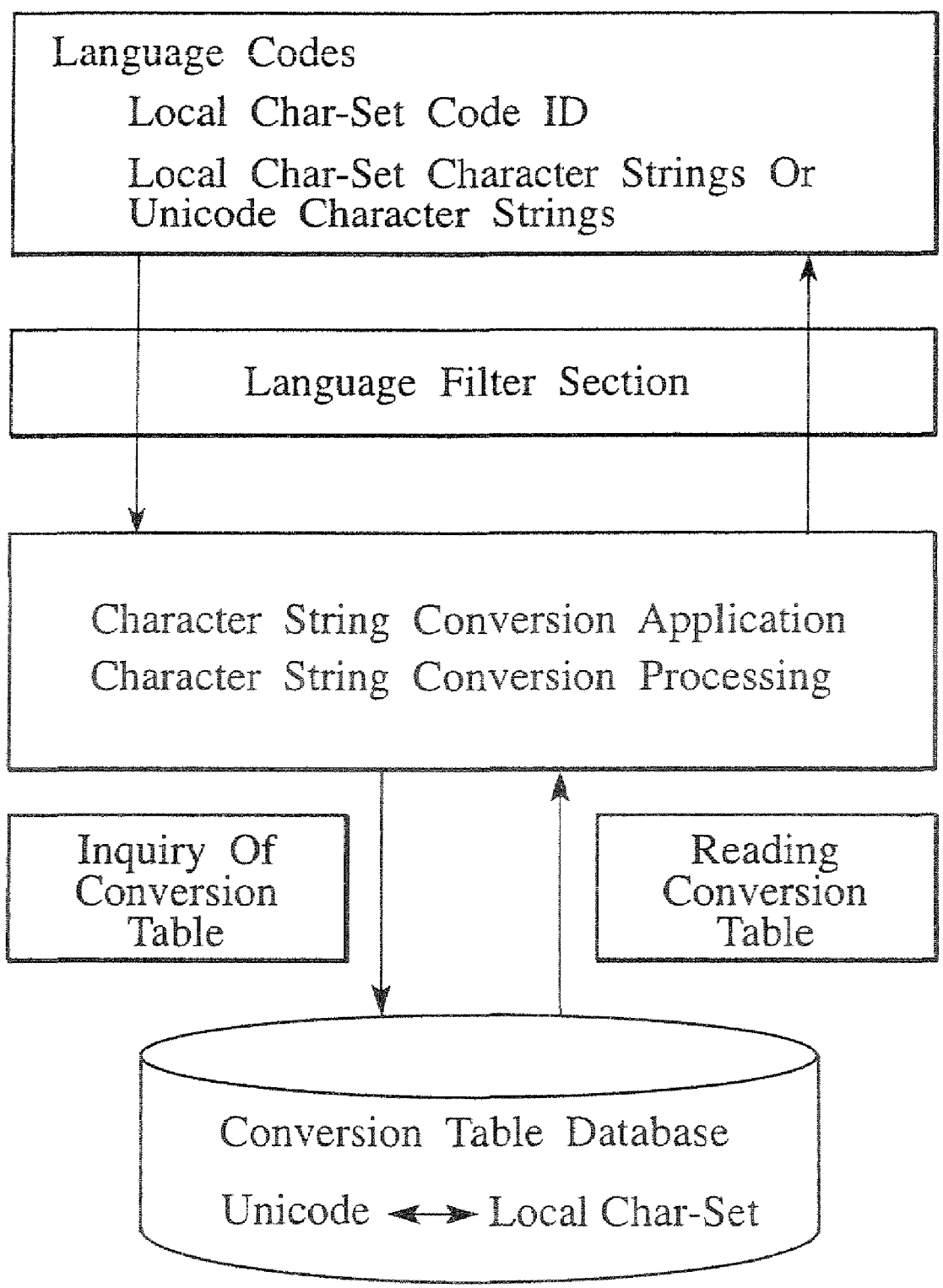
FIG. 56 is a view for explaining a multilingual conversion filter processing section as illustrated in FIG. 52.
Figure 59:
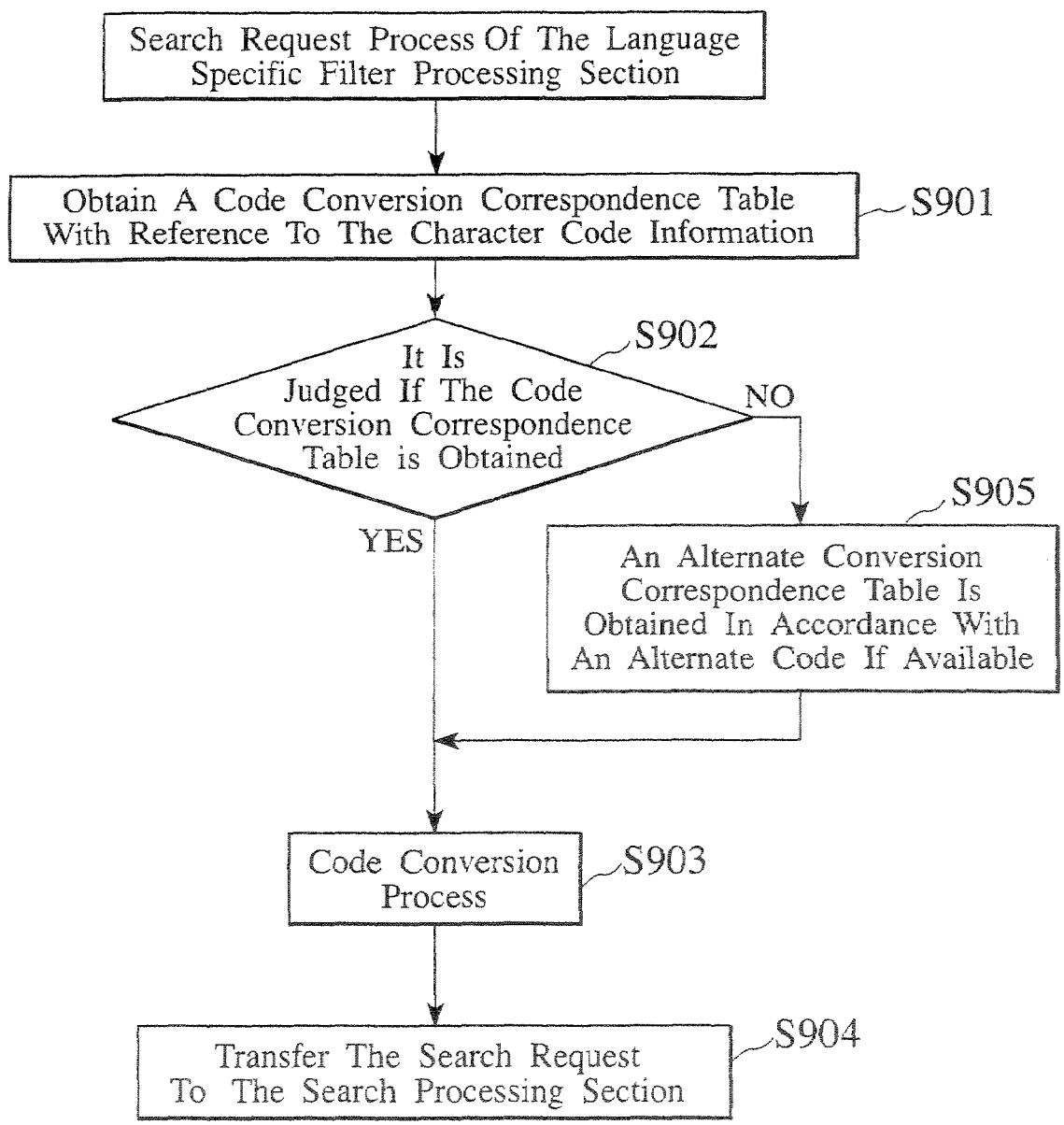
FIG. 59 is a flowchart for explaining the search request process of the multilingual conversion filter processing section as illustrated in FIG. 51.
Figure 60:
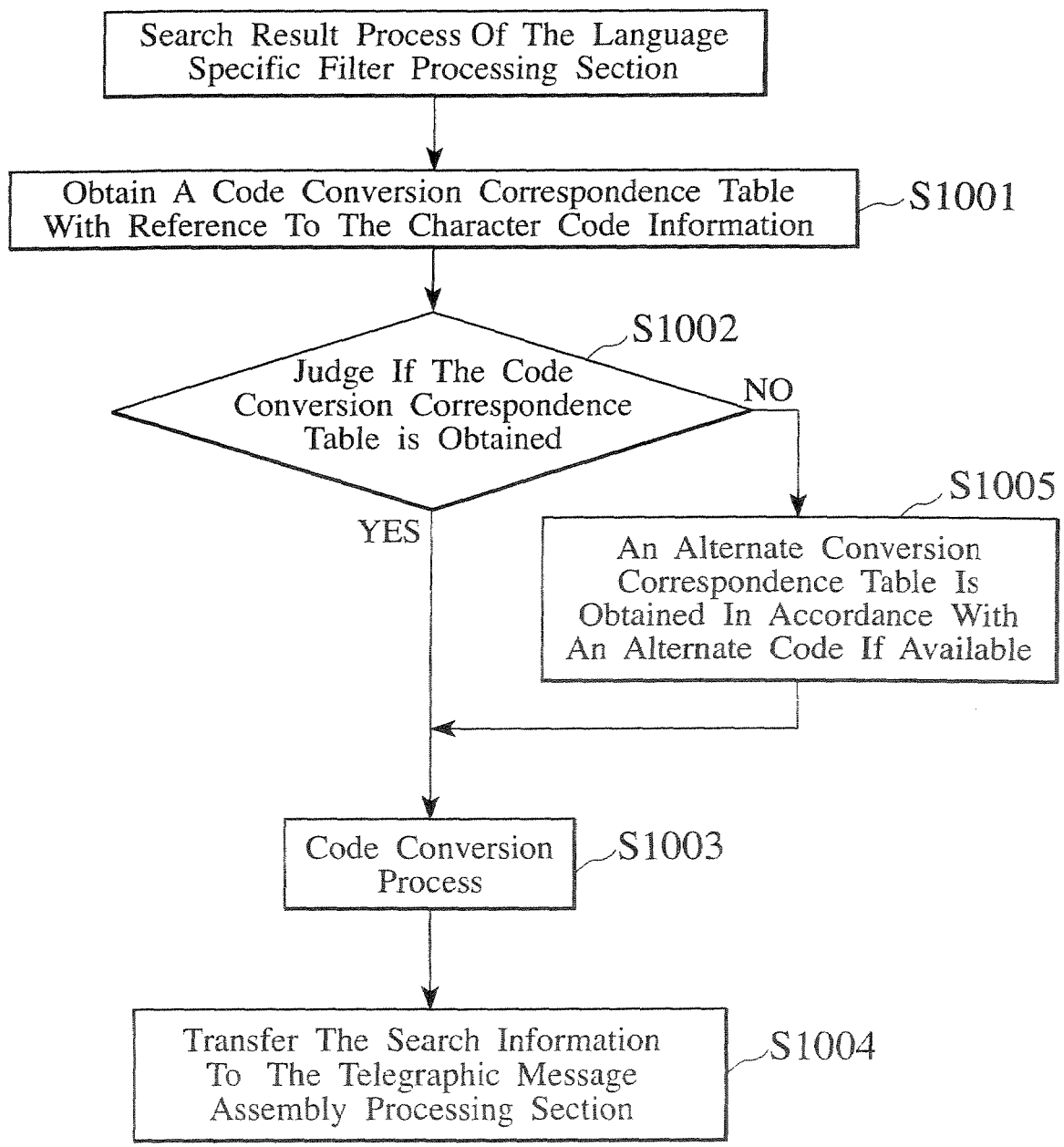
FIG. 60 is a flowchart for explaining the search result process of the multilingual conversion filter processing section as illustrated in FIG. 51.
Figure 61:
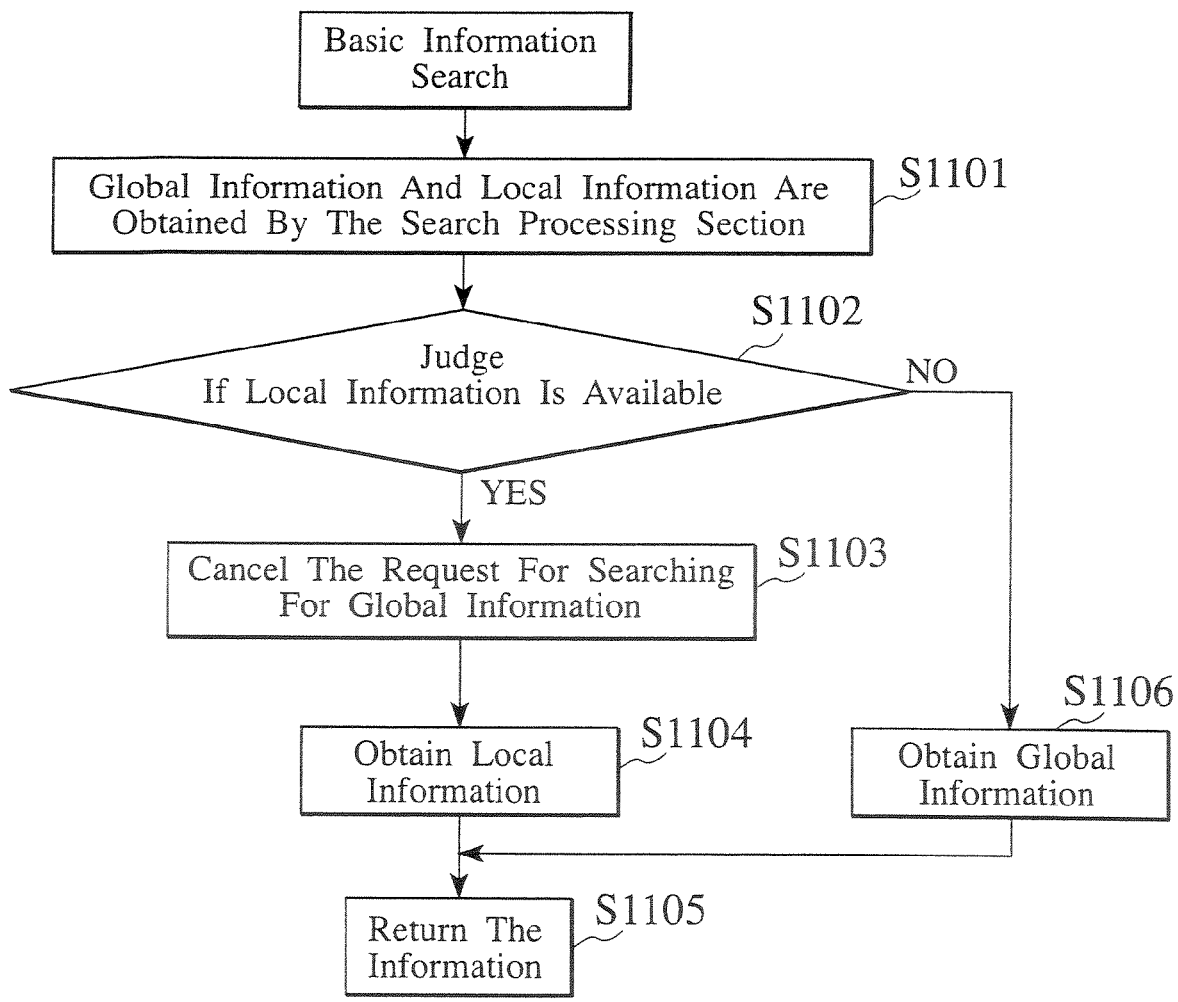
FIG. 61 is a flowchart showing the procedure for searching basic information in the information processing method as illustrated in FIG. 51.
Figure 62:
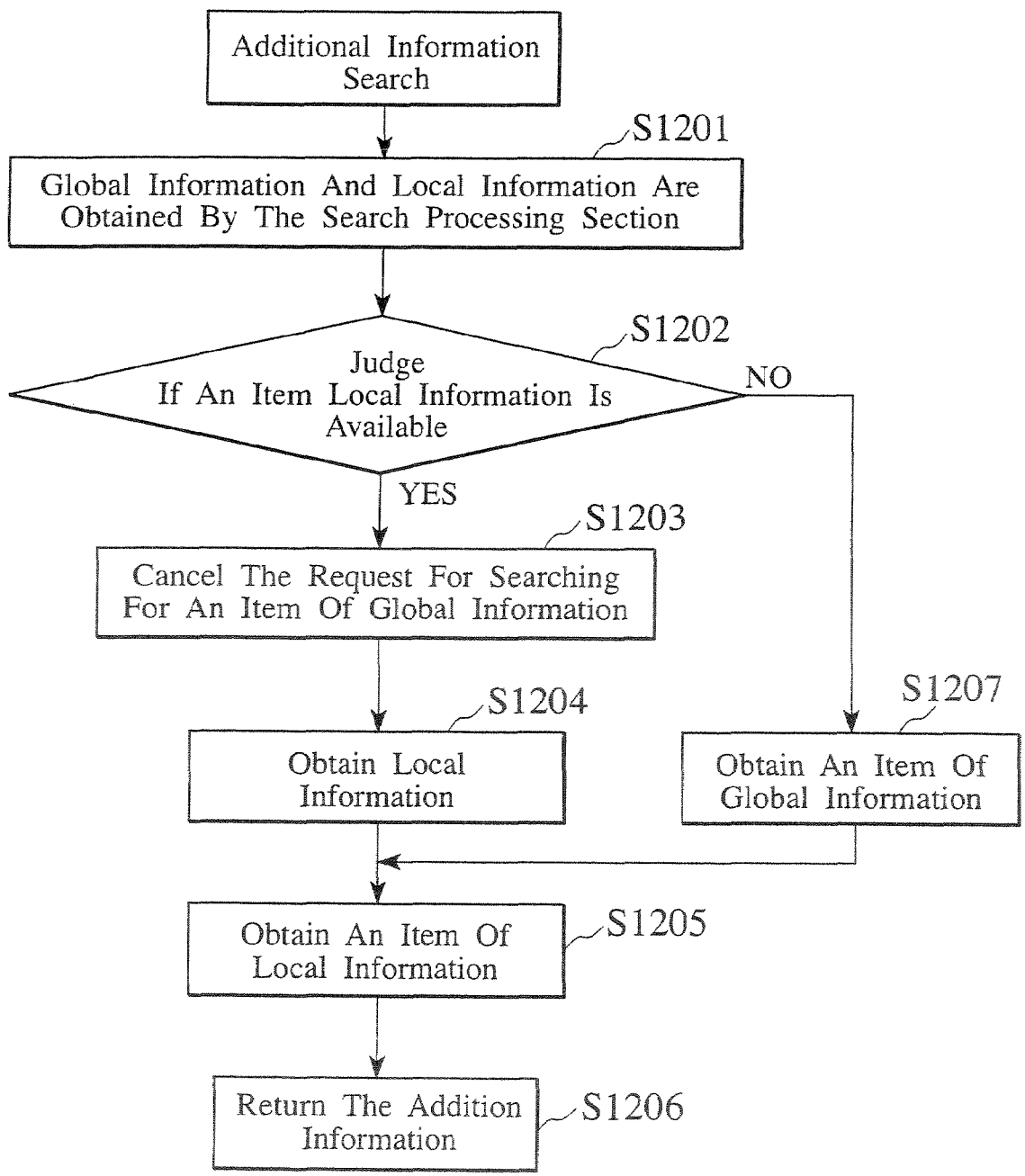
FIG. 62 is a flowchart showing the procedure for searching additional information in the information processing method as illustrated in FIG. 51.
Figure 63:
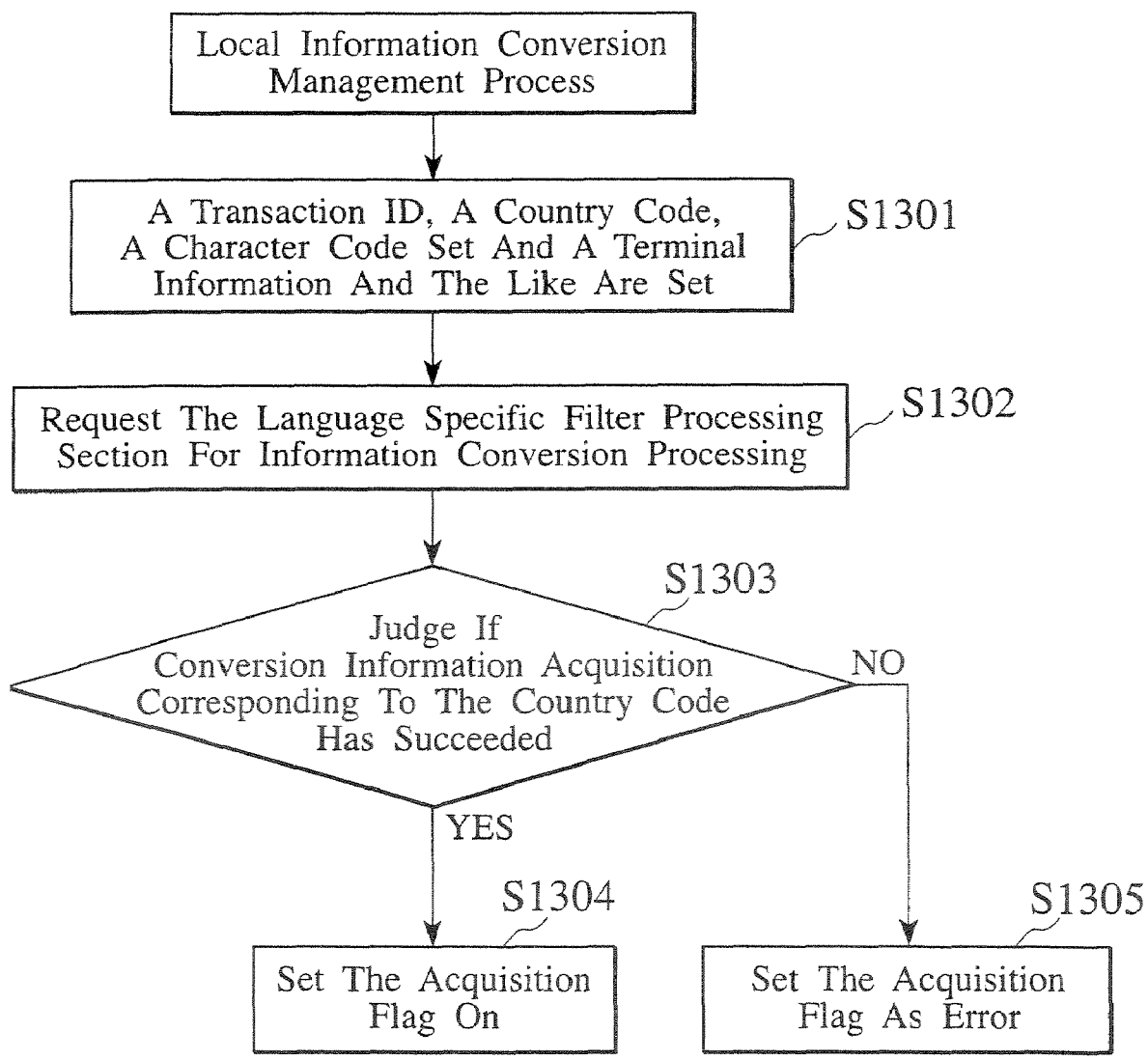
FIG. 63 is a flowchart showing the procedure for searching for local information in the information processing method as illustrated in FIG. 51.
Figure 64:
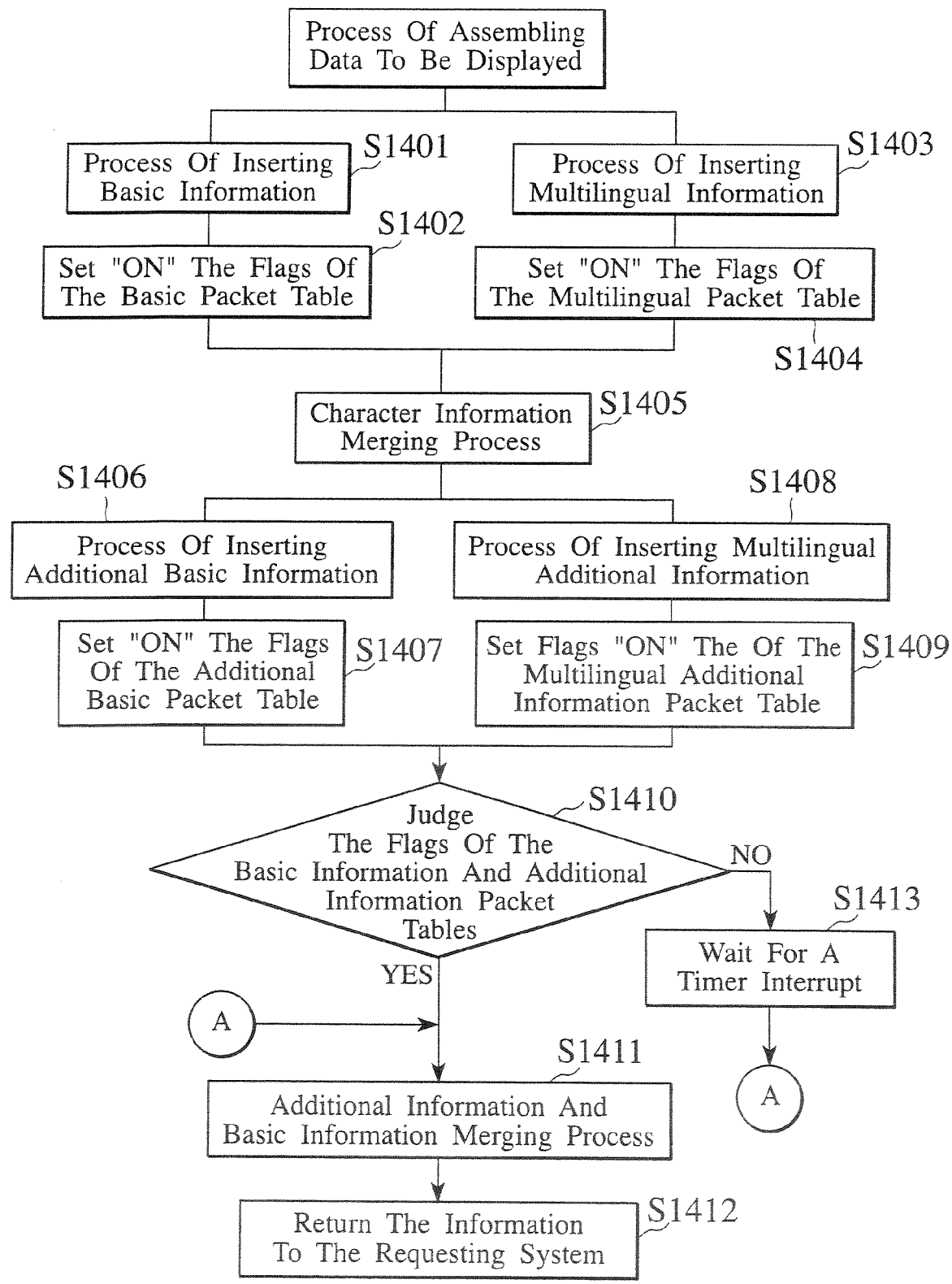
FIG. 64 is a flowchart showing the procedure for assembling data for display in the information processing method as illustrated in FIG. 51.
Figure 65:
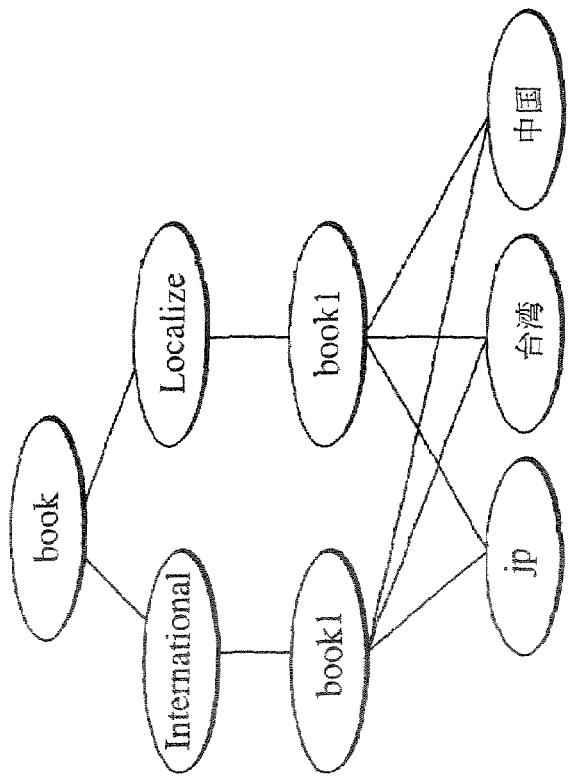
FIG. 65 is a diagram showing the structure of the multilingual database of a contents server as illustrated in FIG. 51.

FIG. 51 is a view for explaining the overview of the information processing apparatus in accordance with a sixth embodiment of an information processing method of the present invention for handling multiple languages; FIG. 52 is a schematic block diagram showing the major portions of FIG. 51; FIG. 53 and FIG. 54 are views for explaining the information input in a markup language and the information obtained by dividing it in the information processing method as illustrated in FIG. 51; FIGS. 55A to 55C are a schematic diagrams showing a search managing table generated by a search processing section as illustrated in FIG. 52; FIG. 56 is a view for explaining a multilingual conversion filter processing section as illustrated in FIG. 52; FIG. 57 is a schematic diagram showing a conversion managing table for managing the conversion process for each transaction in the multilingual conversion filter processing section; FIG. 58 is a view for explaining a multilingual filter conversion database; FIG. 59 is a flowchart for explaining the search request process of the multilingual conversion filter processing section as illustrated in FIG. 51; FIG. 59 is a flowchart for explaining the search result process of the multilingual conversion filter processing section; FIG. 60 is a flowchart for explaining the search result process of the multilingual conversion filter processing section; FIG. 61 is a flowchart showing the procedure for searching basic information in the information processing method as illustrated in FIG. 51; FIG. 62 is a flowchart showing the procedure for searching additional information in the information processing method as illustrated in FIG. 51; FIG. 63 is a flowchart showing the procedure for searching for local information in the information processing method as illustrated in FIG. 51; FIG. 64 is a flowchart showing the procedure for assembling data for display in the information processing method as illustrated in FIG. 51; and FIG. 65 is a schematic diagram showing the structure of the multilingual database.

The information processing system as illustrated in FIG. 51 is provided with a communication terminal 301 for example used by a user or an operations manager in U.S.A, a communication terminal 302 for example used by a user or an operations manager in Japan, a server 303 for example located in Singapore and a Web server 306 on the Internet 305, which are connected to each other. The server 303 can be accessed, for example, by a mobile terminal 304 used by a user or an operations manager in China.

To the Web server 306 are connected a multilingual system 307 and a contents server 311. The multilingual system 307 serves to accept a plurality of languages, search contents as described below, and return contents as a result of the search to the communication terminal 301 and 302 and the mobile terminal 304 accessing it, and provided with a multilingual conversion processing section 308, a multilingual conversion filter database section 309 and a contents server interface 310.

The multilingual conversion processing section 308 serves to perform multilingual conversion. Necessary information required for character code conversion relating to local information is registered in the multilingual conversion filter database section 309. The contents server interface section 310 serves to relay information from and to the contents server 311. The contents server 311 is provided with contents database 312.

In FIG. 52 showing the major portions of FIG. 51, the Web server 306 serves to process request provided by HTTP protocol as transmitted from the communication terminal 301 for example used by a user or an operations manager in U.S.A, the communication terminal 302 for example used by a user or an operations manager in Japan and the server 303 for example located in Singapore as described above.

The multilingual conversion processing section 308 is provided with a markup language processing section 308a, a requested language judgment processing section 308b, a telegraphic message division processing section 308c, a language specific filter processing section 308d, a search processing section 308e and a telegraphic message assembly processing section 308f.

The markup language processing section 308a serves to process SGML, HTML and XML as markup languages respectively as well as other type of markup languages. Also, the markup language processing section 308a serves to divide and extract information of data as input from the Web server 306 and, conversely, to insert markup tags into the telegraphic message to be output to the Web server 306.

The requested language judgment processing section 308b serves to determine the language codes used by the communication terminals 301 and 302 for inputting and displaying the respective information as described above and setting the corresponding country codes for the communication terminals 301 and 302 and so forth.

Also, the language code is obtained from information contained in the information of each terminal for inputting and displaying the respective information, for example, the environment variable information or the configuration file of each terminal. Alternatively, this can be obtained also from a kind of script languages or embedded information called cookies.

The telegraphic message division processing section 308c serves to divide the telegraphic message information transmitted from the communication terminals 301 and 302 and so forth and generate search information to be transferred to the search processing section 308e.

For example, illustrated in FIG. 53 and FIG. 54 are information which is obtained by dividing the telegraphic message in the markup language processing section 308a, dividing again in the telegraphic message division processing section 308c, and being constructed in the telegraphic message assembly processing section 308f as described below.

Namely, FIG. 53 and FIG. 54 show an example of the telegraphic message as exchanged with a book store opened on the Internet 305 in the case where a user obtain the information of a book by inputting the title of the book, the author of the book and the country name of the user in order to searching for the book.

First, as illustrated in FIG. 53, the telegraphic message is divided on the basis of information as input from the communication terminals 301 and 302 followed by inquiring search items of both global and local information to the basic information database 312a and a basic information auxiliary database 312b as described below. This is because there is available information at least in the basic information database 312a and the basic information auxiliary database 312b. At the same time, with respect to the search items extracted as local information, a multilingual database 312c and a multilingual auxiliary database 312d as described below are searched. Namely, this is because there is available information for each country with respect to the search items of the local information as extracted by division.

Also, FIG. 54 shows an example of the telegraphic message as generated by the telegraphic message assembly processing section 308f as described below to be returned to the communication terminals 301 and 302 as a result of the searching process.

In this case, while there is available local information about a picture of the book (Picture), there is no local information of the introductory picture (Author) of the Author and the message (Voice) of the Author so that the basic information is returned as it is.

The language specific filter processing section 308d serves to convert character codes relating to local information with reference to the information of the multilingual conversion filter database section 309 as illustrated in FIG. 56. The local information may contain information in a plurality of character encoding systems in a single native language. In this case, the character codes used in the communication terminal 301 or 302 are converted to corresponding character codes as used in the contents database 312 while the character codes of content information as obtained are converted in the reverse direction to the character codes used in the communication terminal 301 or 302.

That is, for example, in the case where the contents database 312 is searched for multilingual information, a character string as a search term has to be encoded in the character code system used in the contents database 312. It is required to determine which character code set is expected, for data response, by the communication terminal 301 or 302, the server 303 or the like having inquired, for example, in Japanese character code sets, i.e., Shift-JIS, JIS, EUC and so forth in order to return a response in the character code set as required, and therefore each transaction is managed with a conversion management table as illustrated in FIG. 57.

Also, it is considered appropriate that the contents database 312 stores multilingual data in Unicode. In this case, at the outset, a search character string in the local character code set is converted to a character sing in Unicode and transferred to the search engine. After finishing the search process and providing a search result in Unicode, i.e., when a content is prepared and available to be returned, the same language filter is used to inversely convert a character string in Unicode to a character string in the local character code set.

The conversion is performed by the use of a conversion table between each local character code set and the Unicode set. The conversion tables are stored in a conversion table database as illustrated in FIG. 58 while an appropriate table is read by a character conversion application in response to a request from the communication terminal 301 or 302, the server 303 or the like.

With reference to a conversion table which is frequently accessed, the conversion table is loaded to a memory when running an application program, rather than accessed each time it is needed, for the purpose of making it possible to instantaneously respond to a request from the communication terminal 301 or 302, the server 303 or the like.

In this case, the information stored in the multilingual conversion filter database section 309 includes country codes, character codes, character auxiliary codes, alternate character codes, Unicode sets and so forth as illustrated in FIG. 58.

The search processing section 308e serves to generate a search managing table as illustrated in FIGS. 55A to 55C, to manage whether or not search information has been obtained for each search item and search for global information (in English in many case) and local information (information in the native language of each customer) at the same time for the same information. In this case, if there is available local information, the local information is selected with priority while, if not, global information is returned. When all the required local information becomes available, the information is returned at that time. However, if all the local information does not become available for a certain time while an internal timer is provided to generate an interrupt, the information as available at the time when time is up is returned, as long as all the necessary information is available irrespective of whether global or local information, for the purpose of accelerating the process.

Namely, in the search managing table as illustrated in FIGS. 55A to 55C are managed basic information, additional basic information, multilingual information, and additional multilingual information respectively for each of the basic information database 312a, the basic information auxiliary database 312b, the multilingual database 312c and the multilingual auxiliary database 312d as described below by assigning packet numbers to the respective search items.

All the items are set to "0" in the initial state as illustrated in FIG. 55A followed by setting the items requiring search operations to "1" as illustrated in FIGS. 55B and 55C. When the search operation of an item succeeds, the "1" of the item is changed to a "0". In this case, a process is performed in the row direction and in the column direction of the table. If all the items are set to "0", for example as illustrated in FIG. 55A, it means that all the required information becomes available.

Also, a search limit may be provided by monitoring with a timer for the purpose of shortening the waiting time of a user. In this case, when time is up, only information set to "0" is returned to the user. For example, in the case where there is not available local information, which is considered usually available under ordinary circumstances, if global information has been available, the global information is returned.

The telegraphic message assembly processing section 308f serves to assemble a telegraphic message as resultant information obtained after a search operation to be returned, for example, to the communication terminals 301 and 302 as described in conjunction with FIG. 54.

The contents server interface 310 serves to convert a request for searching as issued from the search processing section 308e to a language for search which can be handled by the contents server 311, and transmit an information acquisition request, an information addition request, an update request and so forth.

Meanwhile, the multilingual system 307 serving to perform a set of processes as described above may be implemented as a computer system located between the Web server 306 and the contents database 311 or as a processing section operating in the same computer as the Web server 306 and the contents server 311.

The contents server 311 is provided with, as the contents database 312, the basic information database 312a, the basic information auxiliary database 312b, the multilingual database 312c and the multilingual auxiliary database 312d.

The basic information database 312a and the basic information auxiliary database 312b serve to register data for storing global information and global additional information respectively.

Meanwhile, the basic information database 312a, the basic information auxiliary database 312b, the multilingual database 312c and the multilingual auxiliary database 312d may be maintained in the same contents server 311. Alternatively, the basic information database 312a and the basic information auxiliary database 312b are implemented in order to operate in a different server separate from a server in which the multilingual database 312c and the multilingual auxiliary database 312d operate.

Also, the multilingual database 312c and the multilingual auxiliary database 312d may be integrated within the multilingual system 307 for operation. By applying such configuration, it is possible to provide only multilingual processing functionality for a plurality of servers.

Next, the information processing method for handling multiple languages in the information processing method designed with the configuration will be explained.

First of all, the case where basic information is searched will be explained with reference to FIG. 61. When a user accesses, global information and local information are searched by the search processing section 308e as illustrated in FIG. 52 (Step 1101). In this case, information acquisition by the search processing section 308e is performed on the basis of the search information as obtained by the telegraphic message division processing section 308c as illustrated in FIG. 52, which telegraphic message is obtained by dividing telegraphic message information transmitted from the communication terminals 301 and 302 and the like.

At this time, it is judged whether or not local information is available (Step 1102). If available, the request for searching for global information is cancelled (Step 1103), while the local information is obtained from the multilingual database 312c (Step 1104), and then the information as obtained is returned to the telegraphic message assembly processing section 308f (Step 1105).

Conversely, if it is judged that local information is not available in (Step 1102), global information is obtained from the basic information database 312a (Step 1106) and returned to the telegraphic message assembly processing section 308f (Step 1105).

Next, the case where additional information is searched will be explained with reference to FIG. 62. In the same manner as described above, global information and local information are searched by the search processing section 308e (Step 1201). At this time, it is judged whether or not the actual data designated by local information is available (Step 1202). If available, the request for searching for global information is cancelled (Step 1203), while the local information item is obtained (Step 1204), and then a corresponding item as obtained from the multilingual auxiliary database 312d (Step 1205) is returned to the telegraphic message assembly processing section 308f (Step 1206).

Conversely, if it is judged that a required item of local information is not available in (Step 1202), a required item of global information is obtained (Step 1106) and then a corresponding item as obtained from the multilingual auxiliary database 312d (Step 1205) is returned to the telegraphic message assembly processing section 308f (Step 1206).

Next, a local information conversion management process will be explained with reference to FIG. 63. A transaction ID, a country code, a character code set and a terminal information are input to the multilingual conversion management table as illustrated in FIG. 57 (Step 1301) followed by sending a request for information conversion process to the language specific filter processing section 308d as illustrated in FIG. 57 (Step 1302). The request in this case is based upon the search information from the telegraphic message division processing section 308c as described above.

At this time, it is judged whether or not conversion information acquisition corresponding to the country code has succeeded (Step 1303). If the conversion information acquisition corresponding to the country code has succeeded, a corresponding acquisition flag is set "on" (Step 1304). Conversely, If no conversion information is available, the acquisition flag is set as error and returned to the language specific filter processing section 308*d* (Step 1305).

Next, a search request process of the language specific filter processing section 308*d* will be explained with reference to FIG. 59. A code conversion correspondence table is obtained with reference to the character code information (Step 901). The correspondence table is, for example, as illustrated in FIG. 58. Then, it is judged whether or not the code conversion correspondence table is obtained (Step 902). If the code conversion correspondence table is obtained, the correspondence table is used to convert the request in the character code set handled in the contents database 312 as illustrated in FIG. 51 with reference to the country code and the like (Step 903) and transferred to the search request to the search processing section 308*e* (Step 904).

Conversely, if the code conversion correspondence table is not obtained, an alternate conversion correspondence table is obtained in accordance with an alternate character code set when the alternate character code set is designated in the multilingual conversion filter database section 309 (Step 905). Then, the request is converted into the alternate character code set (Step 903) and transferred to the search processing section 308*e* (Step 904).

Next, the search result process of the language specific filter processing section 308*d* will be explained with reference to FIG. 60. A code conversion correspondence table is obtained with reference to the character code information (Step 1001). The correspondence table is as explained in conjunction with FIG. 59. Then, it is judged whether or not the code conversion correspondence table is obtained (Step 1002). If the code conversion correspondence table is obtained, the correspondence table is used to convert the request in the character code set handled in the contents database 312 as illustrated in FIG. 51 with reference to the country code and the like (Step 1003) and transferred to the telegraphic message assembly processing section 308*f* (Step 1004).

Conversely, if the code conversion correspondence table is not obtained, an alternate conversion correspondence table is obtained in accordance with an alternate character code set when the alternate character code set is designated in the multilingual conversion filter database section 309 (Step 1005). Then, the request is converted into the alternate character code set (Step 1003) and transferred to the telegraphic message assembly processing section 308*f* (Step 1004).

Next, the process of assembling data to be displayed will be explained with reference to FIG. 64. After the process of inserting basic information (Step 1401), flags of the basic packet table as illustrated in FIGS. 55A to 55*c* are set "On" (Step 1402). In parallel with these processes, after the process of inserting multilingual information (Step 1403), flags of the multilingual packet table are set "On" (Step 1404).

Next, the processing proceeds to a character information merging process (Step 1405). In this case, after the process of inserting basic additional information (Step 1406), flags of the basic additional information packet table as illustrated in FIGS. 55A to 55C are set "On" (Step 1407). In parallel with these processes, after the process of inserting multilingual additional information (Step 1408), flags of the multilingual additional information packet table are set "On" (Step 1409).

Then, after the flags of the basic information and additional information packet tables are judged (Step 1410), an additional information and basic information merging process is performed if an On flag exists (Step 1411), and then the information is returned to the requesting system (Step 1412). Conversely, if no "On" flag exists, the system waits for a timer interrupt (Step 1413). When time is up, the additional information and basic information merging process is performed (Step 1411), and then the information is returned to the requesting system (Step 1412).

As explained in conjunction with FIG. 65, the multilingual database designated by reference numeral 312*c* in FIG. 52 contains content IDs, country codes, character codes and character auxiliary codes, stores character string contents corresponding to the respective character codes and furthermore stores object handles which are index information to photographs, sounds, graphics and so forth.

Accordingly, in accordance with this embodiment, when users respectively using their native languages access the Web server 306 on the Internet 305 with the communication terminals 301 and 302 and so forth, the multilingual system 307 connected to the Web server 306 serves to output search requests corresponding to a plurality of languages used by the accesses while the contents server 311 receives the search requests, searches the contents database 312 for contents matching the search requests and returns the contents to the multilingual system 307, and therefore it is possible with ease to support multiple languages in managing the provision of contents, addition, change and deletion of the contents and operation of the system.

Also, since it becomes easy to support multiple languages, in this manner, making it possible to access contents without awareness of the language, further increase of users is expected. Furthermore, by integrating and operating the multilingual database 312*c* and the multilingual auxiliary database 312*d* with the multilingual system 307 and providing the integrated system for other providers, it is possible to position the providers apart from the rest.

Still further, by making use of such an integrated system in the provider side, it is possible to dispense with preparation of contents in the languages of the respective countries and therefore to cut costs and lessen the complexity in maintaining the operation.

Still further, for the provider making use of such an integrated system, it is possible to develop services for other providers which do not make use of the integrated system. The services implemented with the data relay server in accordance with the present invention include the provision of the system, the provision of a service for processing data based upon the system, the provision of an intermediary service by the use of the system and so forth.

Meanwhile, while the respective embodiments as described above have been described as systems mainly applied for online electronic transactions, the present invention is not limited thereto but applicable to any other services which become expedient by making use of the system in accordance with the present invention.

Such services include, for example, online commerce for books, convenience goods, newspapers, magazines, research papers, video software, games, music software and so forth; implementation of mercantile exchange of financial instruments such as corporate stocks, investment trusts and so forth; education services such as general education, language education and so forth; leisure services such as traveling services, accommodation services, tourist information services and so forth; the easy provision of corporate advertisements, governmental bulletins and so forth broadly among multiethnic, multinational and transnational population.

Furthermore, by making use of the present invention, it is possible to provide navigation services, for example, the guidance of tourist sites, the guidance of connection and so forth. Still further, it is possible to apply the present invention to medical services, for example, doctor's questions, drug prescriptions and so forth and to public services aimed at foreigners, for example, immigration and departure control, postal services, police services and so forth.

PRACTICAL INDUSTRIAL APPLICABILITY

In accordance with the present invention, by providing a relay server responsible to manage data associated with a function introduced anew while the request data from a client is divided into a portion relating to the new function and a portion to be transferred to a server system so that the portion relating to the new function is processed by the relay server, added to the response data from the server system or replaced by a part of the response data and then returned to the client, it is possible to extend available data formats between the relay server and clients without compromising the compatibility of data formats between the server system and the clients and therefore possible to add a new function such as providing a service in another language in addition to the current language without need for halting the current server/client system to interrupt the services thereof, without need for making modification to the conventional server/client system which would make it impossible to use the server/client system, and without need for developing again the large-scale complicated server system.

Furthermore, in accordance with the information processing method and the storage medium relating to another invention, when users respectively using their native languages access a Web server on the Internet with the communication terminals, the multilingual system connected to the Web server serves to output search requests corresponding to a plurality of languages used by the accesses while the contents server receives the search requests, searches the contents database for contents matching the search requests and returns the contents to the multilingual system, and therefore it is possible with ease to support multiple languages in providing contents.

What is claimed is:

1. An information processing method comprising:
    a first step of accessing a Web server on the Internet by users respectively using their native languages;
    a second step of outputting search requests corresponding to a plurality of languages used by said access step by a multilingual system connected to said Web server including
        a third step of performing multilingual conversion required for supporting multiple languages on the basis of information of a multilingual conversion filter database by a multilingual conversion processing section, including
            a fourth step of processing a respective markup language by a markup language processing section,
            a fifth step of determining a language code which is used by a communication terminal of a user and setting a country code of said communication terminal by a request language determination processing section,
            a sixth step of dividing telegraphic message information as transmitted from said communication terminal by a telegraphic message division processing section,
            a seventh step of recording a country code, a character code set, terminal information and a content ID of said telegraphic message information as divided for each transaction,
            an eighth step of converting character codes relating to local information with reference to the information of the multilingual conversion filter database,
            a ninth step of outputting said search requests to a contents server interface by generating a search managing table in a search processing section, searching global information and the local information for same information, and outputting said search requests to said contents server interface, and
        a tenth step of outputting said search requests to a contents server through said contents server interface;
    an eleventh step of receiving said search requests, searching contents database for contents matching said search requests and returning said contents to the multilingual system the contents server;
    a twelfth step of managing whether search information is obtained for each searching item; and
    a thirteenth step of returning said contents to said users through said Web server including
        a fourteenth step of managing a conversion information process of said contents, and
        a fifteenth step of assembling a telegraphic message as resultant information of searching by a telegraphic message assembly processing section including inserting markup tags into the telegraphic message to be output to said Web server followed by requesting said Web server to output said telegraphic message.

2. The information processing method as set forth in claim 1 wherein said third step includes storing country codes, character codes, character auxiliary codes, alternate character codes and Unicodes in information registered in said multilingual conversion filter database.

3. The information processing method as set forth in claim 1 wherein said fourth step includes dividing and extracting information from the markup language as input from the Web server.

4. The information processing method as set forth in claim 1 wherein, when said local information contains information in a plurality of character encoding systems in a single native language, said eighth step includes converting character codes used in the communication terminal of a user to corresponding character codes as used in the contents database and said fourteenth step includes converting the character codes of content information as obtained in a reverse direction to the character codes used in the communication terminal of the user.

5. The information processing method as set forth in claim 1 wherein said twelfth step includes a sixteenth step of selecting, if there is available local information, the local information with priority and, if not, selecting global information, and returning the information as selected.

6. The information processing method as set forth in claim 5 wherein, while an internal timer is provided to install an interrupt processor for accelerating the process, said sixteenth step includes returning the search information as available at a time when time has elapsed, irrespective of whether global or local information, to a language specific filter processing section.

7. The information processing method as set forth in claim 1 wherein
   said ninth step includes setting all items of said search managing table as being generated to "0" in an initial state while each item associated with a search request is set to "1"; and
   said twelfth step includes changing the "1" of each item associated with a successful search to a "0", and performing an operation in a row direction and in a column direction of said search managing table and judging that all the search information becomes available if all the items are set to "0".

8. The information processing method as set forth in claim 1 wherein said eleventh step includes a further step of by using said contents database as a basic information database, a basic information auxiliary database, a multilingual database and a multilingual auxiliary database.

9. The information processing method as set forth in claim 8 wherein said further step includes:
   registering global information in said basic information database;
   registering global auxiliary information in said basic information auxiliary database;
   registering local information in said basic information database; and
   registering local auxiliary information in said basic information auxiliary database.

10. The information processing method as set forth in claim 9 wherein said further step includes operating said basic information database and the basic information auxiliary database in a different server separate from a server in which said multilingual database and the multilingual auxiliary database operate.

11. The information processing method as set forth in claim 9 wherein said further step includes operating said multilingual database and the multilingual auxiliary database integrally with the multilingual system.

* * * * *